United States Patent
Fleizach et al.

(10) Patent No.: US 11,775,169 B2
(45) Date of Patent: *Oct. 3, 2023

(54) DEVICES, METHODS, AND GRAPHICAL USER INTERFACES FOR PROVIDING CONTROL OF A TOUCH-BASED USER INTERFACE ABSENT PHYSICAL TOUCH CAPABILITIES

(71) Applicant: Apple Inc., Cupertino, CA (US)

(72) Inventors: Christopher B. Fleizach, Gilroy, CA (US); Eric T. Seymour, San Jose, CA (US); James P. Craig, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,124

(22) Filed: May 12, 2022

(65) Prior Publication Data

US 2022/0276779 A1 Sep. 1, 2022

Related U.S. Application Data

(63) Continuation of application No. 16/939,922, filed on Jul. 27, 2020, now Pat. No. 11,354,032, which is a continuation of application No. 16/179,545, filed on Nov. 2, 2018, now Pat. No. 10,732,829, which is a continuation of application No. 15/061,651, filed on Mar. 4, 2016, now Pat. No. 10,120,566, which is a
(Continued)

(51) Int. Cl.
*G06F 3/04883* (2022.01)
*G06F 3/033* (2013.01)
(Continued)

(52) U.S. Cl.
CPC .......... *G06F 3/04883* (2013.01); *G06F 3/033* (2013.01); *G06F 3/0481* (2013.01);
(Continued)

(58) Field of Classification Search
CPC .............. G06F 3/04883; G06F 3/0481; G06F 3/04845; G06F 3/0485; G06F 3/0488; G06F 3/033; G06F 2203/04808
See application file for complete search history.

(56) References Cited

U.S. PATENT DOCUMENTS

| 4,763,356 A | 8/1988 | Day et al. |
| 5,412,189 A | 5/1995 | Cragun |

(Continued)

FOREIGN PATENT DOCUMENTS

| CA | 2651409 A | 8/2009 |
| CN | 1873602 A | 12/2006 |

(Continued)

OTHER PUBLICATIONS

Non-Final Office Action received for U.S. Appl. No. 17/074,396, dated Sep. 30, 2022, 17 pages.
(Continued)

*Primary Examiner* — Daniel W Parcher
(74) *Attorney, Agent, or Firm* — DLA Piper LLP (US)

(57) ABSTRACT

An electronic device with a display and a touch-sensitive surface displays, on the display, a first visual indicator that corresponds to a virtual touch. The device receives a first input from an adaptive input device. In response to receiving the first input from the adaptive input device, the device displays a first menu on the display. The first menu includes a virtual touches selection icon. In response to detecting selection of the virtual touches selection icon, a menu of virtual multitouch contacts is displayed.

24 Claims, 54 Drawing Sheets

Related U.S. Application Data continuation of application No. 13/217,654, filed on Aug. 25, 2011, now Pat. No. 9,513,799.

(60) Provisional application No. 61/493,495, filed on Jun. 5, 2011.

(51) Int. Cl.

| | | |
|---|---|---|
| *G06F 3/0488* | (2022.01) | |
| *G06F 3/0481* | (2022.01) | |
| *G06F 3/04845* | (2022.01) | |
| *G06F 3/0485* | (2022.01) | |

(52) U.S. Cl.
CPC .......... *G06F 3/0485* (2013.01); *G06F 3/0488* (2013.01); *G06F 3/04845* (2013.01); *G06F 2203/04808* (2013.01)

(56) References Cited

U.S. PATENT DOCUMENTS

| | | |
|---|---|---|
| 5,543,588 A | 8/1996 | Bisset et al. |
| 5,666,499 A | 9/1997 | Baudel et al. |
| 5,729,219 A | 3/1998 | Armstrong et al. |
| 5,734,853 A | 3/1998 | Hendricks et al. |
| 5,805,157 A | 9/1998 | Bertram et al. |
| 5,805,159 A | 9/1998 | Bertram et al. |
| 5,812,131 A | 9/1998 | Bertram |
| 5,825,352 A | 10/1998 | Bisset et al. |
| 5,831,664 A | 11/1998 | Wharton et al. |
| 5,870,083 A | 2/1999 | Shieh et al. |
| 5,933,134 A | 8/1999 | Shieh |
| 5,956,025 A | 9/1999 | Goulden et al. |
| 6,002,395 A | 12/1999 | Wagner et al. |
| 6,160,553 A | 12/2000 | Robertson et al. |
| 6,259,436 B1 | 7/2001 | Moon et al. |
| 6,335,725 B1 | 1/2002 | Koh et al. |
| 6,489,951 B1 | 12/2002 | Wong et al. |
| 6,560,612 B1 | 5/2003 | Yamada et al. |
| 6,757,001 B2 | 6/2004 | Allport et al. |
| 6,882,299 B1 | 4/2005 | Allport et al. |
| 7,158,123 B2 | 1/2007 | Myers et al. |
| 7,178,109 B2 | 2/2007 | Hewson et al. |
| 7,296,241 B2 | 11/2007 | Oshiro et al. |
| 7,307,509 B2 | 12/2007 | Chriss et al. |
| 7,383,515 B2 | 6/2008 | Bardon et al. |
| 7,453,442 B1 | 11/2008 | Poynter et al. |
| 7,483,880 B2 | 1/2009 | Rossi et al. |
| 7,673,241 B2 | 3/2010 | Sun et al. |
| 7,703,041 B2 | 4/2010 | Ito et al. |
| 7,730,401 B2 | 6/2010 | Gillespie et al. |
| 7,747,964 B2 | 6/2010 | Morikawa et al. |
| 7,880,728 B2 | 2/2011 | De Los Reyes et al. |
| 7,900,156 B2 | 3/2011 | Andre |
| 8,004,398 B2 | 8/2011 | Chriss et al. |
| 8,079,039 B2 | 12/2011 | Lavoie et al. |
| 8,108,793 B2 | 1/2012 | Nguyen et al. |
| 8,386,965 B2 | 2/2013 | Fleizach et al. |
| 8,584,031 B2 | 11/2013 | Moore et al. |
| 9,116,611 B2 | 8/2015 | Seymour et al. |
| 9,430,128 B2 | 8/2016 | Hayes |
| 9,961,239 B2 | 5/2018 | Fleizach et al. |
| 2002/0057263 A1 | 5/2002 | Keely et al. |
| 2004/0066422 A1 | 4/2004 | Chandane |
| 2005/0024322 A1 | 2/2005 | Kupka |
| 2005/0134578 A1 | 6/2005 | Chambers et al. |
| 2005/0216826 A1 | 9/2005 | Black et al. |
| 2005/0219210 A1 | 10/2005 | Leland et al. |
| 2005/0235206 A1 | 10/2005 | Arend et al. |
| 2005/0235208 A1 | 10/2005 | Arend et al. |
| 2005/0235223 A1 | 10/2005 | Arend et al. |
| 2005/0246665 A1 | 11/2005 | Luke et al. |
| 2005/0278647 A1 | 12/2005 | Leavitt et al. |
| 2006/0007182 A1 | 1/2006 | Sato et al. |
| 2006/0069694 A1 | 3/2006 | Rossi et al. |
| 2006/0105301 A1 | 5/2006 | Chriss et al. |
| 2006/0114224 A1 | 6/2006 | Ninomiya |
| 2006/0123359 A1 | 6/2006 | Schatzberger et al. |
| 2006/0271870 A1 | 11/2006 | Anwar |
| 2006/0288312 A1 | 12/2006 | Akiyama et al. |
| 2006/0294472 A1 | 12/2006 | Cheng et al. |
| 2007/0130538 A1 | 6/2007 | Chiu et al. |
| 2007/0146337 A1 | 6/2007 | Ording et al. |
| 2007/0157094 A1 | 7/2007 | Lemay et al. |
| 2007/0236474 A1 | 10/2007 | Ramstein et al. |
| 2008/0016467 A1 | 1/2008 | Chambers et al. |
| 2008/0016468 A1 | 1/2008 | Chambers et al. |
| 2008/0036743 A1 | 2/2008 | Westerman et al. |
| 2008/0134017 A1 | 6/2008 | Inoguchi et al. |
| 2008/0148181 A1 | 6/2008 | Reyes et al. |
| 2008/0163053 A1 | 7/2008 | Hwang et al. |
| 2008/0163130 A1 | 7/2008 | Westerman |
| 2008/0165133 A1 | 7/2008 | Blumenberg et al. |
| 2008/0165151 A1 | 7/2008 | Lemay et al. |
| 2008/0192021 A1 | 8/2008 | Lim et al. |
| 2008/0222622 A1 | 9/2008 | Lavoie et al. |
| 2008/0225153 A1 | 9/2008 | Fagans |
| 2008/0229248 A1 | 9/2008 | Fagans et al. |
| 2009/0002335 A1 | 1/2009 | Chaudhri |
| 2009/0005032 A1 | 1/2009 | Lunati et al. |
| 2009/0027334 A1 | 1/2009 | Foulk et al. |
| 2009/0064055 A1 | 3/2009 | Chaudhri et al. |
| 2009/0070710 A1 | 3/2009 | Kagaya et al. |
| 2009/0093242 A1 | 4/2009 | Bhalekar et al. |
| 2009/0100383 A1 | 4/2009 | Sunday et al. |
| 2009/0167700 A1 | 7/2009 | Westerman et al. |
| 2009/0178008 A1 | 7/2009 | Herz et al. |
| 2009/0178011 A1 | 7/2009 | Ording et al. |
| 2009/0213083 A1 | 8/2009 | Dicker et al. |
| 2009/0225042 A1 | 9/2009 | Andrews et al. |
| 2009/0228792 A1 | 9/2009 | Van Os et al. |
| 2009/0228807 A1 | 9/2009 | Lemay |
| 2009/0244019 A1 | 10/2009 | Choi et al. |
| 2009/0256780 A1 | 10/2009 | Small et al. |
| 2009/0289913 A1 | 11/2009 | Chang et al. |
| 2010/0028410 A1 | 2/2010 | Haynie et al. |
| 2010/0041382 A1 | 2/2010 | Van Os et al. |
| 2010/0060586 A1 | 3/2010 | Pisula et al. |
| 2010/0085316 A1 | 4/2010 | Kim et al. |
| 2010/0088654 A1 | 4/2010 | Henhoeffer et al. |
| 2010/0095234 A1 | 4/2010 | Lane et al. |
| 2010/0149090 A1 | 6/2010 | Morris et al. |
| 2010/0149114 A1 | 6/2010 | Li |
| 2010/0185989 A1 | 7/2010 | Shiplacoff et al. |
| 2010/0192102 A1 | 7/2010 | Chmielewski et al. |
| 2010/0214218 A1 | 8/2010 | Vaisanen et al. |
| 2010/0231533 A1 | 9/2010 | Chaudhri |
| 2010/0248787 A1 | 9/2010 | Smuga et al. |
| 2010/0281410 A1 | 11/2010 | Heintze |
| 2010/0299635 A1 | 11/2010 | Oh et al. |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2011/0004853 A1 | 1/2011 | Chang |
| 2011/0007008 A1 | 1/2011 | Algreatly et al. |
| 2011/0018806 A1 | 1/2011 | Yano |
| 2011/0022607 A1 | 1/2011 | Fritzley et al. |
| 2011/0041102 A1 | 2/2011 | Kim |
| 2011/0055760 A1 | 3/2011 | Drayton et al. |
| 2011/0061056 A1 | 3/2011 | Shu |
| 2011/0078622 A1 | 3/2011 | Missig et al. |
| 2011/0096087 A1 | 4/2011 | Chun |
| 2011/0102464 A1 | 5/2011 | Godavari |
| 2011/0107209 A1 | 5/2011 | Ha et al. |
| 2011/0113364 A1 | 5/2011 | Neil et al. |
| 2011/0117526 A1 | 5/2011 | Wigdor et al. |
| 2011/0119636 A1 | 5/2011 | Ragusa et al. |
| 2011/0119639 A1 | 5/2011 | Tartz |
| 2011/0131515 A1 | 6/2011 | Ono et al. |
| 2011/0145753 A1 | 6/2011 | Prakash et al. |
| 2011/0191666 A1 | 8/2011 | Decker et al. |
| 2011/0231875 A1 | 9/2011 | Lee |
| 2011/0248928 A1 | 10/2011 | Michaelraj |
| 2011/0273380 A1 | 11/2011 | Martin |

(56) References Cited

U.S. PATENT DOCUMENTS

| | | |
|---|---|---|
| 2011/0300910 A1 | 12/2011 | Choi |
| 2011/0304584 A1 | 12/2011 | Hwang et al. |
| 2012/0069231 A1 | 3/2012 | Chao |
| 2012/0173976 A1 | 7/2012 | Herz et al. |
| 2012/0216150 A1 | 8/2012 | Wernecke |
| 2012/0262489 A1 | 10/2012 | Caliendo et al. |
| 2012/0306748 A1 | 12/2012 | Fleizach et al. |
| 2013/0002576 A1 | 1/2013 | Kim et al. |
| 2013/0019172 A1 | 1/2013 | Kotler et al. |
| 2013/0019182 A1 | 1/2013 | Gil et al. |
| 2013/0166146 A1 | 6/2013 | Tanaka |
| 2013/0204406 A1 | 8/2013 | Andersson et al. |
| 2014/0325407 A1 | 10/2014 | Morris et al. |
| 2014/0380243 A1 | 12/2014 | Furue et al. |
| 2015/0022482 A1 | 1/2015 | Hewitt et al. |
| 2015/0045000 A1 | 2/2015 | Kim et al. |
| 2015/0193585 A1 | 7/2015 | Sunna |
| 2015/0220218 A1 | 8/2015 | Jeon et al. |
| 2015/0363102 A1 | 12/2015 | Seymour et al. |
| 2016/0034093 A1 | 2/2016 | Xie et al. |
| 2016/0188202 A1 | 6/2016 | Seymour et al. |
| 2016/0200195 A1 | 7/2016 | Jun |
| 2016/0357281 A1 | 12/2016 | Kasemset et al. |
| 2018/0213126 A1 | 7/2018 | Fleizach et al. |
| 2019/0073121 A1 | 3/2019 | Fleizach et al. |
| 2019/0364173 A1 | 11/2019 | Fleizach et al. |
| 2020/0356256 A1 | 11/2020 | Fleizach et al. |
| 2021/0034233 A1 | 2/2021 | Seymour et al. |
| 2021/0227099 A1 | 7/2021 | Fleizach et al. |

FOREIGN PATENT DOCUMENTS

| | | |
|---|---|---|
| CN | 101520702 A | 9/2009 |
| CN | 101893984 A | 11/2010 |
| CN | 102023795 A | 4/2011 |
| DE | 102009010744 A1 | 9/2009 |
| EP | 2096524 A2 | 9/2009 |
| EP | 2175350 A1 | 4/2010 |
| GB | 2457802 A | 9/2009 |
| JP | 6-83524 A | 3/1994 |
| JP | 10-63427 A | 3/1998 |
| JP | 2002-251637 A | 9/2002 |
| JP | 2006-24039 A | 1/2006 |
| JP | 2006-155205 A | 6/2006 |
| JP | 2006-155313 A | 6/2006 |
| JP | 2007-286593 A | 11/2007 |
| JP | 2009-525538 A | 7/2009 |
| JP | 2009-205685 A | 9/2009 |
| JP | 2010-97353 A | 4/2010 |
| JP | 2010-517197 A | 5/2010 |
| JP | 2011-34451 A | 2/2011 |
| JP | 2011-257992 A | 12/2011 |
| JP | 2013-41333 A | 2/2013 |
| JP | 2013-510370 A | 3/2013 |
| KR | 10-2011-0016107 A | 2/2011 |
| KR | 10-2011-0016108 A | 2/2011 |
| WO | 2007/014064 A2 | 2/2007 |
| WO | 2007/089766 A2 | 8/2007 |
| WO | 2008/094791 A2 | 8/2008 |
| WO | 2009/108584 A2 | 9/2009 |
| WO | 2010/050477 A1 | 5/2010 |
| WO | 2010/050693 A2 | 5/2010 |
| WO | 2010/080498 A1 | 7/2010 |
| WO | 2010/120878 A2 | 10/2010 |
| WO | 2011/056387 A1 | 5/2011 |
| WO | 2012/170426 A2 | 12/2012 |

OTHER PUBLICATIONS

Applicant-Initiated Interview Summary received for U.S. Appl. No. 17/074,396, dated Dec. 16, 2022, 2 pages.
Final Office Action received for U.S. Appl. No. 17/074,396, dated Jun. 27, 2022, 16 pages.
Supplemental Notice of Allowance received for U.S. Appl. No. 17/224,997, dated Jun. 13, 2022, 3 pages.
Advisory Action received for U.S. Appl. No. 14/833,439, dated Jan. 11, 2019, 3 pages.
Applicant Initiated Interview Summary received for U.S. Appl. No. 16/939,922, dated Nov. 23, 2021, 3 pages.
Applicant-Initiated Interview Summary received for U.S. Appl. No. 14/833,439, dated May 27, 2020, 3 pages.
Applicant-Initiated Interview Summary received for U.S. Appl. No. 14/833,439, dated Oct. 21, 2019, 3 pages.
Applicant-Initiated Interview Summary received for U.S. Appl. No. 16/179,545, dated Feb. 4, 2020, 4 pages.
Applicant-Initiated Interview Summary received for U.S. Appl. No. 16/534,291, dated Oct. 14, 2020, 5 pages.
Applicant-Initiated Interview Summary received for U.S. Appl. No. 17/074,396, dated Dec. 17, 2021, 2 pages.
Brief Communication regarding Oral Proceedings received for European Patent Application No. 11704865.2, mailed on Jan. 10, 2020, 12 pages.
Corrected Notice of Allowance received for U.S. Appl. No. 15/061,651, dated Aug. 27, 2018, 2 pages.
Corrected Notice of Allowance received for U.S. Appl. No. 16/939,922, dated Feb. 23, 2022, 2 pages.
Decision to Grant received for European Patent Application No. 12727533.7, dated Jul. 30, 2020, 2 pages.
Decision to Refuse received for European Patent Application No. 11704865.2, dated Feb. 12, 2020, 13 pages.
Final Office Action received for U.S. Appl. No. 14/833,439, dated Feb. 21, 2020, 14 pages.
Final Office Action received for U.S. Appl. No. 14/833,439, dated Oct. 2, 2018, 10 pages.
Final Office Action received for U.S. Appl. No. 15/924,769, dated Apr. 24, 2019, 4 pages.
Intention to Grant received for European Patent Application No. 12727533.7, dated Mar. 18, 2020, 8 pages.
Minutes of the Oral Proceedings received for European Patent Application No. 11704865.2, mailed on Feb. 11, 2020, 3 pages.
Non-Final Office Action received for U.S. Appl. No. 14/833,439, dated Jan. 25, 2019, 9 pages.
Non-Final Office Action received for U.S. Appl. No. 14/833,439, dated Aug. 8, 2019, 10 pages.
Non-Final Office Action received for U.S. Appl. No. 14/833,439, dated Mar. 8, 2018, 8 pages.
Non-Final Office Action received for U.S. Appl. No. 14/863,195, dated May 4, 2017, 9 pages.
Non-Final Office Action received for U.S. Appl. No. 15/061,651, dated Feb. 9, 2018, 12 pages.
Non-Final Office Action received for U.S. Appl. No. 15/924,769, dated Jan. 24, 2019, 6 pages.
Non-Final Office Action received for U.S. Appl. No. 16/179,545, dated Nov. 18, 2019, 12 pages.
Non-Final Office Action received for U.S. Appl. No. 16/534,291, dated May 15, 2020, 9 pages.
Non-Final Office Action received for U.S. Appl. No. 16/939,922, dated Aug. 31, 2021, 21 pages.
Non-Final Office Action received for U.S. Appl. No. 17/074,396, dated Oct. 6, 2021, 15 pages.
Notice of Acceptance received for Australian Patent Application No. 2016203253, dated May 2, 2018, 3 pages.
Notice of Acceptance received for Australian Patent Application No. 2018217331, dated Jun. 2, 2020, 3 pages.
Notice of Acceptance received for Australian Patent Application No. 2020230308, dated Jan. 4, 2022, 3 pages.
Notice of Allowance Action received for U.S. Appl. No. 14/863,195, dated Jan. 2, 2018, 7 pages.
Notice of Allowance received for Chinese Patent Application No. 201280027757.9, dated Oct. 25, 2017, 2 pages.
Notice of Allowance received for Chinese Patent Application No. 201710576007.1, dated Apr. 13, 2020, 2 pages.
Notice of Allowance received for Japanese Patent Application No. 2016-020183, dated Jul. 7, 2017, 3 pages.
Notice of Allowance received for Japanese Patent Application No. 2017-152690, dated Oct. 26, 2020, 4 pages.

(56) References Cited

OTHER PUBLICATIONS

Notice of Allowance received for Japanese Patent Application No. 2020-131850, dated Mar. 1, 2021, 4 pages.
Notice of Allowance received for Korean Patent Application No. 10-2015-7016587, dated May 18, 2018, 3 pages.
Notice of Allowance received for Korean Patent application No. 10-2016-7027346, dated Dec. 22, 2017, 3 pages.
Notice of Allowance received for U.S. Appl. No. 13/217,654, dated Aug. 12, 2016, 5 pages.
Notice of Allowance received for U.S. Appl. No. 14/833,439, dated Jun. 24, 2020, 5 pages.
Notice of Allowance received for U.S. Appl. No. 15/061,651, dated Jul. 2, 2018, 6 pages.
Notice of Allowance received for U.S. Appl. No. 16/179,545, dated May 4, 2020, 7 pages.
Notice of Allowance received for U.S. Appl. No. 16/534,291, dated Dec. 9, 2020, 7 pages.
Notice of Allowance received for U.S. Appl. No. 16/939,922, dated Feb. 7, 2022, 13 pages.
Office Action received for Australian Patent Application No. 2016202360, dated Feb. 23, 2018, 4 pages.
Office Action received for Australian Patent Application No. 2016202360, dated Mar. 20, 2017, 3 pages.
Office Action received for Australian Patent Application No. 2016203253, dated Jul. 21, 2017, 3 pages.
Office Action received for Australian Patent Application No. 2018217331, dated Nov. 21, 2019, 4 pages.
Office Action received for Australian Patent Application No. 2020230308, dated Sep. 8, 2021, 3 pages.
Office Action received for Chinese Patent Application No. 201280027757.9, dated Apr. 12, 2017, 6 pages.
Office Action received for Chinese Patent Application No. 201280027757.9, dated Aug. 5, 2016, 6 pages.
Office Action received for Chinese Patent Application No. 201710576007.1, dated Oct. 23, 2019, 12 pages.
Office Action received for Chinese Patent Application No. 201810008374.6, dated Jun. 25, 2021, 26 pages.
Office Action received for Chinese Patent Application No. 201810008374.6, dated Mar. 24, 2021, 35 pages.
Office Action received for Chinese Patent Application No. 201810008374.6, dated Sep. 29, 2020, 17 pages.
Office Action received for European Patent Application No. 11704865.2, dated May 24, 2018, 7 pages.
Office Action received for European Patent Application No. 12727533.7, dated Jul. 5, 2017, 6 pages.
Office Action received for European Patent Application No. 12727533.7, dated Jun. 4, 2018, 5 pages.
Office Action received for Japanese Patent Application No. 2016020183, dated Dec. 22, 2016, 6 pages.
Office Action received for Japanese Patent Application No. 2017-152690, dated Apr. 3, 2020, 6 pages.
Office Action received for Japanese Patent Application No. 2017-152690, dated Apr. 8, 2019, 8 pages.
Office Action received for Japanese Patent Application No. 2017-152690, dated Jun. 8, 2018, 9 pages.
Office Action received for Japanese Patent Application No. 2020-131850, dated Oct. 12, 2020, 6 pages.
Office Action received for Korean Patent Application No. 10-2015-7016587, dated Jan. 31, 2018, 6 pages.
Office Action received for Korean Patent Application No. 10-2015-7016587, dated Mar. 31, 2017, 7 pages.
Office Action received for Korean Patent Application No. 1020167027346, dated Jun. 21, 2017, 7 pages.
Summons to attend oral proceedings received for European Patent Application No. 11704865.2, mailed on Aug. 26, 2019, 6 pages.
Notice of Allowance received for Korean Patent Application No. 10-2012-7021301, dated Jul. 28, 2014, 2 pages.
Notice of Allowance received for Korean Patent Application No. 10-2013-7034793, dated Nov. 30, 2015, 3 pages.
Office Action received for Korean Patent Application No. 10-2013-7034793, dated Jan. 21, 2015, 4 pages.
Office Action received for Korean Patent Application No. 10-2015-7016587, dated Mar. 31, 2016, 5 pages.
Office Action Received for European Patent Application No. 11704865.2, dated Oct. 22, 2015, 8 pages.
Non-Final Office Action received for U.S. Appl. No. 12/688,558, dated Jun. 8, 2012, 20 pages.
Notice of Allowance received for U.S. Appl. No. 12/688,558, dated Dec. 28, 2012, 5 pages.
Office Action received for European Patent Application No. 12727533.7 dated Dec. 15, 2015, 4 pages.
Final Office Action received for U.S. Appl. No. 13/217,654, dated Mar. 27, 2014, 21 pages.
Non-Final Office Action received for U.S. Appl. No. 13/217,654 dated Sep. 25, 2015, 31 pages.
Non-Final Office Action received for U.S. Appl. No. 13/217,654, dated Jan. 16, 2015, 21 pages.
Non-Final Office Action received for U.S. Appl. No. 13/217,654, dated Sep. 9, 2013, Sep. 9, 2013, 46 pages.
Non-Final Office Action received for U.S. Appl. No. 13/436,340, dated Nov. 6, 2014, 16 pages.
Notice of Allowance received for U.S. Appl. No. 13/436,340, dated Apr. 20, 2015, 5 pages.
Office Action received for Australian Patent Application No. 2012238305, dated Aug. 13, 2013, Aug. 13, 2013, 5 pages.
Notice of Acceptance received for Australian Patent Application No. 2012268384, dated Feb. 8, 2016, 2 pages.
Office Action received for Australian Patent Application No. 2012268384, dated Feb. 5, 2015, 3 pages.
Office Action received for Chinese Patent Application No. 201280027757.9, dated Nov. 18, 2015, 14 pages.
Notice of Acceptance received for Australian Patent Application No. 2013257534, dated Jan. 5, 2016, 2 pages.
Office Action received for Australian Patent Application No. 2013257534, dated Jan. 6, 2015, 2 pages.
Notice of Allowance received for Japanese Patent Application No. 2014-513803, dated Jan. 5, 2016, 3 pages.
Office Action received for Japanese Patent Application No. 2014-513803, dated Jan. 9, 2015, 7 pages.
International Preliminary Report on Patentability received for PCT Patent Application No. PCT/US2011/21010, dated Jul. 26, 2012, 18 pages.
International Search Report and Written Opinion received for PCT Patent Application No. PCT/US2011/21010, dated Aug. 19, 2011, 20 pages.
International Preliminary Report on Patentability received for PCT Patent Application No. PCT/US2012/040920, dated Dec. 27, 2013, 22 pages.
International Search Report and Written Opinion received for PCT Patent Application No. PCT/US2012/040920, dated Feb. 12, 2013, 27 pages.
Invitation to Pay Additional Fees received for PCT Patent Application No. PCT/US2012/040920, mailed on Sep. 19, 2012, 10 pages.
Pocketables, "No pinch to zoom on my new Streak", Pocketables Forum, http://www.pocketables.com/forum/showthread.php?t=6939, Aug. 18, 2010, 2 pages.
Savov, "iPhone and Magic Mouse linked up by BT stack", (video) Jan. 4, 2010, http://www.engadget.com/2010/01/04/iphone-and-magic-mouse-linked-up-by-btstack-video/, 5 pages.
Swartzfager B, "Google's new virtual room service (Lively) may have potential", Thought Delimited, http://www.thoughtdelimited.org/thoughts/post.cfm/google-s-new-virtual-room-service-lively-may-have-potential, Jul. 10, 2008, 2 pages.
Totalcontrol, "TotalControl-Iphone-Itouch-Ipad Vidcam Edition OS4 Update", Intelligent Designs Group, LLC, Online available at http://totalcontrolapp.com/index.php?option=com_myblog&show=Iphone-Itouch-Ipad-Vidcam-Edition-OS4-Update.html&ItemId=87, Jul. 12, 2010, 2 pages.
Applicant-Initiated Interview Summary received for U.S. Appl. No. 17/074,396, dated Aug. 12, 2022, 2 pages.

(56) References Cited

OTHER PUBLICATIONS

Applicant-Initiated Interview Summary received for U.S. Appl. No. 17/074,396, dated May 5, 2022, 3 pages.
Non-Final Office Action received for U.S. Appl. No. 17/074,396, dated Mar. 7, 2022, 15 pages.
Non-Final Office Action received for U.S. Appl. No. 17/224,997, dated Feb. 9, 2022, 5 pages.
Notice of Allowance received for U.S. Appl. No. 17/224,997, dated Jun. 1, 2022, 5 pages.

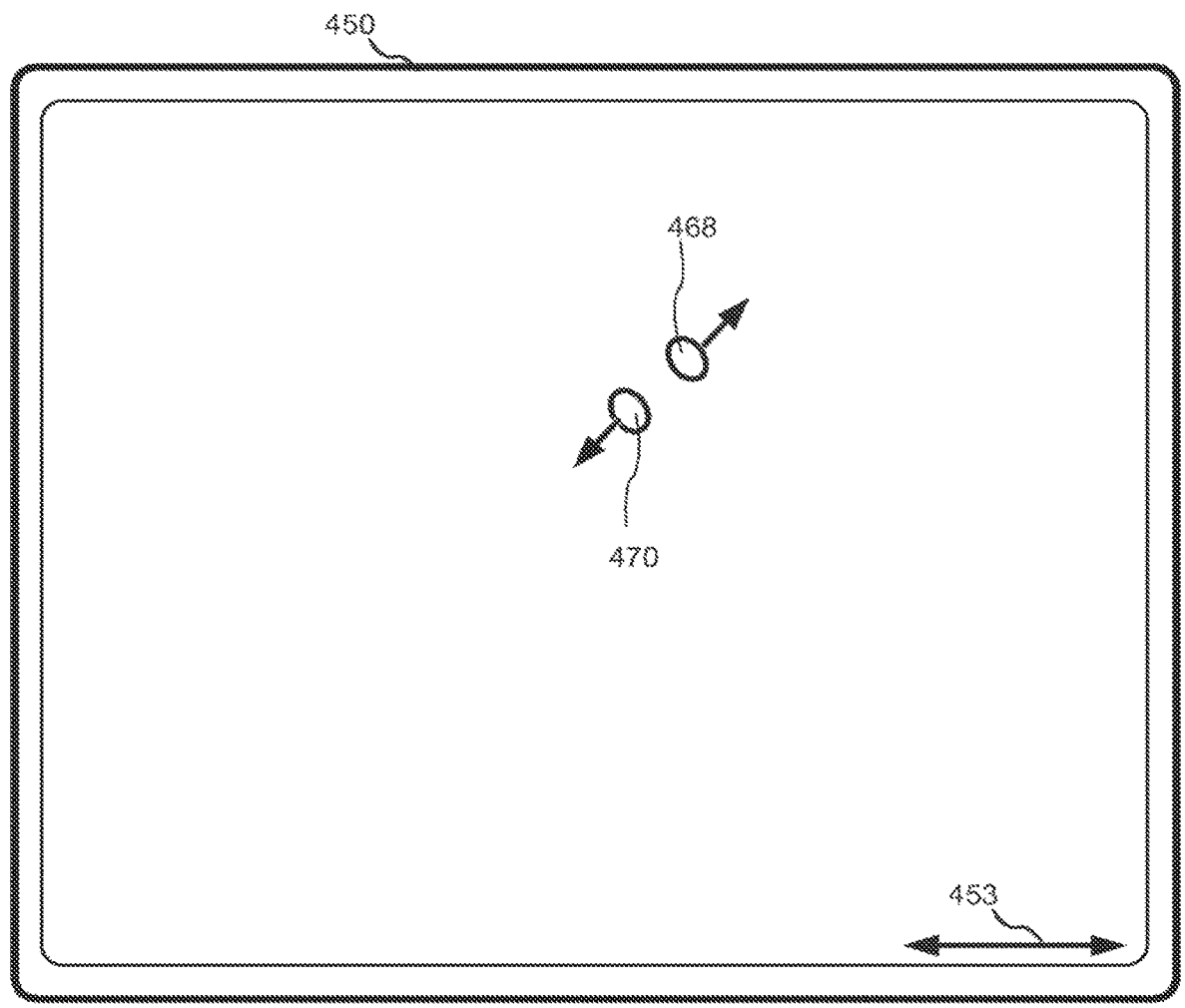
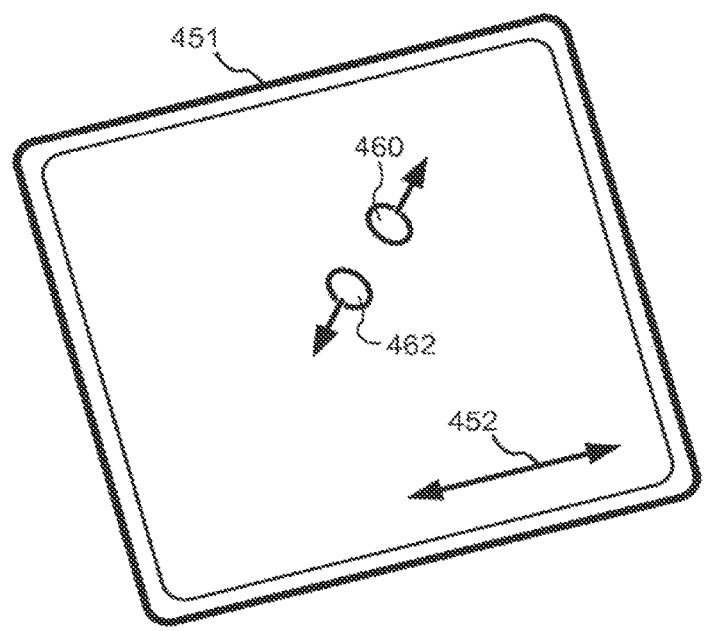
Figure 4B

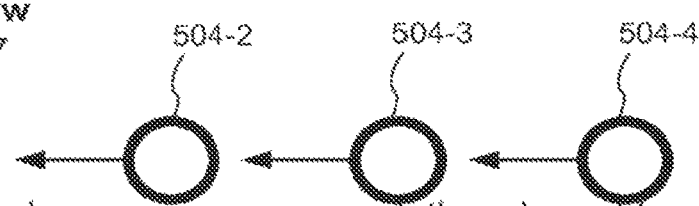

From: Abraham Lincoln

To: me

Please review
November 17

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did

602 Display, on a display, a first visual indicator that corresponds to a virtual touch

604 The first visual indicator comprises one of: a ring, donut, circle, oval, ellipse, arrow, cross, I-beam, star, or virtual finger

606 Receive a first input from an adaptive input device

608 The first input moves the first visual indicator to a predefined region of the display

610 The first input corresponds to activation of a control on the adaptive input device

612 The first input corresponds to moving a control on the adaptive input device from side-to-side

614 The adaptive input device includes a joystick and the first input corresponds to moving the joystick from side-to-side

616 In response to receiving the first input from the adaptive input device, display a first menu on the display. The first menu includes a virtual touches selection icon. In response to detecting selection of the virtual touches selection icon, a menu of virtual multitouch contacts is displayed.

618 The first menu includes icons displayed radially about a center of the first menu

620 A first user interface is displayed on the display immediately prior to receiving the first input from the adaptive input device, and the first menu is displayed over the first user interface

622 In response to receiving the first input from the adaptive input device, display the first visual indicator in a center region of the first menu

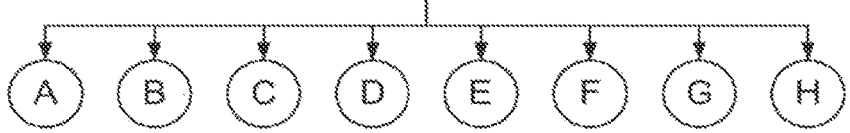

Figure 6A

624 While displaying a menu on the display, constrain movement of the first visual indicator such that the first visual indicator remains on the menu 626 While displaying the first menu on the display, receive a second input from the adaptive input device when the first visual indicator is displayed off the first menu; and, in response to the second input, cease to display the first menu 628 While displaying the first menu on the display, wait to receive input from the adaptive input device for more than a predefined time period; and, in response to waiting to receive input from the adaptive input device for more than the predefined time period, cease to display the first menu

Figure 6B

630 Detect selection of the virtual touches selection icon. In response to detecting selection of the virtual touches selection icon, display the menu of virtual multitouch contacts. The menu of virtual multitouch contacts includes a plurality of icons representing types of virtual multitouch contacts. Detect selection of a respective virtual multitouch contacts icon in the menu of virtual multitouch contacts. In response to detecting selection of the respective virtual multitouch contacts icon in the menu of virtual multitouch contacts, display one or more second visual indicators that correspond to the respective virtual multitouch contacts icon.

632 Displaying the second visual indicators includes displaying a number of visual indicators that correspond to the respective virtual multitouch contacts icon 634 Receive a second input from the adaptive input device; and, in response to receiving the second input from the adaptive input device: move the one or more second visual indicators, and perform an operation in accordance with the movement of the one or more second visual indicators.

636 While displaying the one or more second visual indicators, wait to receive input from the adaptive input device for more than a predefined time period; and, in response to waiting to receive input from the adaptive input device for more than the predefined time period, replace display of the one or more second visual indicators with display of the first visual indicator.

Figure 6C

638 Display a virtual gestures icon. Detect selection of the virtual gestures icon. In response to detecting selection of the virtual gestures icon, display a menu of virtual gestures. The menu of virtual gestures includes a plurality of icons representing types of virtual gestures. Detect selection of a respective virtual gesture icon in the menu of virtual gestures. In response to detecting selection of the respective virtual gesture icon in the menu of virtual gestures, perform an action that corresponds to the respective virtual gesture.

640 Display a virtual gestures icon. Detect selection of the virtual gestures icon. In response to detecting selection of the virtual gestures icon, display a menu of virtual gestures. The menu of virtual gestures includes a plurality of icons representing types of virtual gestures. Detect selection of a respective virtual gesture icon in the menu of virtual gestures. In response to detecting selection of the respective virtual gesture icon in the menu of virtual gestures, display a number of visual indicators that correspond to the respective virtual gesture icon. Receive a second input from the adaptive input device. In response to receiving the second input from the adaptive input device, perform an operation in accordance with the respective virtual gesture.

642 In response to receiving the second input from the adaptive input device, move the displayed visual indicators that correspond to the respective virtual gesture to simulate movement of actual contacts on the touch sensitive surface

644 Display a pinch/depinch gesture icon. Detect selection of the virtual pinch/depinch gesture icon. In response to detecting selection of the virtual pinch/depinch gesture icon, display two visual indicators that correspond to contacts in the virtual pinch/depinch gesture. Receive a second input from the adaptive input device. In response to receiving the second input from the adaptive input device, perform an operation in accordance with the virtual pinch/depinch gesture.

646 A zooming operation is performed in accordance with the virtual pinch/depinch gesture

Figure 6D

648 Display a virtual device icon. Detect selection of the virtual device icon. In response to detecting selection of the virtual device icon, display a menu of virtual device operations. The menu of virtual device operations includes a plurality of icons representing types of virtual device operations. Detect selection of a respective virtual device operation icon in the menu of virtual device operations. In response to detecting selection of the respective virtual device operation icon in the menu of virtual device operations, perform an action that corresponds to the respective virtual device operation.

650 Display a virtual device rotation icon. Detect selection of the virtual device rotation icon. In response to detecting selection of the virtual device rotation icon, display a menu of virtual device orientations. The menu of virtual device orientations includes a plurality of icons representing types of virtual device orientations. Detect selection of a respective virtual device orientation icon in the menu of virtual device orientations. In response to detecting selection of the respective virtual device orientation icon in the menu of virtual device orientations, orient the display in accordance with the respective virtual device orientation.

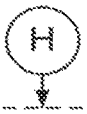

652 The device includes a home button. Display a home button icon. Detect selection of the home button icon. In response to detecting selection of the home button icon, perform an action that corresponds to activation of the home button.

1302 While in a virtual-gesture recording mode:

1304 Display a plurality of visual indicators on a display

1306 For each visual indicator in the plurality of visual indicators:

1308 Receive from an adaptive input device a respective user input for the respective visual indicator

1310 Move the respective visual indicator in accordance with the respective user input

1312 Concurrently display with the respective visual indicator a respective trail corresponding to movement of the respective visual indicator

1314 Concurrently display the plurality of respective visual indicators and a corresponding plurality of respective trails

1316 Create a user-defined virtual gesture that corresponds to the plurality of visual indicators and the movements of the plurality of visual indicators

1318 Associate the user-defined virtual gesture with a predefined operation of the electronic device

1320 Store the user-defined virtual gesture

1322 After creating the user-defined virtual gesture and associating the user-defined virtual gesture with a predefined operation of the electronic device: receive an input from the adaptive input device; and, in response to receiving the input from the adaptive input device, perform the predefined operation associated with the user-defined virtual gesture

1324 In response to receiving the input from the adaptive input device, display an animated movement of the plurality of respective visual indicators in the user-defined virtual gesture along their respective trails

Figure 13

DEVICES, METHODS, AND GRAPHICAL USER INTERFACES FOR PROVIDING CONTROL OF A TOUCH-BASED USER INTERFACE ABSENT PHYSICAL TOUCH CAPABILITIES

RELATED APPLICATION

This application is a continuation of U.S. application Ser. No. 16/939,922, filed Jul. 27, 2020, which is a continuation of U.S. application Ser. No. 16/179,545, filed Nov. 2, 2018 which is a continuation of U.S. application Ser. No. 15/061,651, filed Mar. 4, 2016, which is a continuation of U.S. application Ser. No. 13/217,654, filed Aug. 25, 2011, which claims priority to U.S. Provisional Application No. 61/493,495, filed Jun. 5, 2011, entitled "Devices, Methods, and Graphical user Interfaces for Providing Control of a touch-Based User Interface Absent Physical Touch Capabilities," the contents of which are incorporated herein by reference in their entireties.

TECHNICAL FIELD

This relates generally to electronic devices with touch-sensitive surfaces, including but not limited to electronic devices with touch-sensitive surfaces that have touch-based user interfaces.

BACKGROUND

The use of electronic devices with touch-based user interfaces (e.g., devices such as the iPhone®, iPod Touch®, and iPad® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device.

But people without fine motor skills in their hands, such as quadriplegics and those with severe cerebral palsy, find the use of devices with touch-based user interfaces difficult, if not impossible.

SUMMARY

Accordingly, there is a need to provide accessibility to devices with touch-based user interfaces to users without fine motor skills in their hands. In other words, there is a need to enable users who cannot effectively operate touch-sensitive surfaces to nevertheless operate electronic devices with touch-based user interfaces.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying, on the display, a first visual indicator that corresponds to a virtual touch; receiving a first input from an adaptive input device; and, in response to receiving the first input from the adaptive input device, displaying a first menu on the display. The first menu includes a virtual touches selection icon. In response to detecting selection of the virtual touches selection icon, a menu of virtual multitouch contacts is displayed.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying, on the display, a first visual indicator that corresponds to a virtual touch; receiving a first input from an adaptive input device; and, in response to receiving the first input from the adaptive input device, displaying a first menu on the display. The first menu includes a virtual touches selection icon. The one or more programs include instructions for, in response to detecting selection of the virtual touches selection icon, displaying a menu of virtual multitouch contacts.

In accordance with some embodiments, a computer readable storage medium has stored therein instructions, which, when executed by an electronic device with a display and a touch-sensitive surface, cause the device to: display, on the display, a first visual indicator that corresponds to a virtual touch; receive a first input from an adaptive input device; and, in response to receiving the first input from the adaptive input device, display a first menu on the display. The first menu includes a virtual touches selection icon. The instructions also cause the device to, in response to detecting selection of the virtual touches selection icon, display a menu of virtual multitouch contacts.

In accordance with some embodiments, a graphical user interface on an electronic device with a display, a touch-sensitive surface, a memory, and one or more processors to execute one or more programs stored in the memory includes a first visual indicator that corresponds to a virtual touch. In response to receiving a first input from an adaptive input device, a first menu is displayed on the display. The first menu includes a virtual touches selection icon. In response to detecting selection of the virtual touches selection icon, a menu of virtual multitouch contacts is displayed.

In accordance with some embodiments, an electronic device includes: a display; a touch-sensitive surface; means for displaying, on the display, a first visual indicator that corresponds to a virtual touch; means for receiving a first input from an adaptive input device; and means, enabled in response to receiving the first input from the adaptive input device, for displaying a first menu on the display. The first menu includes a virtual touches selection icon. The electronic device also includes means, enabled in response to detecting selection of the virtual touches selection icon, for displaying a menu of virtual multitouch contacts.

In accordance with some embodiments, an information processing apparatus for use in an electronic device with a display and a touch-sensitive surface includes: means for displaying, on the display, a first visual indicator that corresponds to a virtual touch; means for receiving a first input from an adaptive input device; and means, enabled in response to receiving the first input from the adaptive input device, for displaying a first menu on the display. The first menu includes a virtual touches selection icon. The information processing apparatus includes means, enabled in response to detecting selection of the virtual touches selection icon, for a menu of virtual multitouch contacts is displayed.

In accordance with some embodiments, a method is performed at an electronic device with a display and a touch-sensitive surface. The method includes: displaying, on the display, a first visual indicator that corresponds to a virtual touch; receiving a first input from an adaptive input device; and, in response to receiving the first input from the adaptive input device, displaying a menu of virtual multitouch contacts. The menu of virtual multitouch contacts includes a plurality of icons representing types of virtual multitouch contacts. The method also includes: detecting selection of a respective virtual multitouch contacts icon in the menu of virtual multitouch contacts; and, in response to detecting selection of the respective virtual multitouch contacts icon in the menu of virtual multitouch contacts, displaying one or more second visual indicators that correspond to the respective virtual multitouch contacts icon.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying, on the display, a first visual indicator that corresponds to a virtual touch; receiving a first input from an adaptive input device; and, in response to receiving the first input from the adaptive input device, displaying a menu of virtual multitouch contacts. The menu of virtual multitouch contacts includes a plurality of icons representing types of virtual multitouch contacts. The one or more programs also include instructions for: detecting selection of a respective virtual multitouch contacts icon in the menu of virtual multitouch contacts; and, in response to detecting selection of the respective virtual multitouch contacts icon in the menu of virtual multitouch contacts, displaying one or more second visual indicators that correspond to the respective virtual multitouch contacts icon.

In accordance with some embodiments, a computer readable storage medium has stored therein instructions, which, when executed by an electronic device with a display and a touch-sensitive surface, cause the device to: display, on the display, a first visual indicator that corresponds to a virtual touch; receive a first input from an adaptive input device, and, in response to receiving the first input from the adaptive input device, display a menu of virtual multitouch contacts. The menu of virtual multitouch contacts includes a plurality of icons representing types of virtual multitouch contacts. The instructions also cause the device to: detect selection of a respective virtual multitouch contacts icon in the menu of virtual multitouch contacts; and, in response to detecting selection of the respective virtual multitouch contacts icon in the menu of virtual multitouch contacts, display one or more second visual indicators that correspond to the respective virtual multitouch contacts icon.

In accordance with some embodiments, a graphical user interface on an electronic device with a display, a touch-sensitive surface, a memory, and one or more processors to execute one or more programs stored in the memory includes a first visual indicator that corresponds to a virtual touch. In response to receiving a first input from an adaptive input device, a menu of virtual multitouch contacts is displayed. The menu of virtual multitouch contacts includes a plurality of icons representing types of virtual multitouch contacts. In response to detecting selection of a respective virtual multitouch contacts icon in the menu of virtual multitouch contacts, one or more second visual indicators that correspond to the respective virtual multitouch contacts icon are displayed.

In accordance with some embodiments, an electronic device includes: a display; a touch-sensitive surface; means for displaying, on the display, a first visual indicator that corresponds to a virtual touch; means for receiving a first input from an adaptive input device; and means, enabled in response to receiving the first input from the adaptive input device, for displaying a menu of virtual multitouch contacts. The menu of virtual multitouch contacts includes a plurality of icons representing types of virtual multitouch contacts. The electronic device also includes: means for detecting selection of a respective virtual multitouch contacts icon in the menu of virtual multitouch contacts; and means, enabled in response to detecting selection of the respective virtual multitouch contacts icon in the menu of virtual multitouch contacts, for displaying one or more second visual indicators that correspond to the respective virtual multitouch contacts icon.

In accordance with some embodiments, an information processing apparatus for use in an electronic device with a display and a touch-sensitive surface includes: means for displaying, on the display, a first visual indicator that corresponds to a virtual touch; means for receiving a first input from an adaptive input device; and means, enabled in response to receiving the first input from the adaptive input device, for displaying a menu of virtual multitouch contacts. The menu of virtual multitouch contacts includes a plurality of icons representing types of virtual multitouch contacts. The information processing apparatus also includes: means for detecting selection of a respective virtual multitouch contacts icon in the menu of virtual multitouch contacts; and means, enabled in response to detecting selection of the respective virtual multitouch contacts icon in the menu of virtual multitouch contacts, for displaying one or more second visual indicators that correspond to the respective virtual multitouch contacts icon.

In accordance with some embodiments, a method is performed at an electronic device with a display and a touch-sensitive surface. The method includes: displaying, on the display, a first visual indicator that corresponds to a virtual touch; receiving a first input from an adaptive input device; and, in response to receiving the first input from the adaptive input device, displaying a menu of virtual gestures. The menu of virtual gestures includes a plurality of icons representing types of virtual gestures. The method includes: detecting selection of a respective virtual gesture icon in the menu of virtual gestures; and in response to detecting selection of the respective virtual gesture icon in the menu of virtual gestures, displaying a number of visual indicators that correspond to the respective virtual gesture icon. The method includes: receiving a second input from the adaptive input device; and, in response to receiving the second input from the adaptive input device, performing an operation in accordance with the respective virtual gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying, on the display, a first visual indicator that corresponds to a virtual touch; receiving a first input from an adaptive input device; and, in response to receiving the first input from the adaptive input device, displaying a menu of virtual gestures. The menu of virtual gestures includes a plurality of icons representing types of virtual gestures. The one or more programs include instructions for: detecting selection of a respective virtual gesture icon in the menu of virtual gestures; and in response to detecting selection of the respective virtual gesture icon in the menu of virtual gestures, displaying a number of visual indicators that correspond to the respective virtual gesture icon. The one or more programs include instructions for: receiving a second input from the adaptive input device; and, in response to receiving the second input from the adaptive input device, performing an operation in accordance with the respective virtual gesture.

In accordance with some embodiments, a computer readable storage medium has stored therein instructions, which, when executed by an electronic device with a display and a touch-sensitive surface, cause the device to: display, on the display, a first visual indicator that corresponds to a virtual touch; receive a first input from an adaptive input device; and, in response to receiving the first input from the adaptive input device, display a menu of virtual gestures. The menu of virtual gestures includes a plurality of icons representing types of virtual gestures. The instructions cause the device to: detect selection of a respective virtual gesture icon in the menu of virtual gestures; and, in response to detecting selection of the respective virtual gesture icon in the menu of virtual gestures, display a number of visual indicators that correspond to the respective virtual gesture icon. The instructions cause the device to: receive a second input from the adaptive input device; and, in response to receiving the second input from the adaptive input device, perform an operation in accordance with the respective virtual gesture.

In accordance with some embodiments, a graphical user interface on an electronic device with a display, a touch-sensitive surface, a memory, and one or more processors to execute one or more programs stored in the memory includes a first visual indicator that corresponds to a virtual touch. In response to receiving a first input from an adaptive input device, a menu of virtual gestures is displayed. The menu of virtual gestures includes a plurality of icons representing types of virtual gestures. In response to detecting selection of a respective virtual gesture icon in the menu of virtual gestures, a number of visual indicators that correspond to the respective virtual gesture icon is displayed. In response to receiving a second input from the adaptive input device, an operation is performed in accordance with the respective virtual gesture.

In accordance with some embodiments, an electronic device includes: a display; a touch-sensitive surface; means for displaying, on the display, a first visual indicator that corresponds to a virtual touch; means for receiving a first input from an adaptive input device; and means, enabled in response to receiving the first input from the adaptive input device, for displaying a menu of virtual gestures. The menu of virtual gestures includes a plurality of icons representing types of virtual gestures. The electronic device includes: means for detecting selection of a respective virtual gesture icon in the menu of virtual gestures; and means, enabled in response to detecting selection of the respective virtual gesture icon in the menu of virtual gestures, for displaying a number of visual indicators that correspond to the respective virtual gesture icon. The electronic device includes: means for receiving a second input from the adaptive input device; and means, enabled in response to receiving the second input from the adaptive input device, for performing an operation in accordance with the respective virtual gesture.

In accordance with some embodiments, an information processing apparatus for use in an electronic device with a display and a touch-sensitive surface includes: means for displaying, on the display, a first visual indicator that corresponds to a virtual touch; means for receiving a first input from an adaptive input device, and means, enabled in response to receiving the first input from the adaptive input device, for displaying a menu of virtual gestures, the menu of virtual gestures including a plurality of icons representing types of virtual gestures. The information processing apparatus includes: means for detecting selection of a respective virtual gesture icon in the menu of virtual gestures; and means, enabled in response to detecting selection of the respective virtual gesture icon in the menu of virtual gestures, for displaying a number of visual indicators that correspond to the respective virtual gesture icon. The information processing apparatus includes: means for receiving a second input from the adaptive input device; and means, enabled in response to receiving the second input from the adaptive input device, for performing an operation in accordance with the respective virtual gesture.

In accordance with some embodiments, a method is performed at an electronic device with a display and a touch-sensitive surface. The method includes: displaying a pinch/depinch gesture icon; detecting selection of the virtual pinch/depinch gesture icon; and, in response to detecting selection of the virtual pinch/depinch gesture icon, displaying two visual indicators that correspond to contacts in the virtual pinch/depinch gesture. The method also includes: receiving an input from an adaptive input device; and, in response to receiving the input from the adaptive input device, performing a zooming operation in accordance with the respective virtual pinch/depinch gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a pinch/depinch gesture icon; detecting selection of the virtual pinch/depinch gesture icon; and, in response to detecting selection of the virtual pinch/depinch gesture icon, displaying two visual indicators that correspond to contacts in the virtual pinch/depinch gesture. The one or more programs include instructions for: receiving an input from an adaptive input device; and, in response to receiving the input from the adaptive input device, performing a zooming operation in accordance with the respective virtual pinch/depinch gesture.

In accordance with some embodiments, a computer readable storage medium has stored therein instructions, which, when executed by an electronic device with a display and a touch-sensitive surface, cause the device to: display a pinch/depinch gesture icon; detect selection of the virtual pinch/depinch gesture icon; and, in response to detecting selection of the virtual pinch/depinch gesture icon, display two visual indicators that correspond to contacts in the virtual pinch/depinch gesture. The instructions also cause the device to: receive an input from an adaptive input device; and, in response to receiving the input from the adaptive input device, perform a zooming operation in accordance with the respective virtual pinch/depinch gesture.

In accordance with some embodiments, a graphical user interface on an electronic device with a display, a touch-sensitive surface, a memory, and one or more processors to execute one or more programs stored in the memory includes a pinch/depinch gesture icon. In response to detecting selection of the virtual pinch/depinch gesture icon, two visual indicators that correspond to contacts in the virtual pinch/depinch gesture are displayed. In response to receiving an input from an adaptive input device, a zooming operation is performed in accordance with the respective virtual pinch/depinch gesture.

In accordance with some embodiments, an electronic device includes: a display; a touch-sensitive surface; means for displaying a pinch/depinch gesture icon; means for detecting selection of the virtual pinch/depinch gesture icon; and means, enabled in response to detecting selection of the virtual pinch/depinch gesture icon, for displaying two visual indicators that correspond to contacts in the virtual pinch/depinch gesture. The electronic device includes: means for receiving an input from an adaptive input device; and means, enabled in response to receiving the input from the adaptive input device, for performing a zooming operation in accordance with the respective virtual pinch/depinch gesture.

In accordance with some embodiments, an information processing apparatus for use in an electronic device with a display and a touch-sensitive surface includes: means for displaying a pinch/depinch gesture icon; means for detecting selection of the virtual pinch/depinch gesture icon; and means, enabled in response to detecting selection of the virtual pinch/depinch gesture icon, for displaying two visual indicators that correspond to contacts in the virtual pinch/depinch gesture. The information processing apparatus also includes: means for receiving an input from an adaptive input device; and means, enabled in response to receiving the input from the adaptive input device, for performing a zooming operation in accordance with the respective virtual pinch/depinch gesture.

In accordance with some embodiments, a method is performed at an electronic device with a display and a touch-sensitive surface. The method includes: displaying a virtual gestures icon; detecting selection of the virtual gestures icon; and, in response to detecting selection of the virtual gestures icon, displaying a menu of virtual gestures. The menu of virtual gestures includes a plurality of icons representing types of virtual gestures. The method also includes: detecting selection of a respective virtual gesture icon in the menu of virtual gestures; and, in response to detecting selection of the respective virtual gesture icon in the menu of virtual gestures, performing an action that corresponds to the respective virtual gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a virtual gestures icon; detecting selection of the virtual gestures icon; and, in response to detecting selection of the virtual gestures icon, displaying a menu of virtual gestures. The menu of virtual gestures includes a plurality of icons representing types of virtual gestures. The one or more programs also include instructions for: detecting selection of a respective virtual gesture icon in the menu of virtual gestures; and, in response to detecting selection of the respective virtual gesture icon in the menu of virtual gestures, performing an action that corresponds to the respective virtual gesture.

In accordance with some embodiments, a computer readable storage medium has stored therein instructions, which, when executed by an electronic device with a display and a touch-sensitive surface, cause the device to: display a virtual gestures icon; detect selection of the virtual gestures icon; and, in response to detecting selection of the virtual gestures icon, display a menu of virtual gestures. The menu of virtual gestures includes a plurality of icons representing types of virtual gestures. The instructions also cause the device to: detect selection of a respective virtual gesture icon in the menu of virtual gestures; and, in response to detecting selection of the respective virtual gesture icon in the menu of virtual gestures, perform an action that corresponds to the respective virtual gesture.

In accordance with some embodiments, a graphical user interface on an electronic device with a display, a touch-sensitive surface, a memory, and one or more processors to execute one or more programs stored in the memory includes a virtual gestures icon. In response to detecting selection of the virtual gestures icon, a menu of virtual gestures is displayed. The menu of virtual gestures includes a plurality of icons representing types of virtual gestures. In response to detecting selection of a respective virtual gesture icon in the menu of virtual gestures, an action that corresponds to the respective virtual gesture is performed.

In accordance with some embodiments, an electronic device includes: a display; a touch-sensitive surface; means for displaying a virtual gestures icon; means for detecting selection of the virtual gestures icon; and means, enabled in response to detecting selection of the virtual gestures icon, for displaying a menu of virtual gestures. The menu of virtual gestures includes a plurality of icons representing types of virtual gestures. The electronic device includes: means for detecting selection of a respective virtual gesture icon in the menu of virtual gestures; and means, enabled in response to detecting selection of the respective virtual gesture icon in the menu of virtual gestures, for performing an action that corresponds to the respective virtual gesture.

In accordance with some embodiments, an information processing apparatus for use in an electronic device with a display and a touch-sensitive surface includes: means for displaying a virtual gestures icon; means for detecting selection of the virtual gestures icon; and means, enabled in response to detecting selection of the virtual gestures icon, for displaying a menu of virtual gestures. The menu of virtual gestures includes a plurality of icons representing types of virtual gestures. The information processing apparatus includes: means for detecting selection of a respective virtual gesture icon in the menu of virtual gestures; and means, enabled in response to detecting selection of the respective virtual gesture icon in the menu of virtual gestures, for performing an action that corresponds to the respective virtual gesture.

In accordance with some embodiments, a method is performed at an electronic device with a display and a touch-sensitive surface. The method includes: displaying a virtual device icon; detecting selection of the virtual device icon; and, in response to detecting selection of the virtual device icon, displaying a menu of virtual device operations. The menu of virtual device operations includes a plurality of icons representing types of virtual device operations. The method also includes: detecting selection of a respective virtual device operation icon in the menu of virtual device operations; and, in response to detecting selection of the respective virtual device operation icon in the menu of virtual device operations, performing an action that corresponds to the respective virtual device operation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a virtual device icon; detecting selection of the virtual device icon; and, in response to detecting selection of the virtual device icon, displaying a menu of virtual device operations. The menu of virtual device operations includes a plurality of icons representing types of virtual device operations. The one or more programs also include instructions for: detecting selection of a respective virtual device operation icon in the menu of virtual device operations; and, in response to detecting selection of the respective virtual device operation icon in the menu of virtual device operations, performing an action that corresponds to the respective virtual device operation.

In accordance with some embodiments, a computer readable storage medium has stored therein instructions, which, when executed by an electronic device with a display and a touch-sensitive surface, cause the device to: display a virtual device icon; detect selection of the virtual device icon; and, in response to detecting selection of the virtual device icon, display a menu of virtual device operations. The menu of virtual device operations includes a plurality of icons representing types of virtual device operations. The instructions also cause the device to: detect selection of a respective virtual device operation icon in the menu of virtual device operations; and, in response to detecting selection of the respective virtual device operation icon in the menu of virtual device operations, perform an action that corresponds to the respective virtual device operation.

In accordance with some embodiments, a graphical user interface on an electronic device with a display, a touch-sensitive surface, a memory, and one or more processors to execute one or more programs stored in the memory includes a virtual device icon. In response to detecting selection of the virtual device icon, a menu of virtual device operations is displayed. The menu of virtual device operations includes a plurality of icons representing types of virtual device operations. In response to detecting selection of a respective virtual device operation icon in the menu of virtual device operations, an action that corresponds to the respective virtual device operation is performed.

In accordance with some embodiments, an electronic device includes: a display; a touch-sensitive surface; means for displaying a virtual device icon; means for detecting selection of the virtual device icon; and means, enabled in response to detecting selection of the virtual device icon, for displaying a menu of virtual device operations. The menu of virtual device operations includes a plurality of icons representing types of virtual device operations. The electronic device also includes: means for detecting selection of a respective virtual device operation icon in the menu of virtual device operations; and means, enabled in response to detecting selection of the respective virtual device operation icon in the menu of virtual device operations, for performing an action that corresponds to the respective virtual device operation.

In accordance with some embodiments, an information processing apparatus for use in an electronic device with a display and a touch-sensitive surface includes: means for displaying a virtual device icon; means for detecting selection of the virtual device icon; means, enabled in response to detecting selection of the virtual device icon, for displaying a menu of virtual device operations. The menu of virtual device operations includes a plurality of icons representing types of virtual device operations. The information processing apparatus also includes: means for detecting selection of a respective virtual device operation icon in the menu of virtual device operations; and means, enabled in response to detecting selection of the respective virtual device operation icon in the menu of virtual device operations, for performing an action that corresponds to the respective virtual device operation.

In accordance with some embodiments, a method is performed at an electronic device with a display and a touch-sensitive surface. The method includes: displaying a virtual device rotation icon, detecting selection of the virtual device rotation icon, and, in response to detecting selection of the virtual device rotation icon, displaying a menu of virtual device orientations. The menu of virtual device orientations includes a plurality of icons representing types of virtual device orientations. The method also includes: detecting selection of a respective virtual device orientation icon in the menu of virtual device orientations, and, in response to detecting selection of the respective virtual device orientation icon in the menu of virtual device orientations, orienting the display in accordance with the respective virtual device orientation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a virtual device rotation icon; detecting selection of the virtual device rotation icon; and, in response to detecting selection of the virtual device rotation icon, displaying a menu of virtual device orientations. The menu of virtual device orientations includes a plurality of icons representing types of virtual device orientations. The one or more programs include instructions for: detecting selection of a respective virtual device orientation icon in the menu of virtual device orientations; and, in response to detecting selection of the respective virtual device orientation icon in the menu of virtual device orientations, orienting the display in accordance with the respective virtual device orientation.

In accordance with some embodiments, a computer readable storage medium has stored therein instructions, which, when executed by an electronic device with a display and a touch-sensitive surface, cause the device to: display a virtual device rotation icon; detect selection of the virtual device rotation icon; and, in response to detecting selection of the virtual device rotation icon, display a menu of virtual device orientations. The menu of virtual device orientations includes a plurality of icons representing types of virtual device orientations. The instructions also cause the device to: detect selection of a respective virtual device orientation icon in the menu of virtual device orientations; and, in response to detecting selection of the respective virtual device orientation icon in the menu of virtual device orientations, orient the display in accordance with the respective virtual device orientation.

In accordance with some embodiments, a graphical user interface on an electronic device with a display, a touch-sensitive surface, a memory, and one or more processors to execute one or more programs stored in the memory includes a virtual device rotation icon. In response to detecting selection of the virtual device rotation icon, a menu of virtual device orientations is displayed. The menu of virtual device orientations includes a plurality of icons representing types of virtual device orientations. In response to detecting selection of a respective virtual device orientation icon in the menu of virtual device orientations, the display is oriented in accordance with the respective virtual device orientation.

In accordance with some embodiments, an electronic device includes; a display; a touch-sensitive surface; means for displaying a virtual device rotation icon; means for detecting selection of the virtual device rotation icon; and means, enabled in response to detecting selection of the virtual device rotation icon, for displaying a menu of virtual device orientations. The menu of virtual device orientations includes a plurality of icons representing types of virtual device orientations. The electronic device also includes: means for detecting selection of a respective virtual device orientation icon in the menu of virtual device orientations; and means, enabled in response to detecting selection of the respective virtual device orientation icon in the menu of virtual device orientations, for orienting the display in accordance with the respective virtual device orientation.

In accordance with some embodiments, an information processing apparatus for use in an electronic device with a display and a touch-sensitive surface includes: means for displaying a virtual device rotation icon; means for detecting selection of the virtual device rotation icon; and means, enabled in response to detecting selection of the virtual device rotation icon, for displaying a menu of virtual device orientations. The menu of virtual device orientations includes a plurality of icons representing types of virtual device orientations. The information processing apparatus also includes: means for detecting selection of a respective virtual device orientation icon in the menu of virtual device orientations; and means, enabled in response to detecting selection of the respective virtual device orientation icon in the menu of virtual device orientations, for orienting the display in accordance with the respective virtual device orientation.

In accordance with some embodiments, a method is performed at an electronic device with a display and a touch-sensitive surface. The method includes, while in a virtual-gesture recording mode, displaying a plurality of visual indicators on the display. The method includes, for each visual indicator in the plurality of visual indicators, receiving from an adaptive input device a respective user input for the respective visual indicator; moving the respective visual indicator in accordance with the respective user input; and concurrently displaying with the respective visual indicator a respective trail corresponding to movement of the respective visual indicator. The method also includes: creating a user-defined virtual gesture that corresponds to the plurality of visual indicators and the movements of the plurality of visual indicators; associating the user-defined virtual gesture with a predefined operation of the electronic device; and storing the user-defined virtual gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for, while in a virtual-gesture recording mode, displaying a plurality of visual indicators on the display. The one or more programs include instructions for, for each visual indicator in the plurality of visual indicators: receiving from an adaptive input device a respective user input for the respective visual indicator; moving the respective visual indicator in accordance with the respective user input; and concurrently displaying with the respective visual indicator a respective trail corresponding to movement of the respective visual indicator. The one or more programs also include instructions for: creating a user-defined virtual gesture that corresponds to the plurality of visual indicators and the movements of the plurality of visual indicators; associating the user-defined virtual gesture with a predefined operation of the electronic device; and storing the user-defined virtual gesture.

In accordance with some embodiments, a computer readable storage medium has stored therein instructions, which, when executed by an electronic device with a display and a touch-sensitive surface, cause the device to, while in a virtual-gesture recording mode, display a plurality of visual indicators on the display. The instructions cause the device to, for each visual indicator in the plurality of visual indicators: receive from an adaptive input device a respective user input for the respective visual indicator; move the respective visual indicator in accordance with the respective user input; and concurrently display with the respective visual indicator a respective trail corresponding to movement of the respective visual indicator. The instructions also cause the device to: create a user-defined virtual gesture that corresponds to the plurality of visual indicators and the movements of the plurality of visual indicators; associate the user-defined virtual gesture with a predefined operation of the electronic device; and store the user-defined virtual gesture.

In accordance with some embodiments, a graphical user interface on an electronic device with a display, a touch-sensitive surface, a memory, and one or more processors to execute one or more programs stored in the memory includes a plurality of visual indicators on the display while in a virtual-gesture recording mode. For each visual indicator in the plurality of visual indicators: a respective user input for the respective visual indicator is received from an adaptive input device; the respective visual indicator is moved in accordance with the respective user input; and a respective trail corresponding to movement of the respective visual indicator is concurrently displayed with the respective visual indicator. A user-defined virtual gesture that corresponds to the plurality of visual indicators and the movements of the plurality of visual indicators is created. The user-defined virtual gesture is associated with a predefined operation of the electronic device. The user-defined virtual gesture is stored.

In accordance with some embodiments, an electronic device includes: a display; a touch-sensitive surface; means, enabled while in a virtual-gesture recording mode, for displaying a plurality of visual indicators on the display. The electronic device includes, for each visual indicator in the plurality of visual indicators: means for receiving from an adaptive input device a respective user input for the respective visual indicator; means for moving the respective visual indicator in accordance with the respective user input; and means for concurrently displaying with the respective visual indicator a respective trail corresponding to movement of the respective visual indicator. The electronic device also includes: means for creating a user-defined virtual gesture that corresponds to the plurality of visual indicators and the movements of the plurality of visual indicators; means for associating the user-defined virtual gesture with a predefined operation of the electronic device; and means for storing the user-defined virtual gesture.

In accordance with some embodiments, an information processing apparatus for use in an electronic device with a display and a touch-sensitive surface includes: means, enabled while in a virtual-gesture recording mode, for displaying a plurality of visual indicators on the display. The information processing apparatus includes, for each visual indicator in the plurality of visual indicators: means for receiving from an adaptive input device a respective user input for the respective visual indicator; means for moving the respective visual indicator in accordance with the respective user input; and means for concurrently displaying with the respective visual indicator a respective trail corresponding to movement of the respective visual indicator. The information processing apparatus also includes: means for creating a user-defined virtual gesture that corresponds to the plurality of visual indicators and the movements of the plurality of visual indicators; means for associating the user-defined virtual gesture with a predefined operation of the electronic device; and means for storing the user-defined virtual gesture.

In accordance with some embodiments, an electronic device includes a display unit configured to display a first visual indicator that corresponds to a virtual touch; a touch-sensitive surface unit configured to receive finger contacts; and a processing unit coupled to the display unit and the touch-sensitive surface unit. The processing unit is configured to: receive a first input from an adaptive input device; and, in response to receiving the first input from the adaptive input device, enable display of a first menu on the display unit. The first menu includes a virtual touches selection icon. In response to detecting selection of the virtual touches selection icon, a menu of virtual multitouch contacts is displayed.

In accordance with some embodiments, an electronic device includes a display unit configured to display a first visual indicator that corresponds to a virtual touch; a touch-sensitive surface unit configured to receive finger contacts; and a processing unit coupled to the display unit and the touch-sensitive surface unit. The processing unit is configured to: receive a first input from an adaptive input device; and, in response to receiving the first input from the adaptive input device, enable display of a menu of virtual multitouch contacts. The menu of virtual multitouch contacts includes a plurality of icons representing types of virtual multitouch contacts. The processing unit is configured to: detect selection of a respective virtual multitouch contacts icon in the menu of virtual multitouch contacts; and, in response to detecting selection of the respective virtual multitouch contacts icon in the menu of virtual multitouch contacts, enable display of one or more second visual indicators that correspond to the respective virtual multitouch contacts icon.

In accordance with some embodiments, an electronic device includes a display unit configured to display a first visual indicator that corresponds to a virtual touch; a touch-sensitive surface unit configured to receive finger contacts; and a processing unit coupled to the display unit and the touch-sensitive surface unit. The processing unit is configured to: receive a first input from an adaptive input device; and, in response to receiving the first input from the adaptive input device, enable display of a menu of virtual gestures. The menu of virtual gestures includes a plurality of icons representing types of virtual gestures. The processing unit is configured to: detect selection of a respective virtual gesture icon in the menu of virtual gestures; and, in response to detecting selection of the respective virtual gesture icon in the menu of virtual gestures, enable display of a number of visual indicators that correspond to the respective virtual gesture icon. The processing unit is configured to: receive a second input from the adaptive input device; and, in response to receiving the second input from the adaptive input device, perform an operation in accordance with the respective virtual gesture.

In accordance with some embodiments, an electronic device includes a display unit configured to display a pinch/depinch gesture icon; a touch-sensitive surface unit configured to receive finger contacts; and a processing unit coupled to the display unit and the touch-sensitive surface unit. The processing unit is configured to: detect selection of the virtual pinch/depinch gesture icon; and, in response to detecting selection of the virtual pinch/depinch gesture icon, enable display of two visual indicators that correspond to contacts in the virtual pinch/depinch gesture. The processing unit is configured to: receive an input from an adaptive input device; and, in response to receiving the input from the adaptive input device, perform a zooming operation in accordance with the respective virtual pinch/depinch gesture.

In accordance with some embodiments, an electronic device includes a display unit configured to display a virtual gestures icon; a touch-sensitive surface unit configured to receive finger contacts; and a processing unit coupled to the display unit and the touch-sensitive surface unit. The processing unit is configured to: detect selection of the virtual gestures icon; and, in response to detecting selection of the virtual gestures icon, enable display of a menu of virtual gestures. The menu of virtual gestures includes a plurality of icons representing types of virtual gestures. The processing unit is configured to: detect selection of a respective virtual gesture icon in the menu of virtual gestures; and, in response to detecting selection of the respective virtual gesture icon in the menu of virtual gestures, perform an action that corresponds to the respective virtual gesture.

In accordance with some embodiments, an electronic device includes a display unit configured to display a virtual device icon; a touch-sensitive surface unit configured to receive finger contacts; and a processing unit coupled to the display unit and the touch-sensitive surface unit. The processing unit is configured to: detect selection of the virtual device icon; and, in response to detecting selection of the virtual device icon, enable display of a menu of virtual device operations. The menu of virtual device operations includes a plurality of icons representing types of virtual device operations. The processing unit is configured to: detect selection of a respective virtual device operation icon in the menu of virtual device operations; and, in response to detecting selection of the respective virtual device operation icon in the menu of virtual device operations, perform an action that corresponds to the respective virtual device operation.

In accordance with some embodiments, an electronic device includes a display unit configured to display a virtual device rotation icon; a touch-sensitive surface unit configured to receive finger contacts; and a processing unit coupled to the display unit and the touch-sensitive surface unit. The processing unit is configured to: detect selection of the virtual device rotation icon; and, in response to detecting selection of the virtual device rotation icon, enable display of a menu of virtual device orientations. The menu of virtual device orientations includes a plurality of icons representing types of virtual device orientations. The processing unit is configured to: detect selection of a respective virtual device orientation icon in the menu of virtual device orientations; and, in response to detecting selection of the respective virtual device orientation icon in the menu of virtual device orientations, orient the display in accordance with the respective virtual device orientation.

In accordance with some embodiments, an electronic device includes a display unit configured to display visual indicators; a touch-sensitive surface unit configured to receive finger contacts; and a processing unit coupled to the display unit and the touch-sensitive surface unit. The processing unit is configured to, while in a virtual-gesture recording mode, enable display of a plurality of visual indicators on the display unit. The processing unit is configured to, for each visual indicator in the plurality of visual indicators: receive from an adaptive input device a respective user input for the respective visual indicator; move the respective visual indicator in accordance with the respective user input; and enable concurrent display of the respective visual indicator and a respective trail corresponding to movement of the respective visual indicator. The processing unit is configured to: create a user-defined virtual gesture that corresponds to the plurality of visual indicators and the movements of the plurality of visual indicators; associate the user-defined virtual gesture with a predefined operation of the electronic device; and store the user-defined virtual gesture.

Thus, electronic devices with touch-based user interfaces are provided with methods and interfaces that make these devices accessible to users without fine motor skills in their hands.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6E are flow diagrams illustrating a method of providing accessibility to a touch-based user interface in accordance with some embodiments.

FIG. 13 is a flow diagram illustrating a method of creating a user-defined virtual gesture in accordance with some embodiments.

DESCRIPTION OF EMBODIMENTS

Described below are devices and methods that enable users who cannot effectively operate touch-sensitive surfaces to nevertheless operate electronic devices with touch-based user interfaces. The methods described herein include:
  Using visual indicators that correspond to virtual touches to emulate actual touches;
  Using a menu of virtual multitouch contacts in conjunction with input from an adaptive input device (e.g., a joystick) to select the type of multitouch contact being emulated;
  Using a menu of virtual gestures in conjunction with input from an adaptive input device to select and emulate actual gestures on a touch-sensitive surface;
  Using two visual indicators (which correspond to two virtual touches) in conjunction with input from an adaptive input device to emulate pinch/depinch gestures on a touch-sensitive surface;
  Using a menu of virtual device operations in conjunction with input from an adaptive input device to select and emulate operations that are normally performed via activation of physical controls on the electronic device (e.g., mute switches, lock switches, volume buttons) or in response to activity detected by an accelerometer (e.g., device shaking or device rotation);
  Using a menu of virtual device orientations in conjunction with input from an adaptive input device to control the display orientation; and
  Using input from an adaptive input device to create user-defined, custom virtual gestures.

These methods make operations that are designed for users interacting with touch-sensitive surfaces (e.g., single touch and multitouch gestures) accessible to users who do not use touch-sensitive surfaces.

Figure 2:
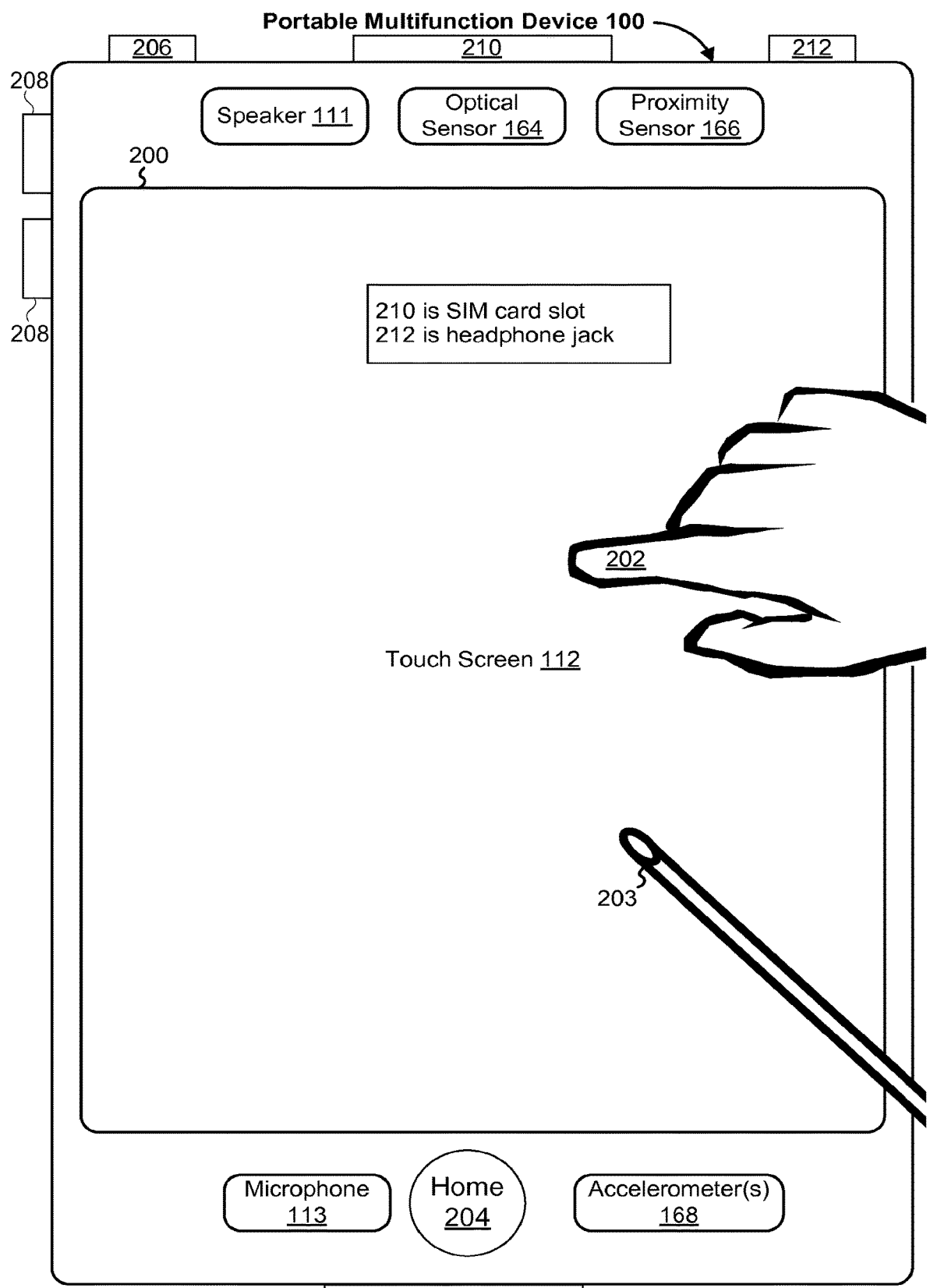
FIG. 2 illustrates a portable multifunction device having a touch screen in accordance with some embodiments.
Figure 3:
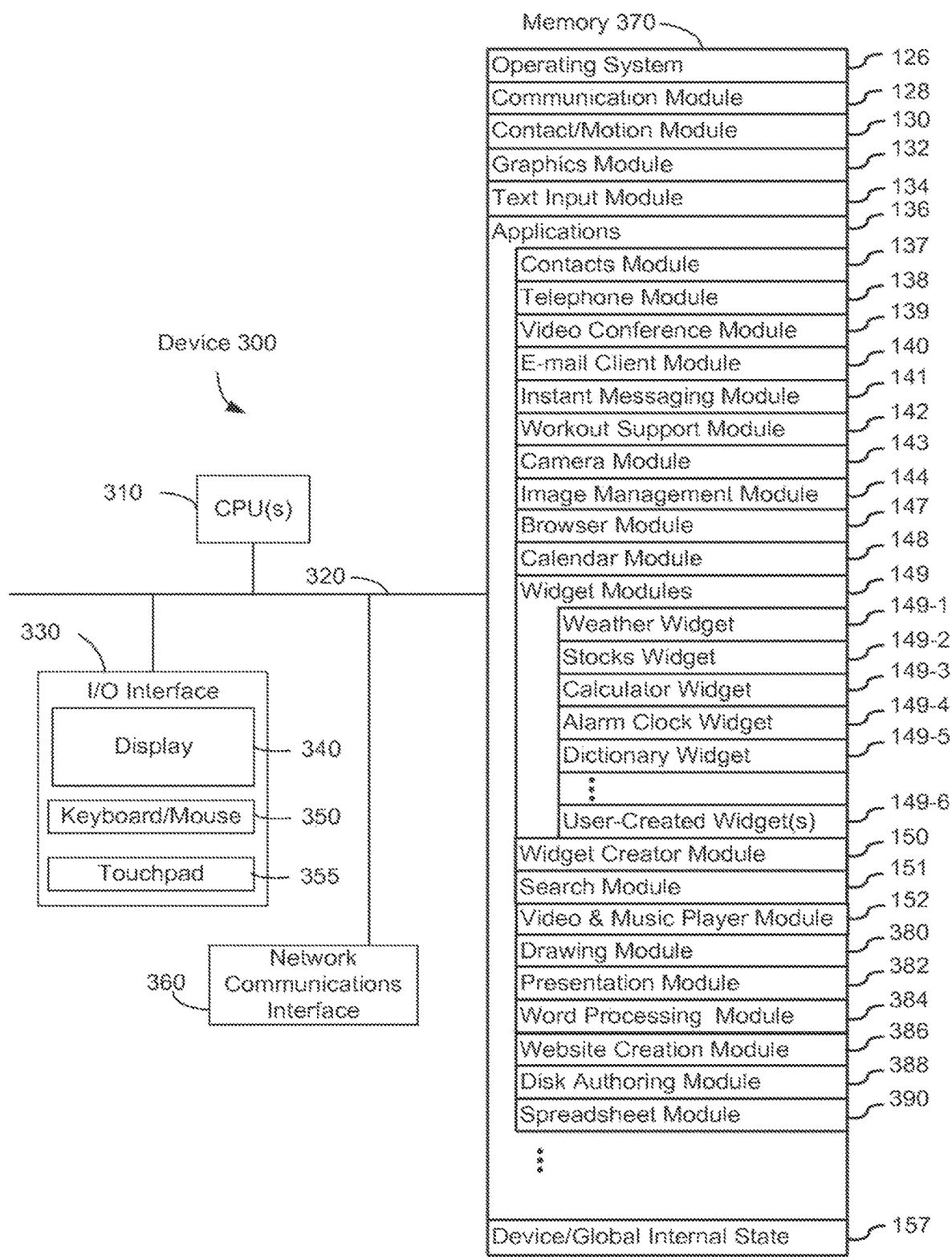
FIG. 3 is a block diagram of an exemplary multifunction device with a display and a touch-sensitive surface in accordance with some embodiments.
Figure 4A:
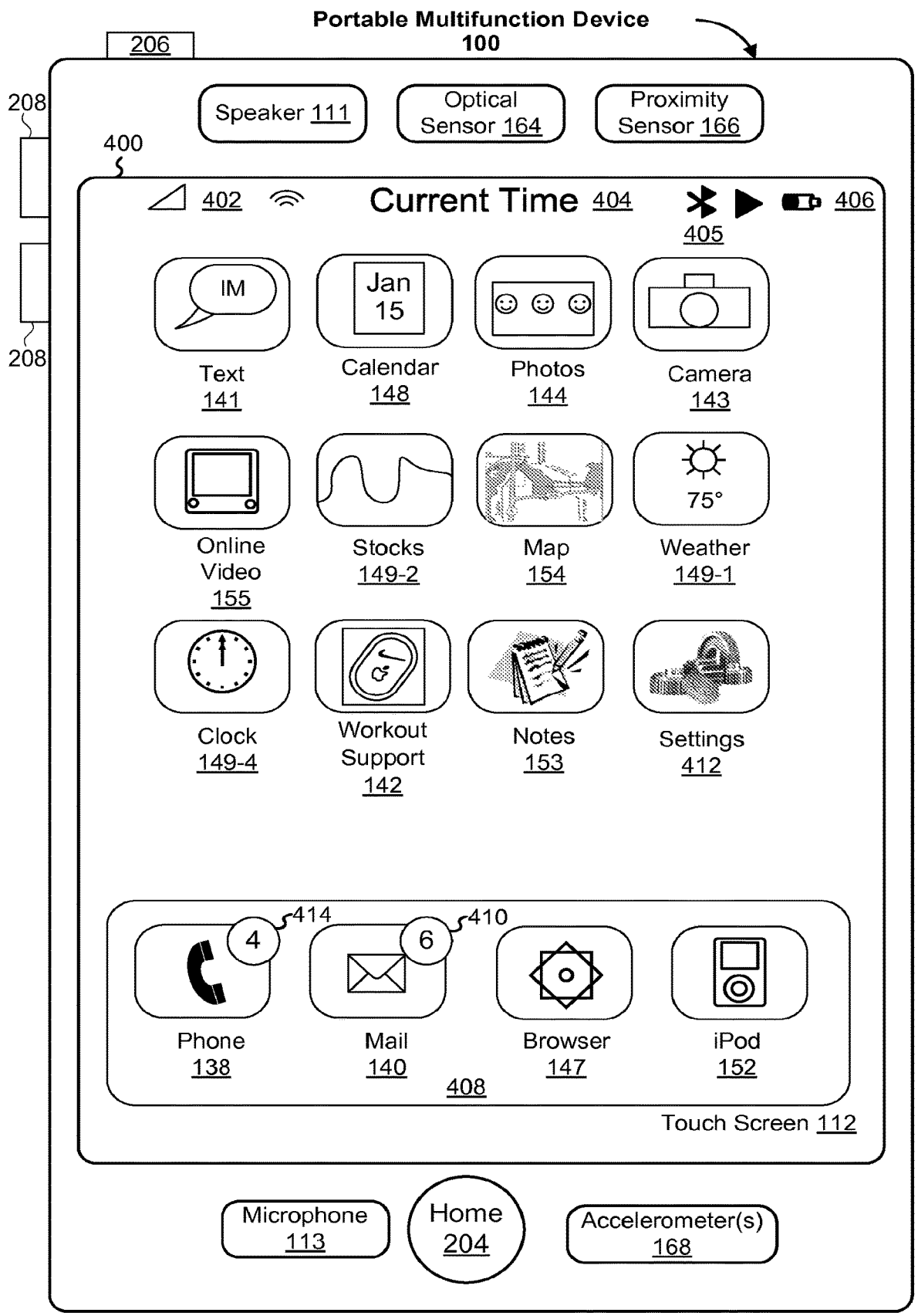
FIG. 4A illustrates an exemplary user interface for a menu of applications on a portable multifunction device in accordance with some embodiments.
Figure 4C:
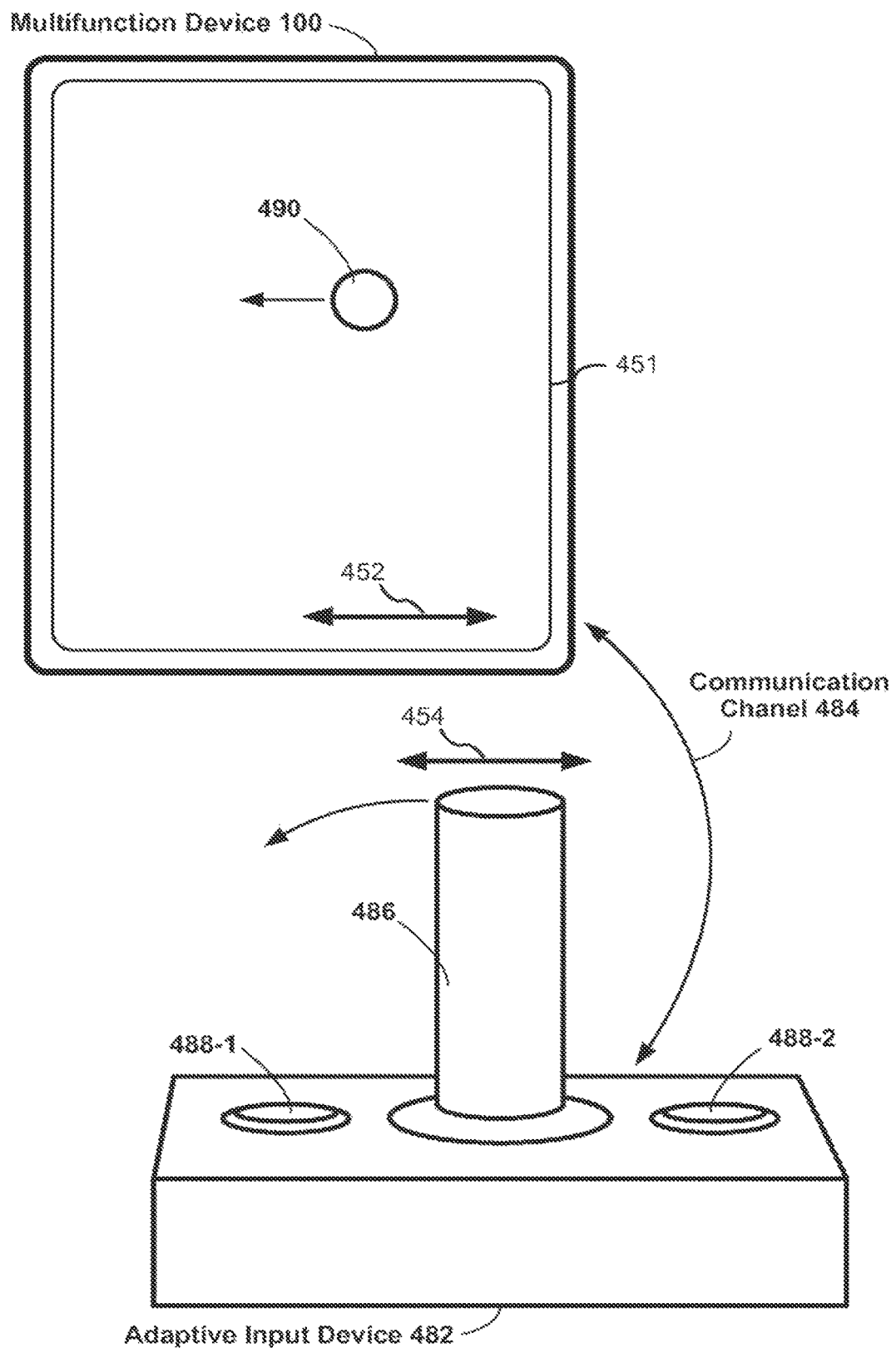
FIG. 4C illustrates an exemplary adaptive input device for a multifunction device in accordance with some embodiments.
Figure 5A:
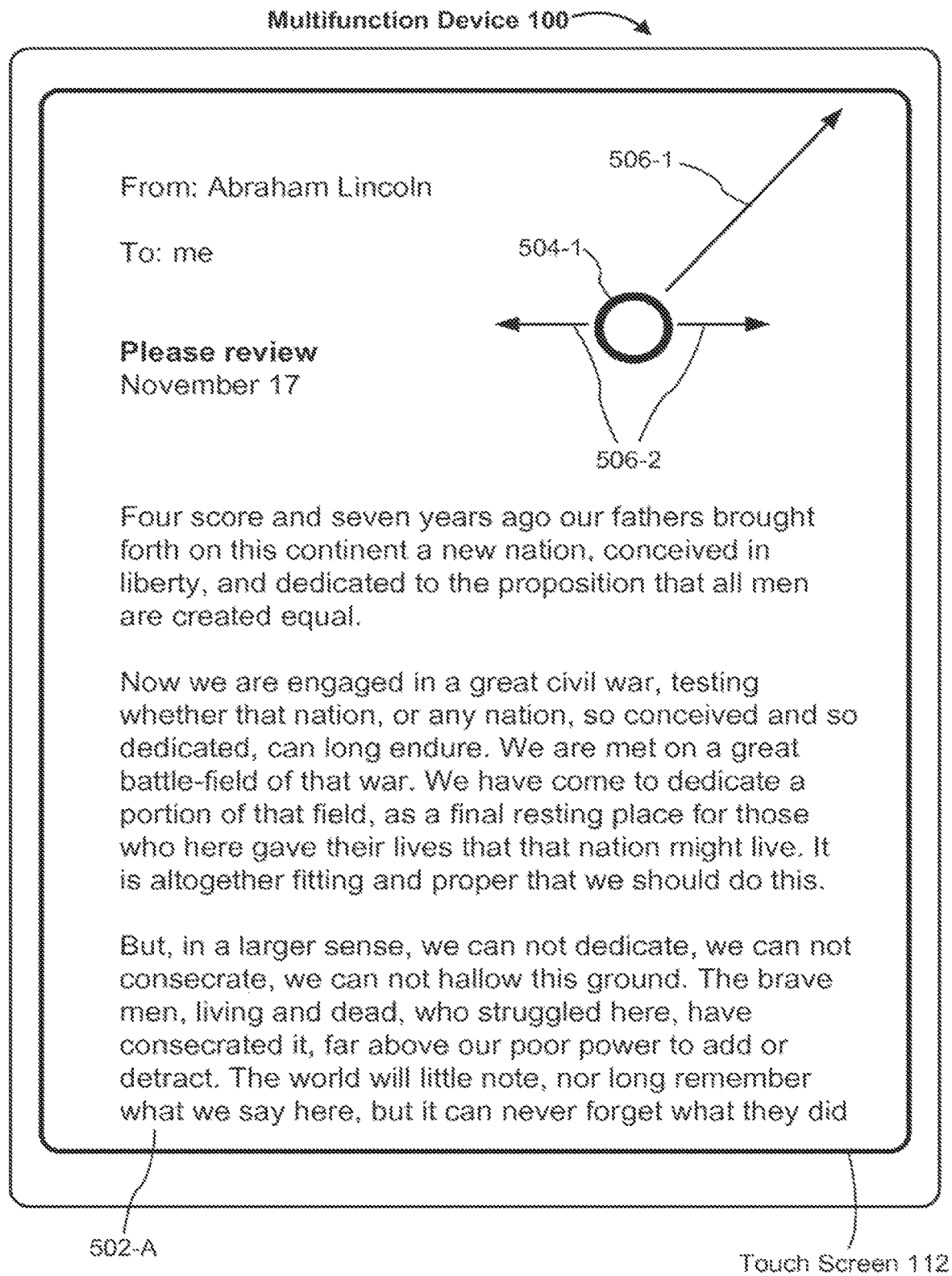
FIGS. 5A-5AC illustrate exemplary user interfaces for providing accessibility to a touch-based user interface in accordance with some embodiments.

Below, FIGS. 1A-1B, 2, and 3 provide a description of exemplary devices. FIG. 4C provides a description of an exemplary device coupled with an adaptive input device. FIGS. 4A-4B and 5A-5AC illustrate exemplary user interfaces for providing accessibility to a touch-based user interface. FIGS. 6A-6E and 7-13 are flow diagrams illustrating methods of providing accessibility to a touch-based user interface. The user interfaces in FIGS. 5A-5AC are used to illustrate the processes in FIGS. 6A-6E and 7-13.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include or be connected to (e.g., by wired or wireless communication channel 484, FIG. 4C) one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
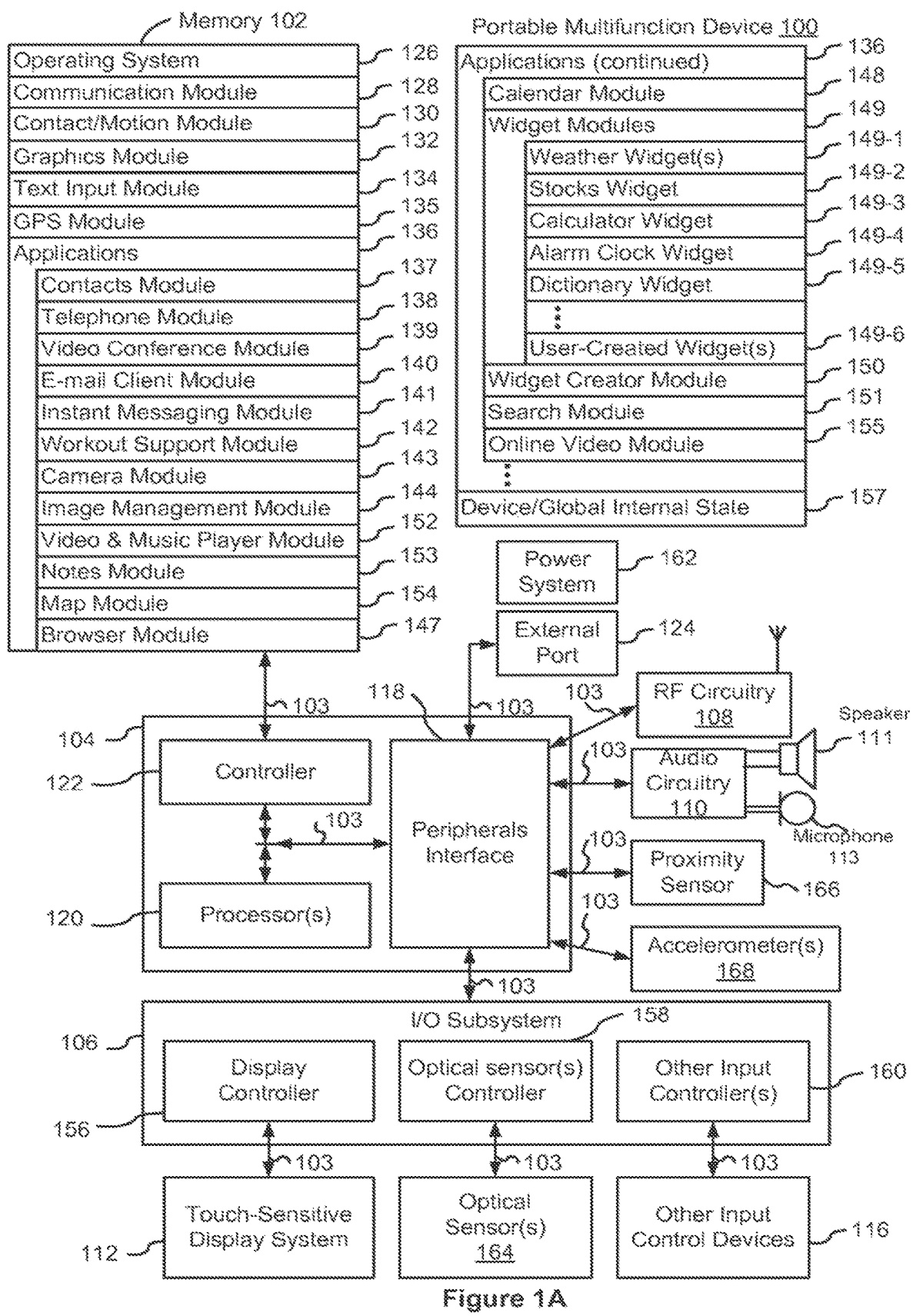
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.1 in), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices (e.g., an adaptive input device 482, FIG. 4C) over one or more external ports 124 and also includes various software components for handling data received by RF circuitry 108 and/or external port 124. External port 124 (e.g., Universal Serial Bus (USB), FIREWIRE, etc.) is adapted for coupling directly to other devices (e.g., an adaptive input device 482, FIG. 4C) or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send c-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
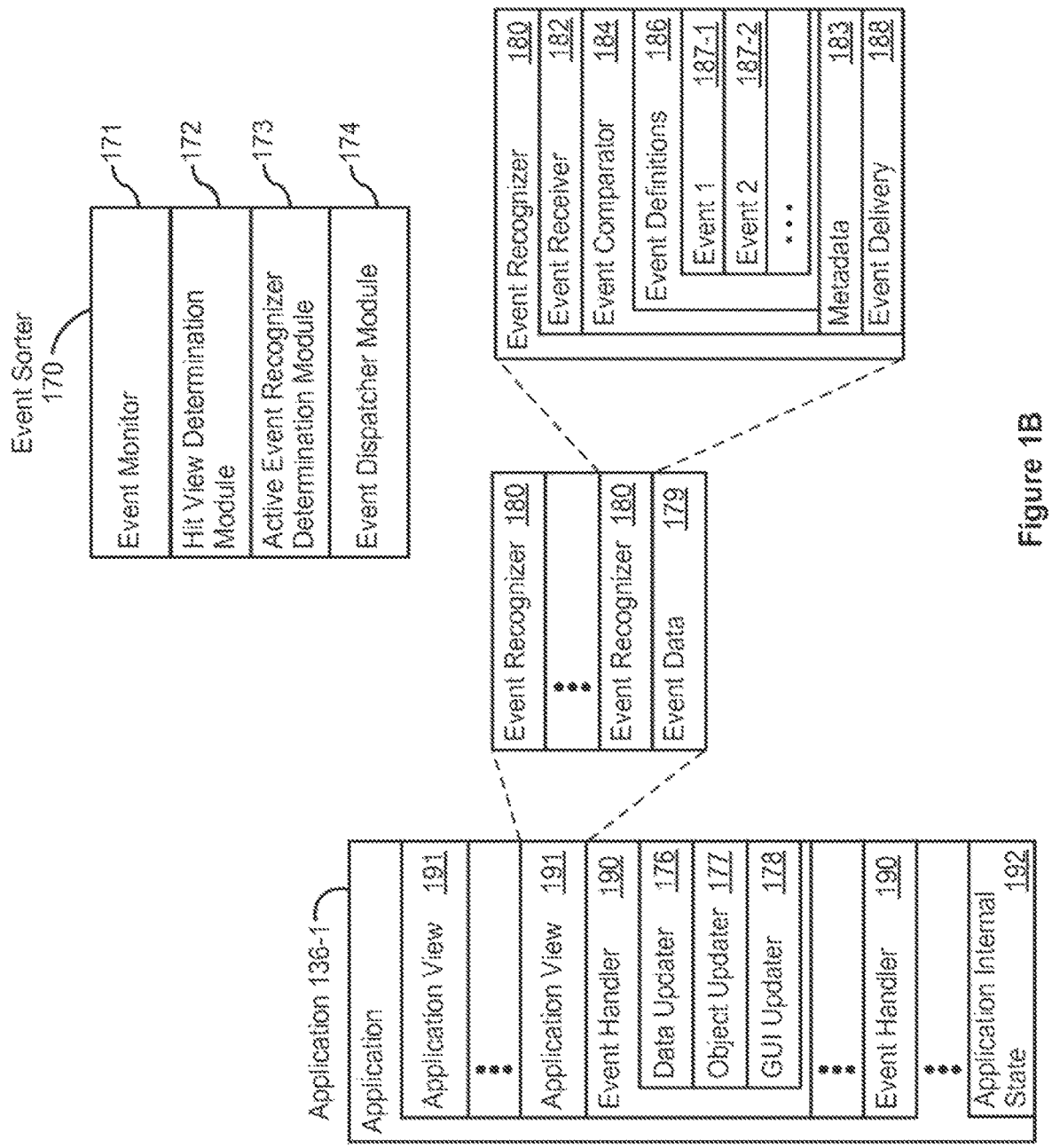
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating joystick or mouse movement and button presses, single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof.

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

FIG. 4C illustrates an exemplary adaptive input device for a multifunction device in accordance with some embodiments. In FIG. 4C, adaptive input device 482 includes joystick 486, and two buttons 488-1 and 488-2. Adaptive input device 482 is connected with a multifunction device with touch-sensitive surface 451 (e.g., device 100, FIG. 1A) by wired or wireless communication channel 484. For example, adaptive input device 482 may be plugged into external port 124 of multifunction device 100. Alternatively, adaptive input device 482 may be connected with the multifunction device using one or more wireless communication protocols, such as Bluetooth or Wi-Fi.

FIG. 4C illustrates exemplary visual indicator 490 displayed on a display of a multifunction device with touch-sensitive surface 451 (e.g., device 100, FIG. 1A) in accordance with some embodiments. In some embodiments, touch sensitive surface 451 has a primary axis (e.g., 452 in FIG. 4C) that corresponds to a primary axis (e.g., 454 in FIG. 4C) of adaptive input device 482. In this way, user inputs received by adaptive input device 482 (e.g., pushing joystick 486 along primary axis 452) may be used to move visual indicator 490 (e.g., along primary axis 452). Activating a button (e.g., tapping button 488-1 or 488-2) on adaptive input device 482 may be used to select or activate a user interface object located at visual indicator 490, which makes the button activation like a tap gesture on the touch-sensitive surface. In some embodiments, when a user pushes joystick 486 while pressing on one of the buttons (e.g., 488-1 or 488-2), multifunction device 100 treats such user inputs as equivalent to a finger contact moving across touch-sensitive surface 451 at the location of visual indicator 490. In some embodiments, activating a button will open a menu. It should be understood that similar methods may be used for other user interfaces described herein.

Although adaptive input device 482 illustrated in FIG. 4C includes joystick 486 and buttons 488-1 and 488-2, it should be noted that other adaptive input devices may be used with the methods described herein (e.g., track balls, hand sticks, mouth sticks, head sticks, and physical keyboards). As used herein, an adaptive input device refers to an input device that is configured to receive user inputs without using a touch-sensitive surface. An adaptive input device typically receives user inputs representing up, down, left, and right movements, activation events, and selection events (e.g., equivalent to an activation of a button or tapping on a touch-sensitive surface) based on a user's movements, such as hand movements, eye movements, foot movements, head movements, and/or mouth/tongue movements.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5AC illustrate exemplary user interfaces for providing accessibility to a touch-based user interface in accordance with some embodiments. The user interfaces in these figures are used to illustrate the processes described below, including the processes in FIGS. 6A-6E and 7-13.

FIG. 5A illustrates exemplary user interface 502-A of an email application displayed on touch screen 112 of multifunction electronic device 100. User interface 502A includes display of an email message. Also shown in FIG. 5A is visual indicator 5041, which corresponds to a virtual touch (e.g., a virtual touch on touch screen 112, such as a virtual single finger contact). Sometimes, the virtual touch is also called a simulated touch (e.g., the device performs as if a finger touch has been detected at a location of visual indicator 504-1). Visual indicator 504-1 in FIG. 5A is depicted as including a ring. Alternatively, visual indicator 504-1 may include one of: a donut, circle, oval, ellipse, arrow, cross, I-beam, star, or virtual finger (e.g., a finger or hand shaped icon).

Visual indicator 504-1 is configured to move in accordance with an input from an adaptive input device (e.g., 482, FIG. 4C). For example, visual indicator 504-1 may move to a predefined region of touch screen 112 (e.g., movement 506-1 of visual indicator 504-1), such as a predefined corner of the display, in accordance with the input from the adaptive input device. Alternatively, visual indicator 504-1 may move side-to-side (e.g., movement 506-2 of visual indicator 504-1) in accordance with a control (e.g., joystick 486) on the adaptive input device moving side-to-side. In other words, visual indicator 504-1 may move up, down, left, right, and/or diagonally in accordance with the input from the adaptive input device.

Figure 5B:
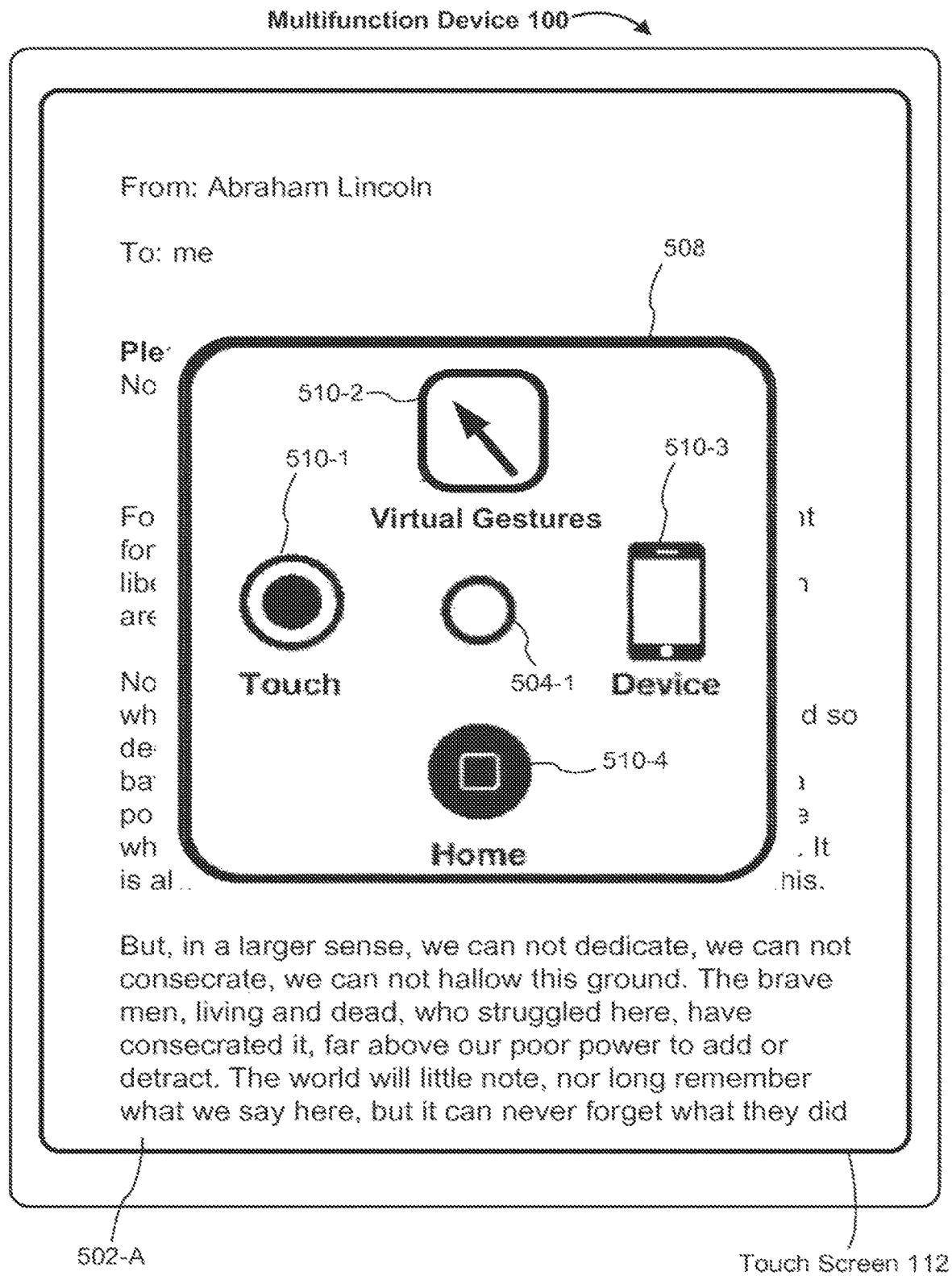

FIG. 5B illustrates that menu 508 is displayed over user interface 502-A of the email application. Menu 508 is typically displayed in response to a predefined input from the adaptive input device. For example, menu 508 may be displayed in response to visual indicator 504-1 moving to a predefined region of touch screen 112 (e.g., movement 506-1, FIG. 5A, to a corner of the display). As another example, moving the visual indicator 504-1 to a corner of the display followed by activation of a button (e.g., 488-1, FIG. 4C) on the adaptive input device results in display of menu 508. Alternatively, moving visual indicator 504-1 side-to-side (e.g., movement 506-2, FIG. 5A) may result in display of menu 508. For example, moving the visual indicator 504-1 horizontally back and forth by at least a predefined distance (e.g., 0.02, 0.03, or 0.04 inches) for at least a predefined number of times (e.g., 2, 3, or 4 times) will open a menu, without needing to activate a button. As yet another example, activation of a predefined button (e.g., 488-2, FIG. 4C) on the adaptive input device may result in display of menu 508. In some embodiments, when menu 508 is initially displayed, visual indicator 504-1 is positioned in a center region of menu 508, as shown in FIG. 5B. In other embodiments, when menu 508 is initially displayed, visual indicator 504-1 maintains its position prior to the display of menu 508.

In some embodiments, menu 508 includes a plurality of icons 510, including one or more of: virtual touches selection icon 510-1, virtual gestures icon 510-2, virtual device icon 510-3, and home button 510-4. In some embodiments, the icons 510 are displayed radially about a center of menu 508 (e.g., the icons are displayed at a substantially equal distance from the center of menu 508).

Figure 5C:
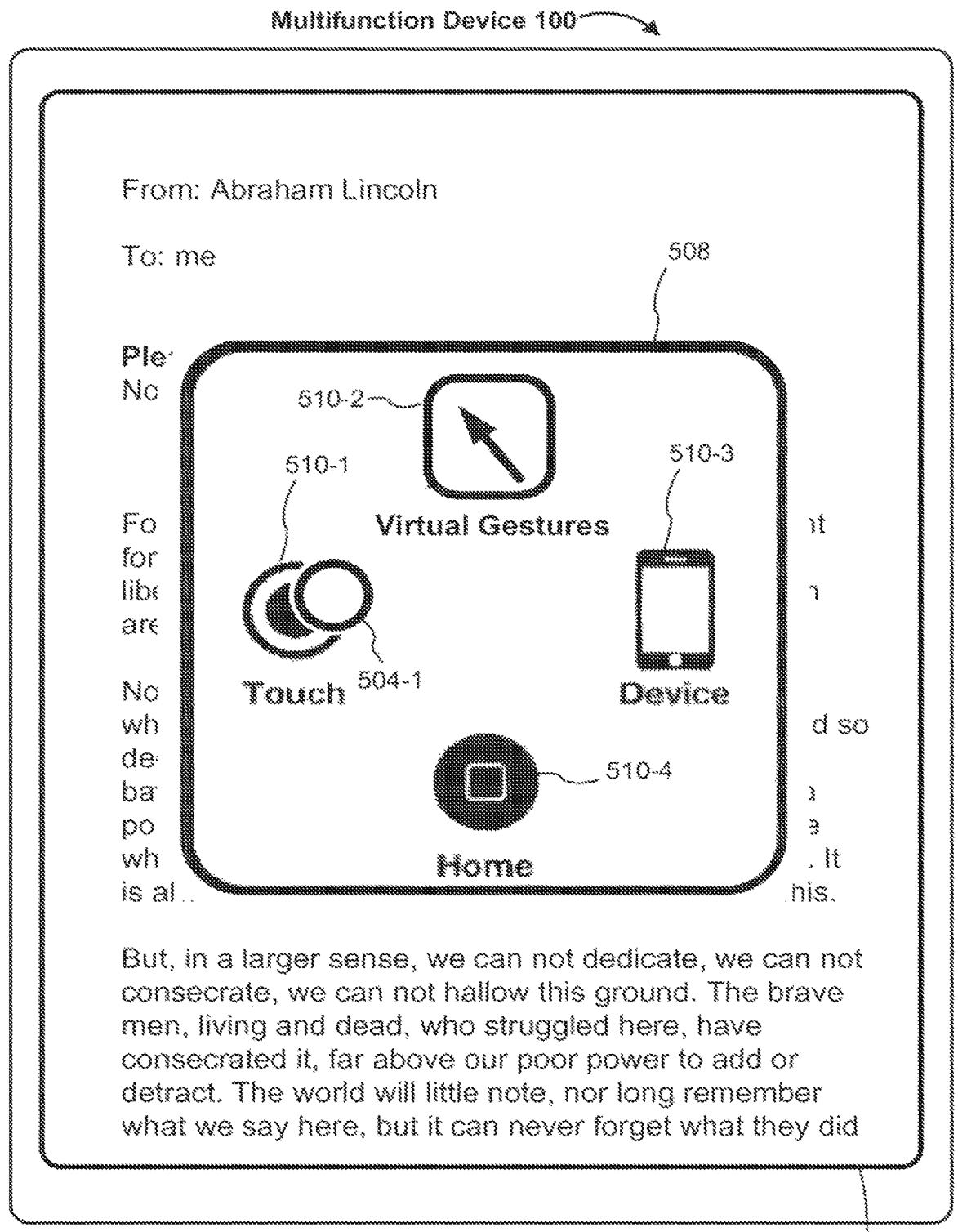

In FIG. 5C, visual indicator 504-1 is moved over virtual touches selection icon 510-1 In some embodiments, virtual touches selection icon 510-1 is selected by moving visual indicator 504-1 over virtual touches selection icon 510-1. In some embodiments, virtual touches selection icon 510-1 is selected by moving visual indicator 504-1 over virtual touches selection icon 510-1 followed by activation of a button (e.g., 488-1, FIG. 4C) on the adaptive input device.

Figure 5D:
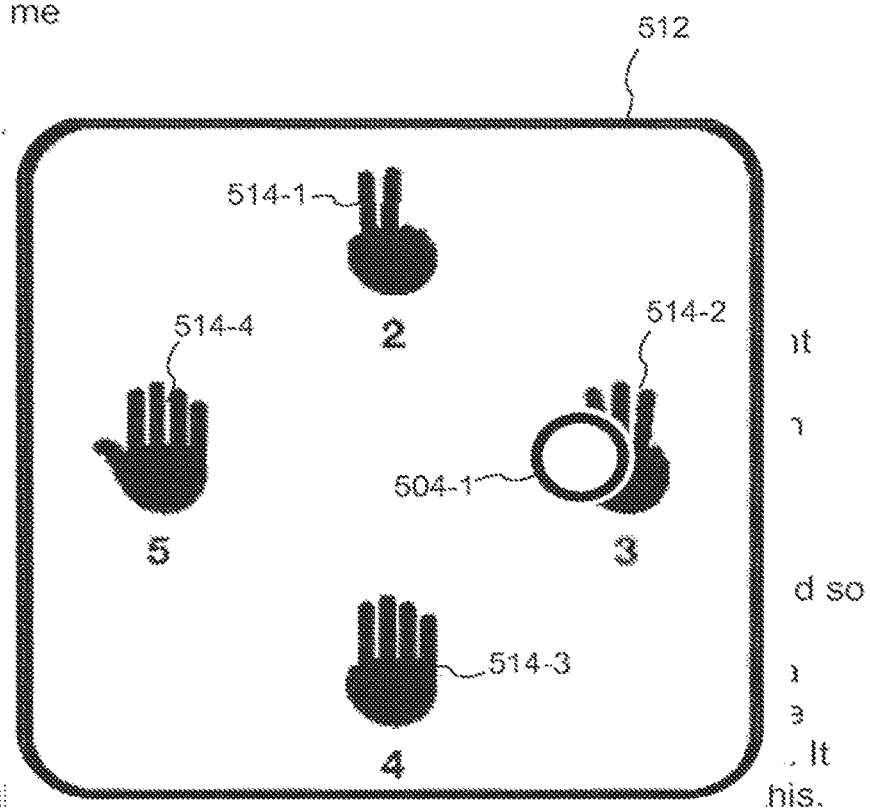

FIG. 5D illustrates that menu 512 of virtual multitouch contacts is displayed in response to selection of virtual touches selection icon 510-1 (FIG. 5C). Menu 512 of virtual multitouch contacts includes a plurality of icons 514 representing types of virtual multitouch contacts (e.g., two-finger contacts icon 514-1, three-finger contacts icon 514-2, four-finger contacts icon 514-3, and five-finger contacts icon 514-4). In some embodiments, menu 512 of virtual multitouch contacts also includes a single-finger contact icon (not shown). Icons 514 are also called herein virtual multitouch contacts icons. FIG. 5D also illustrates that three-finger contacts icon 514-3 is selected with visual indicator 504-1.

FIG. 5E illustrates that three visual indicators 504-2, 504-3, and 504-4 are displayed in response to selection of three-finger contacts icon 514-3 in FIG. 5D. FIG. 5E also illustrates that three visual indicators 504-2 through 504-4 move to the left (e.g., in accordance with an input from the adaptive input device). It is noted that in some embodiments, a three-finger left-swipe gesture on touch screen 112 displays a user interface of an open application running on the multifunction device 100 (e.g., user interface 502-B of a web browser application) distinct from a currently displayed application (e.g., an email application). In other words, the three-finger left-swipe gesture, in some embodiments, initiates navigation to the next open application.

Figure 5F:
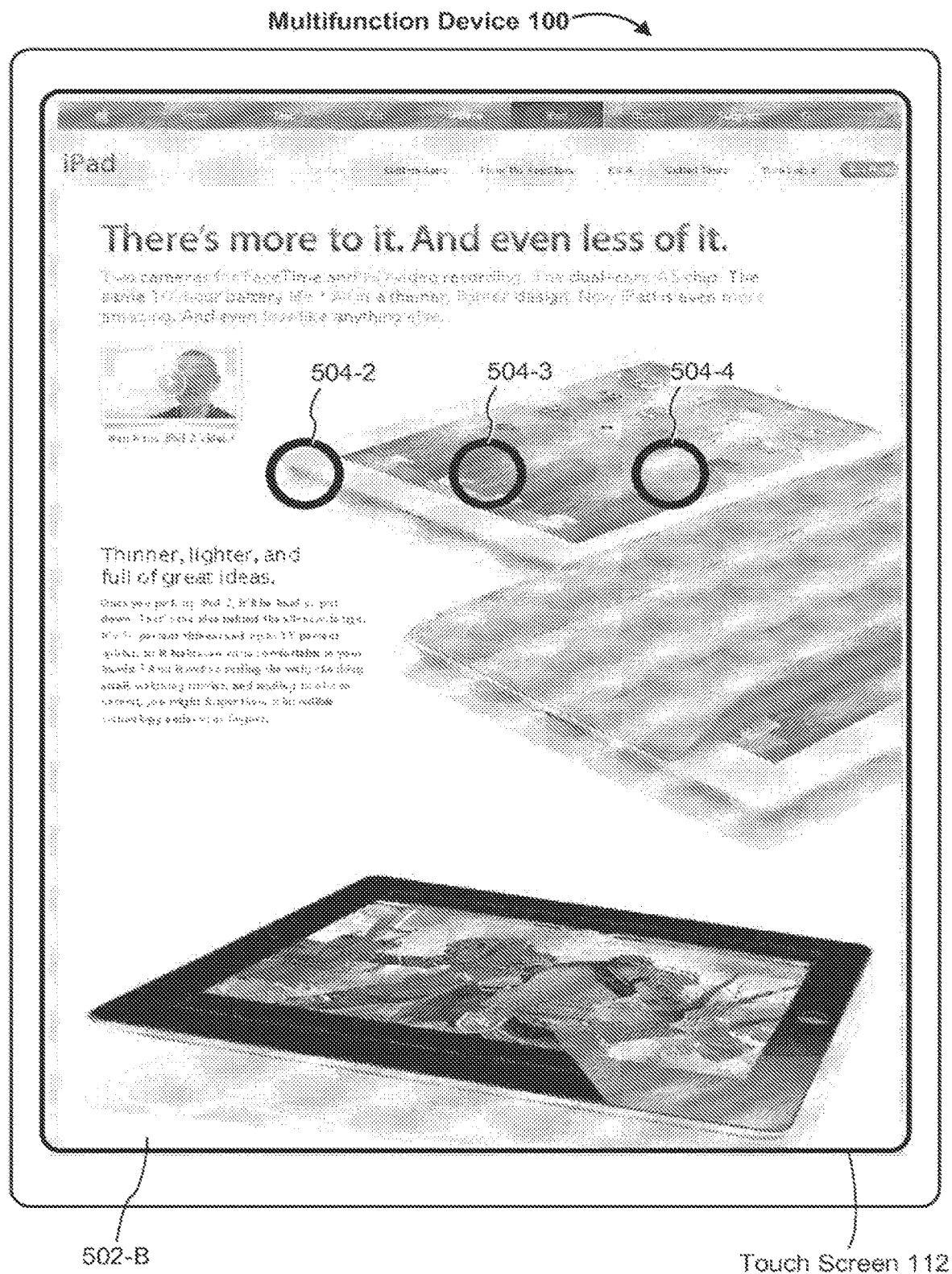

In some embodiments, multifunction device 100 is configured to display the user interface of the next open application (e.g., user interface 502-B) in response to the leftward movement of the three visual indicators 504-2 through 504-4. In FIG. 5F, user interface 502-B of the web browser application is shown in response to the leftward movement of three visual indicators 504-2 through 504-4. The three visual indicators 5042 through 504-4 are also shown in FIG. 5F.

Figure 5G:

FIG. 5G illustrates that if no input is received from the adaptive input device for a predefined time period (e.g., 5 seconds, 10 seconds, 15 seconds, or any reasonable time period), display of three visual indicators 504-2 through 504-4 is replaced with display of single visual indicator 504-1. In some embodiments, the predefined time period is set by a user (e.g., via a settings menu, not shown).

Figure 5H:
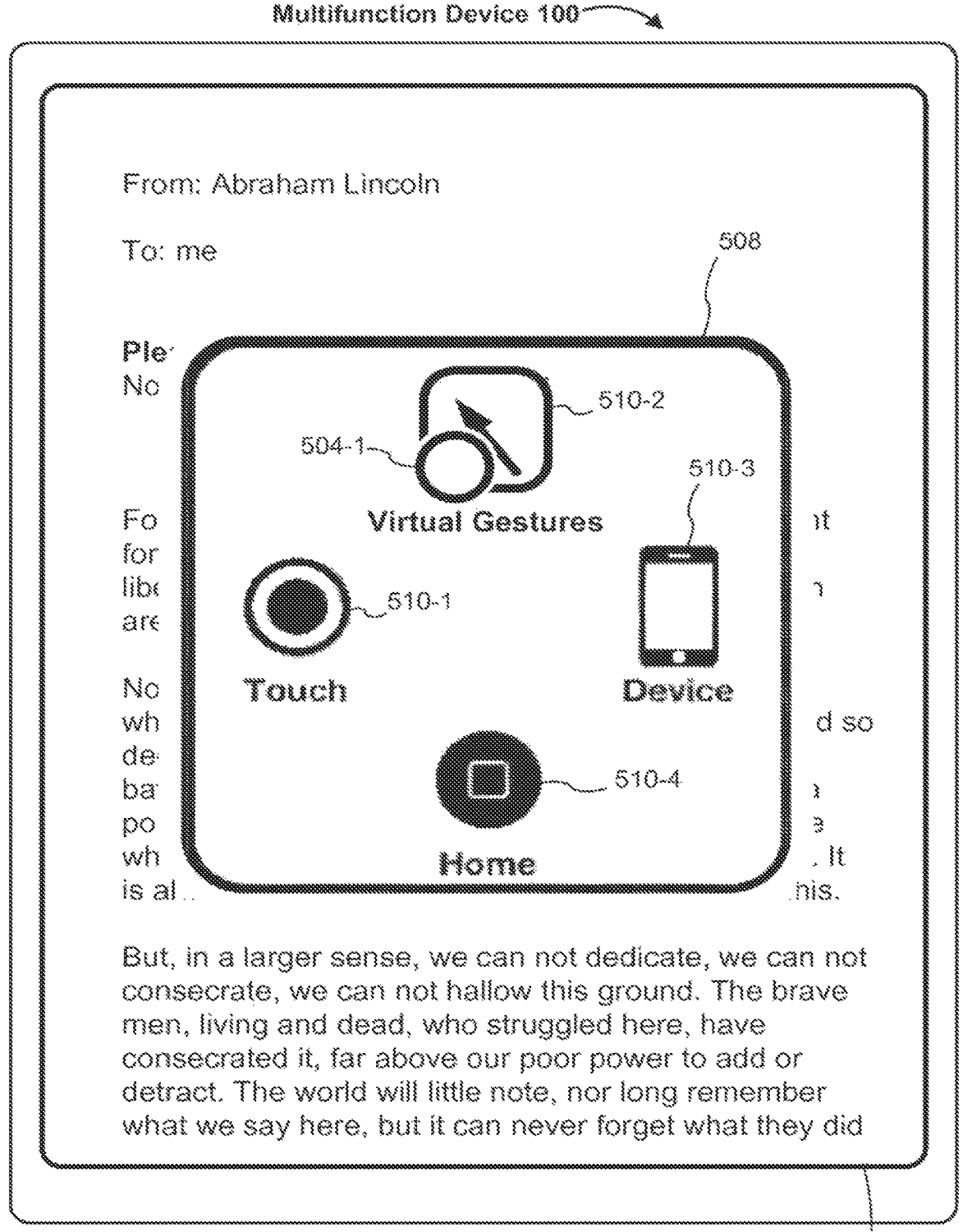

In FIG. 5H, like FIG. 5B, the user interface includes menu 508 with virtual touches selection icon 510-1, virtual gestures icon 510-2, virtual device icon 510-3, and home button 510-4. In FIG. 5H, virtual gestures icon 510-2 is selected with visual indicator 504-1.

Figure 5I:
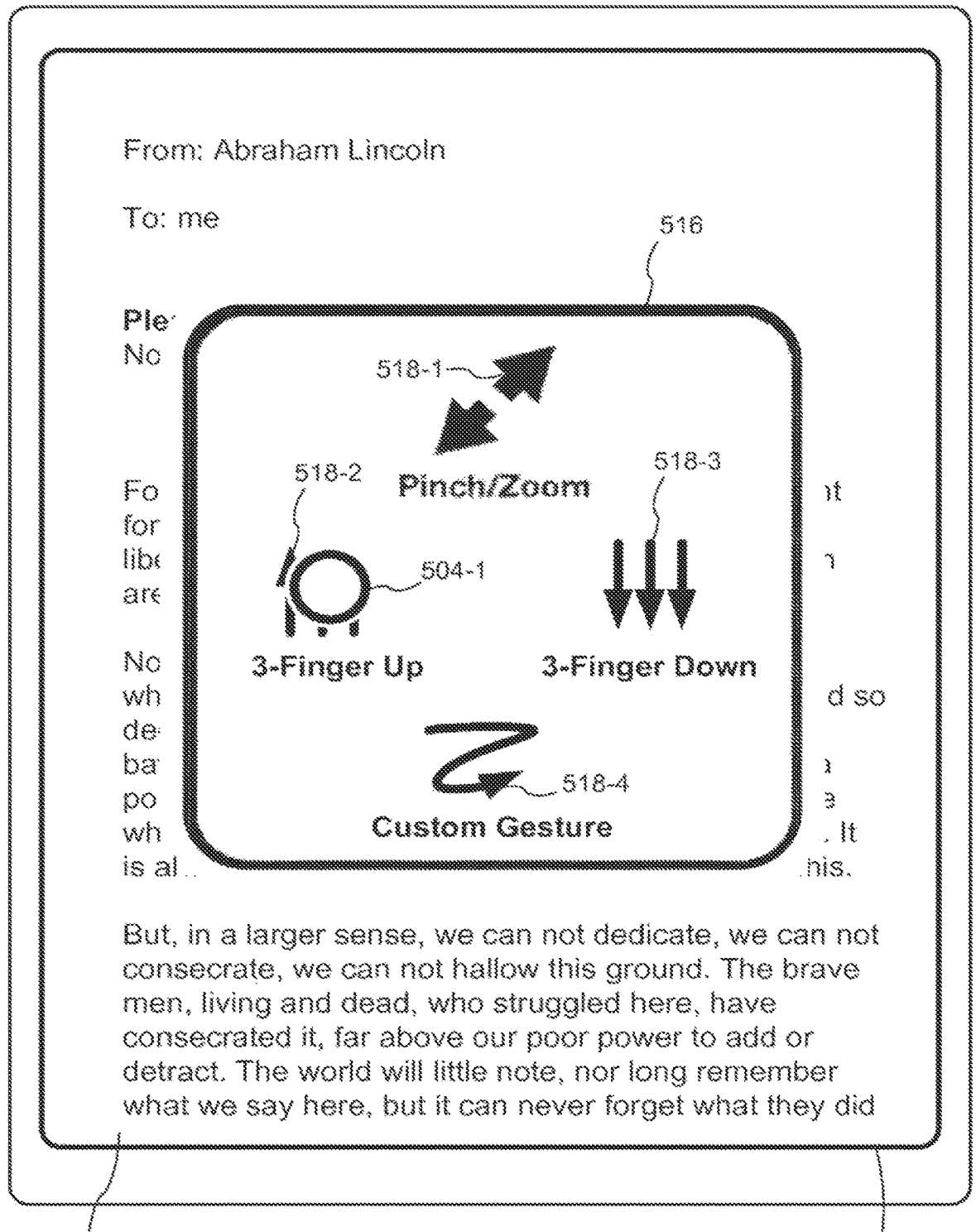

FIG. 5I illustrates that menu 516 of virtual gestures is displayed in response to the selection of virtual gestures icon 510-2 (FIG. 5H). Menu 516 of virtual gestures includes a plurality of icons 518 representing types of virtual gestures (e.g., virtual two-finger pinch/depinch gesture icon 518-1, virtual three-finger swipe up gesture icon 5182, virtual three-finger swipe down gesture icon 518-3, virtual user-configured gesture icon 518-4, virtual three-finger swipe left gesture icon (not shown), virtual three-finger swipe right gesture icon (not shown), virtual four-finger swipe left gesture icon (not shown), virtual four-finger swipe right gesture icon (not shown), virtual four-finger swipe up gesture icon (not shown), virtual four-finger swipe down gesture icon (not shown), virtual two-finger swipe left gesture icon (not shown), virtual two-finger swipe right gesture icon (not shown), virtual two-finger swipe up gesture icon (not shown), virtual two-finger swipe down gesture icon (not shown), etc.). As used herein, icons 518 are also called virtual gesture icons. It should be noted that virtual gestures icon 510-2 and each virtual gesture icon 518 have distinct functions. For example, selection of virtual gestures icon 510-2 initiates the display of menu 516 of virtual gestures, and selection of a respective virtual gesture icon initiates performing an operation associated with the respective virtual gesture icon. FIG. 5I illustrates that three-finger swipe up gesture icon 518-2 is selected.

Figure 5J:
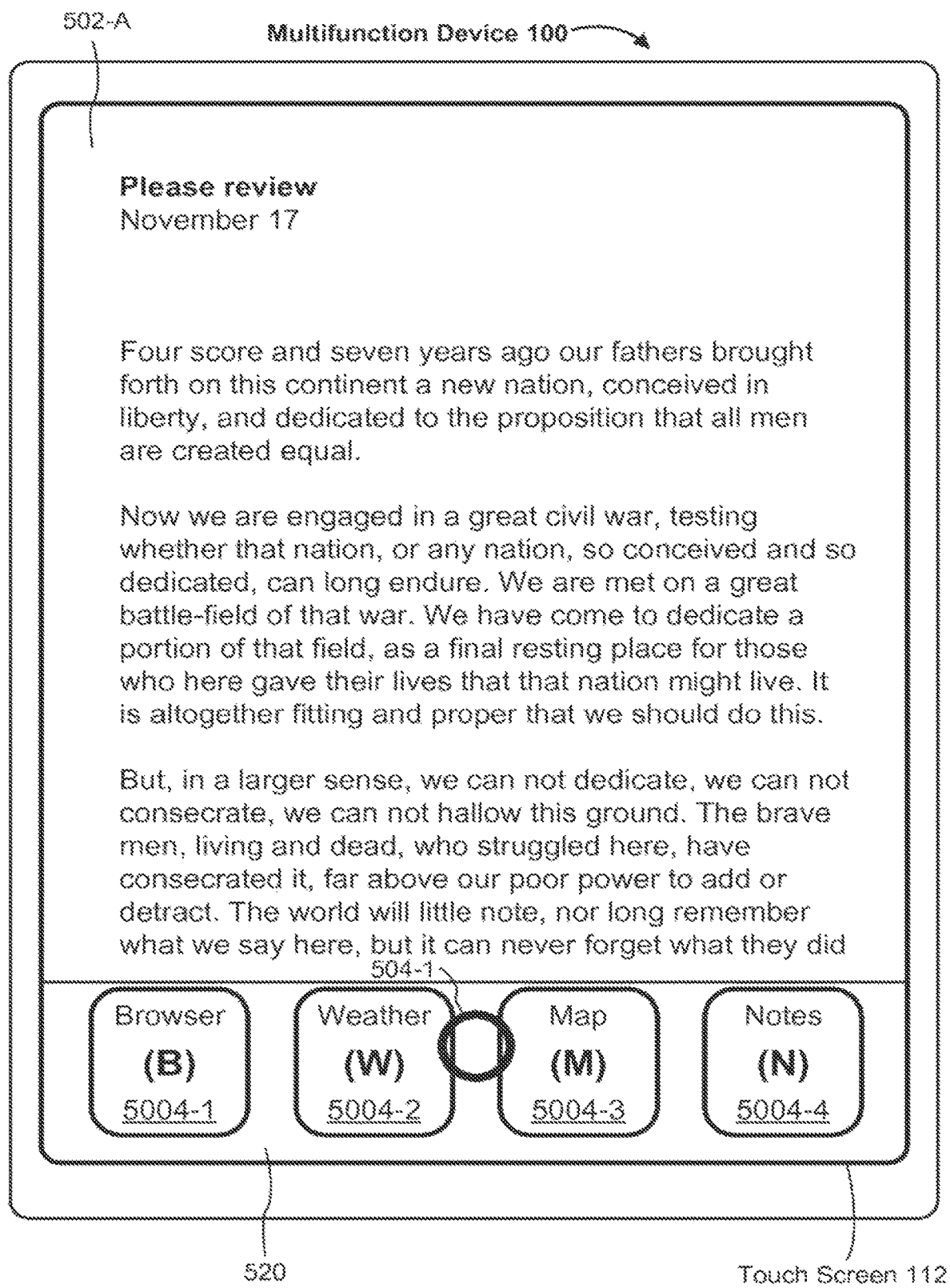

In FIG. 5J, a portion of user interface 502-A and application icon area 520 are concurrently displayed in response to the selection of three-finger swipe up gesture icon 518-2. Application icon area 520 includes a plurality of open application icons 5004, each of which, when activated (e.g., via visual indicator 504-1, FIG. 5J), initiates displaying a user interface of a corresponding application. Alternatively, the portion of user interface 502-A and application icon area 520 may be displayed in response to a three-finger swipe up gesture on touch screen 112.

Figure 5K:
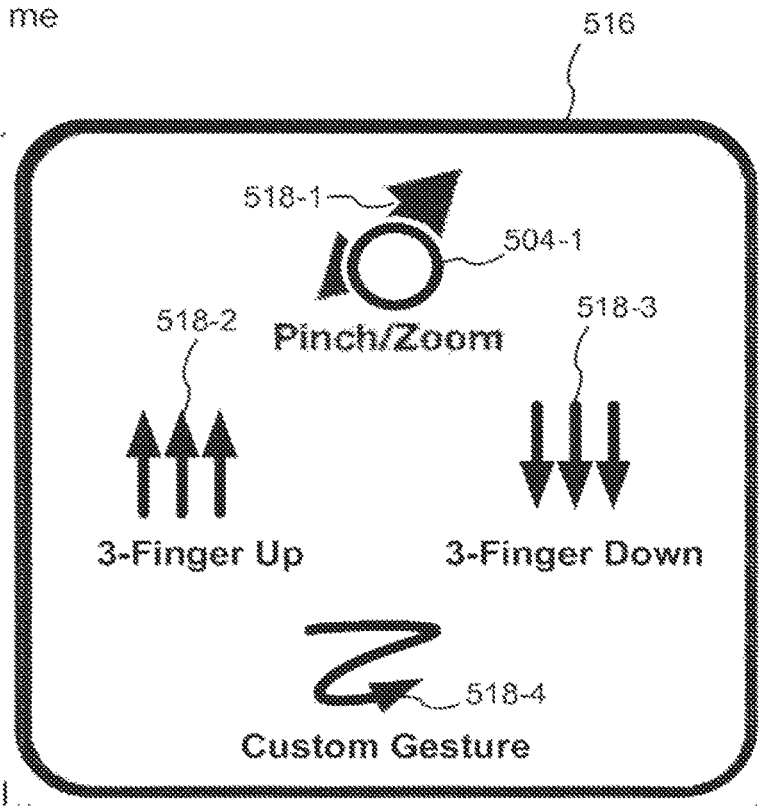

In FIG. 5K, menu 516 of virtual gestures that includes a plurality of icons 518 (e.g., virtual two-finger pinch/depinch gesture icon 518-1, virtual three-finger swipe up gesture icon 518-2, virtual three-finger swipe down gesture icon 518-3, virtual user-configured gesture icon 518-4, etc.) is displayed. FIG. 5K also illustrates that virtual two-finger pinch/depinch gesture icon 518-1 is selected with visual indicator 504-1.

Figure 5L:
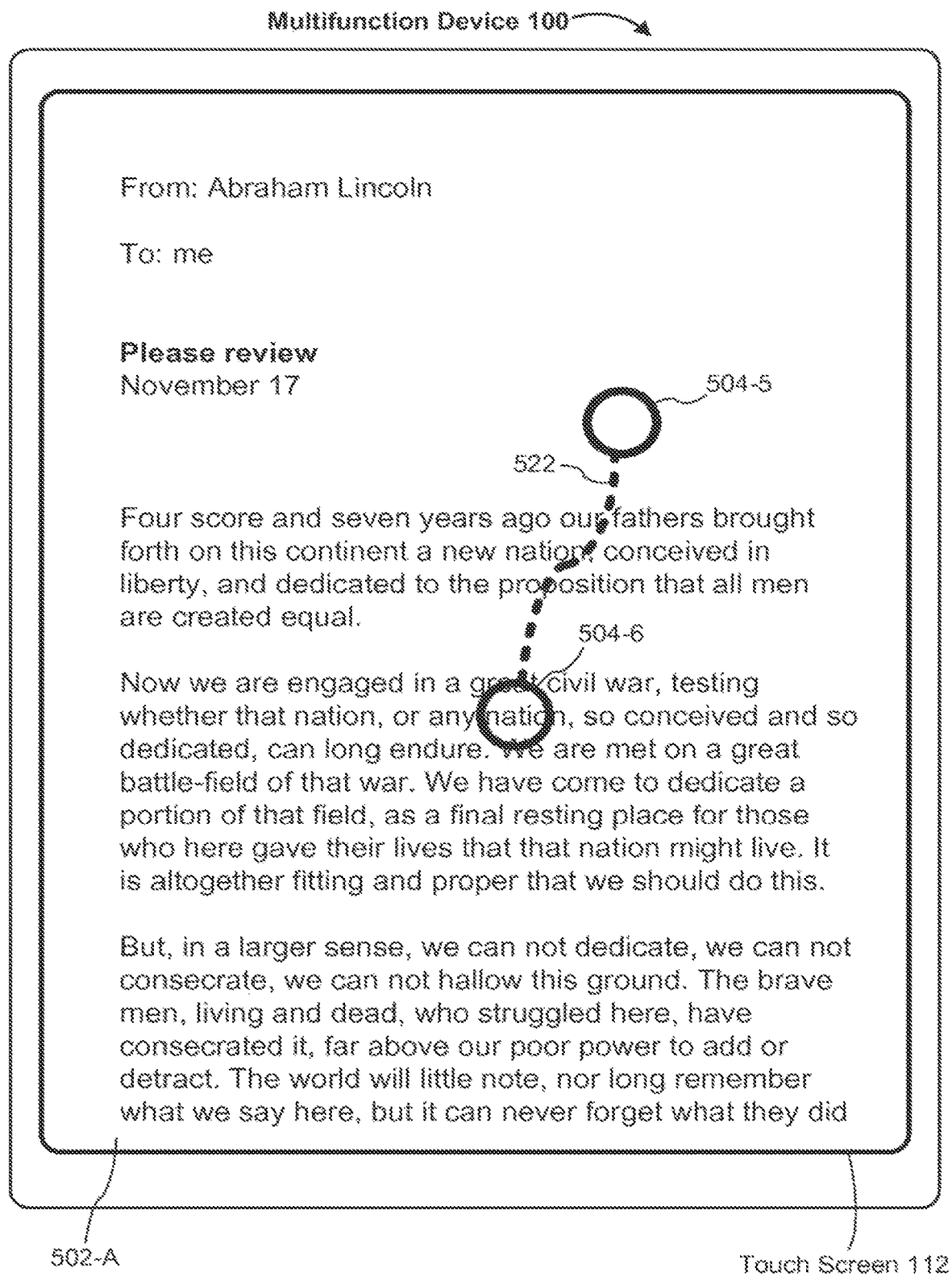

In FIG. 5L, two visual indicators 504-5 and 504-6 are displayed in response to selection of virtual two-finger pinch/depinch gesture icon 518-1 (FIG. 5K). In some embodiments, the two visual indicators 504-5 and 504-6 are visually linked (e.g., with connector 522). In some embodiments, each visual indicator of the two visual indicators 504-5 and 504-6 includes a ring-shaped display object. The ring-shaped visual indicator is sometimes called a first-mode visual indicator (as compared to a second-mode visual indicator, described below with reference to FIG. 5N).

Figure 5M:
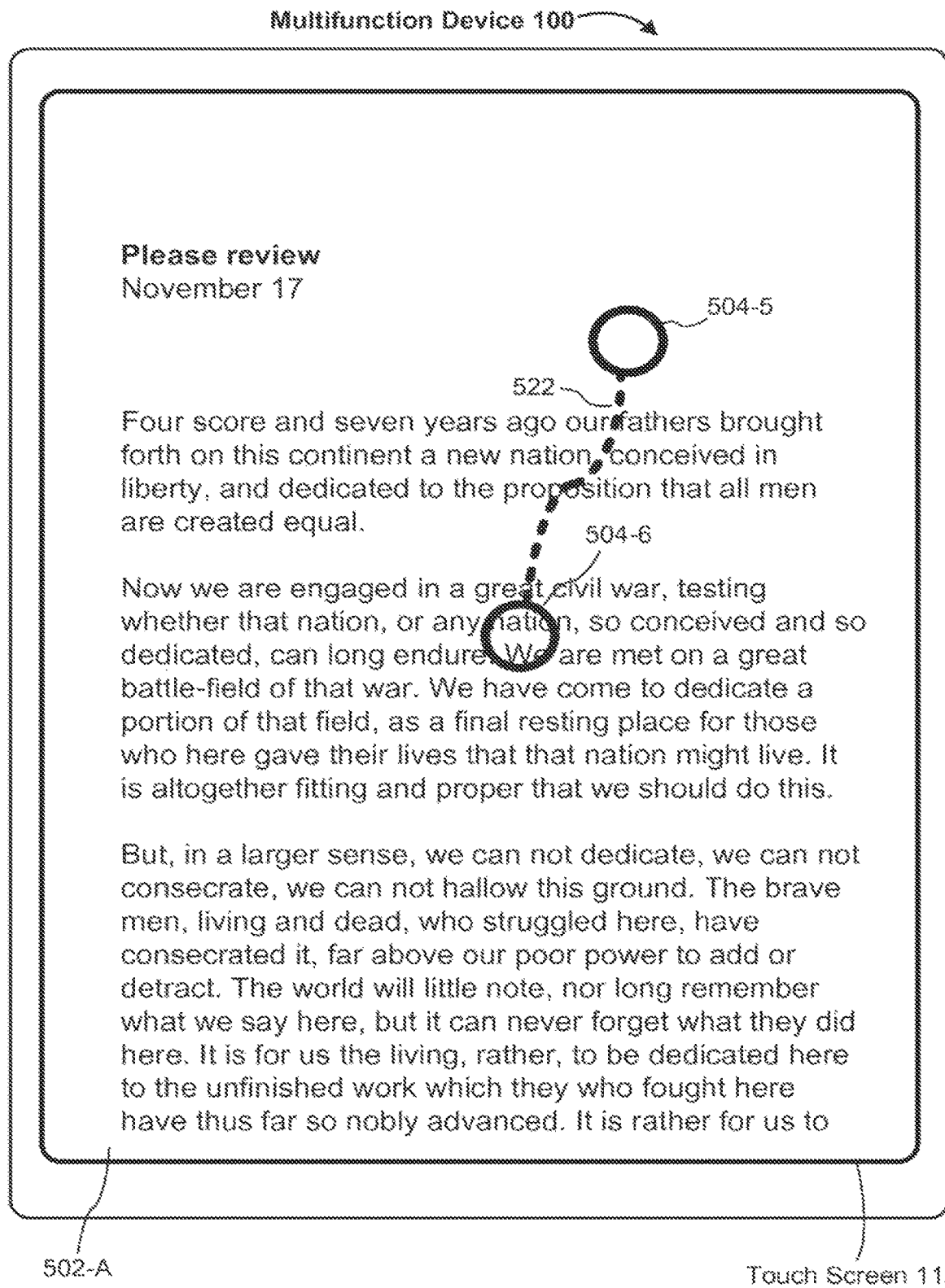

FIG. 5M illustrates that, in the first mode, the two visual indicators 504-5 and 504-6 are moved together in accordance with an input from the adaptive input device. In addition, user interface 502-A is scrolled in accordance with the concurrent movement of two visual indicators 504-5 and 504-6.

Figure 5N:

In FIG. 5N, two first-mode visual indicators 504-5 and 504-6 are replaced with two second-mode visual indicators 504-7 and 504-8. Each second-mode visual indicator includes a ring-shaped display object and a concentric disk-shaped display object. In some cases, the two second-mode visual indicators are displayed in response to activation of a button (e.g., 488-2, FIG. 4C) on the adaptive input device.

Figure 5O:
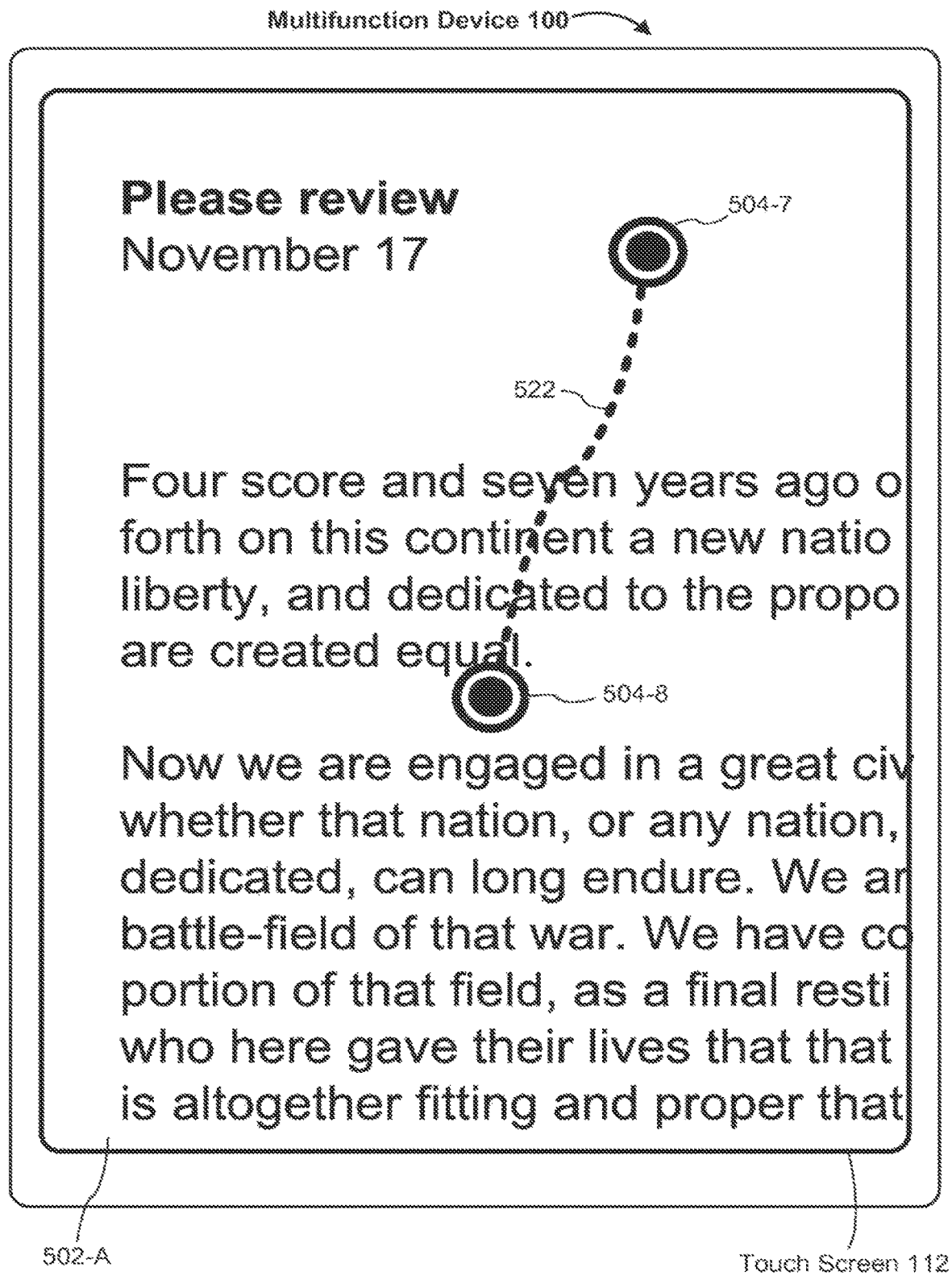

FIG. 5O illustrates that, in response to an input from the adaptive input device, the two second-mode visual indicators 504-7 and 504-8 are moved relative to each other in the second mode (e.g., the distance between two second-mode visual indicators 504-7 and 504-8 increases) and the user interface is magnified (e.g., zoomed-in) accordingly.

Figure 5P:
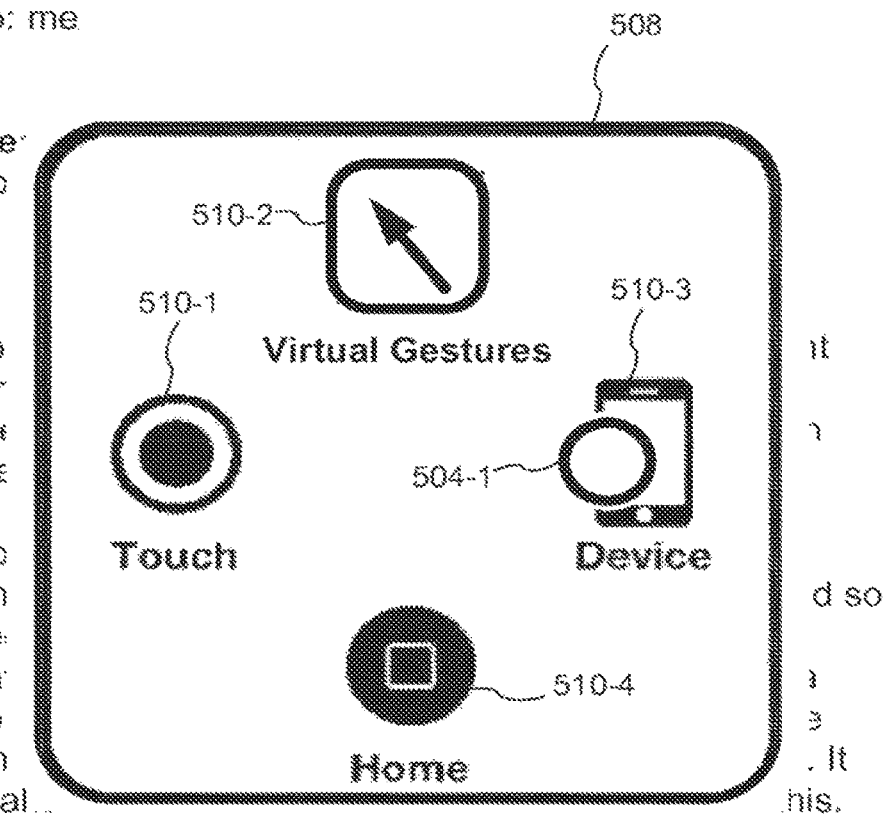

In FIG. 5P, menu 508 that includes virtual touches selection icon 510-1, virtual gestures icon 510-2, virtual device icon 510-3, and home button 510-4 is displayed. FIG. 5P also illustrates that virtual device icon 510-3 is selected with visual indicator 5041.

Figure 5Q:
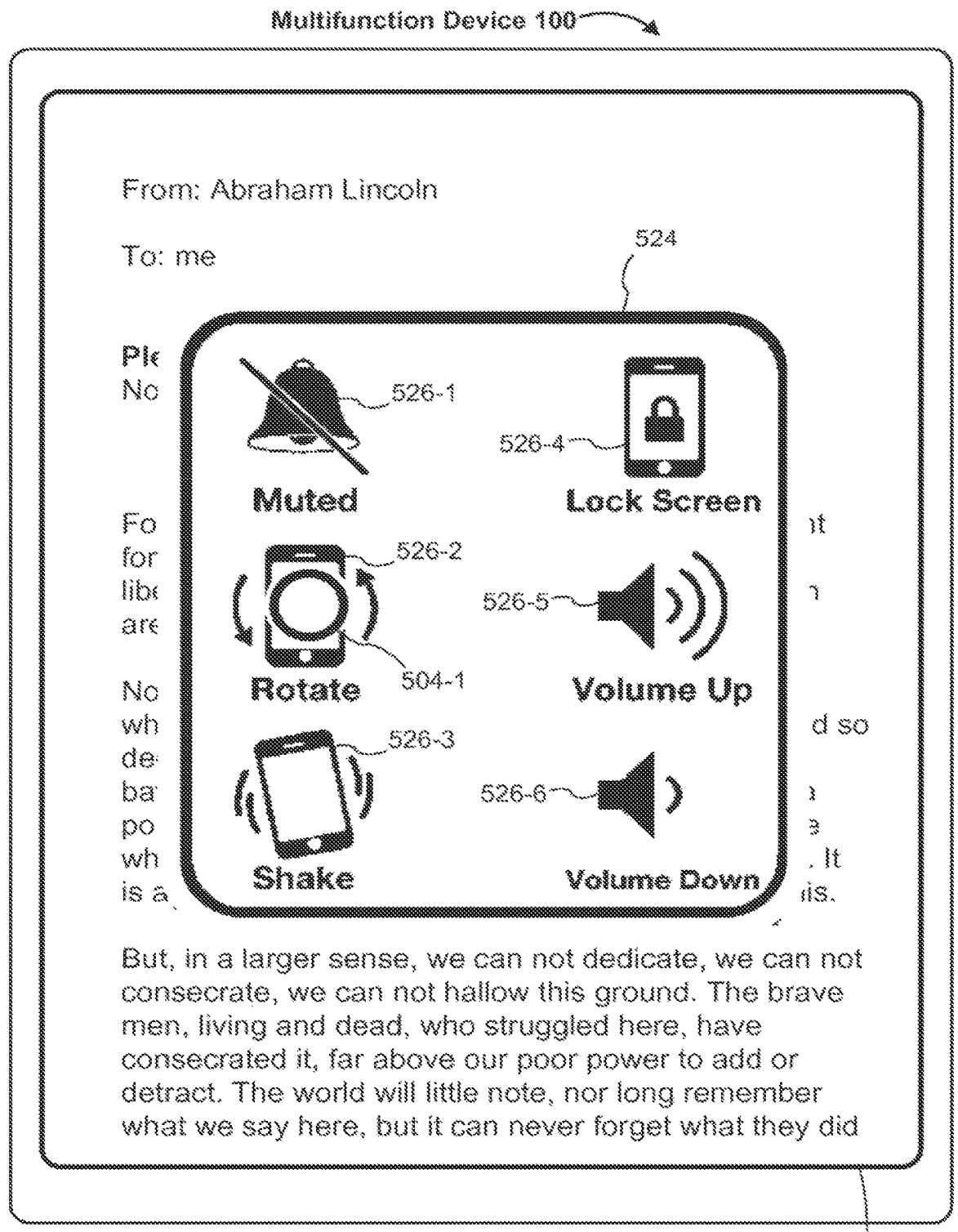

In FIG. 5Q, menu 524 of virtual device operations is displayed in response to activation of virtual device icon 510-3 (FIG. 5P). Menu 524 of virtual device operations includes a plurality of icons 526 representing types of virtual device operations (e.g., virtual device muting/unmuting icon 526-1, virtual device rotation icon 526-2, virtual device shaking icon 526-3, virtual device lock screen icon 526-4, virtual device volume up icon 526-5, virtual device volume down icon 526-6, virtual rotation lock icon (not shown), virtual knock-knock icon (not shown), etc.). Exemplary virtual device operations may include operations that are normally performed via physical controls on the electronic device, such as: muting and unmuting the ringer and sound effects on the device, which is normally performed via a mute switch; locking the device, which is normally initiated via a lock/unlock switch; increase volume, which is normally performed via a volume up button; decrease volume, which is normally performed via a volume down button. Exemplary virtual device operations may also include shaking the electronic device to perform a predefined operation (e.g., an undo operation) and rotating the electronic device to rotate the display orientation. Operations like shaking and rotation are typically detected via an accelerometer in the electronic device. As used herein, icons 526 are also called virtual device operation icons. FIG. 5Q also illustrates that the virtual device rotation icon 5262 is selected with visual indicator 504-1.

Figure 5R:
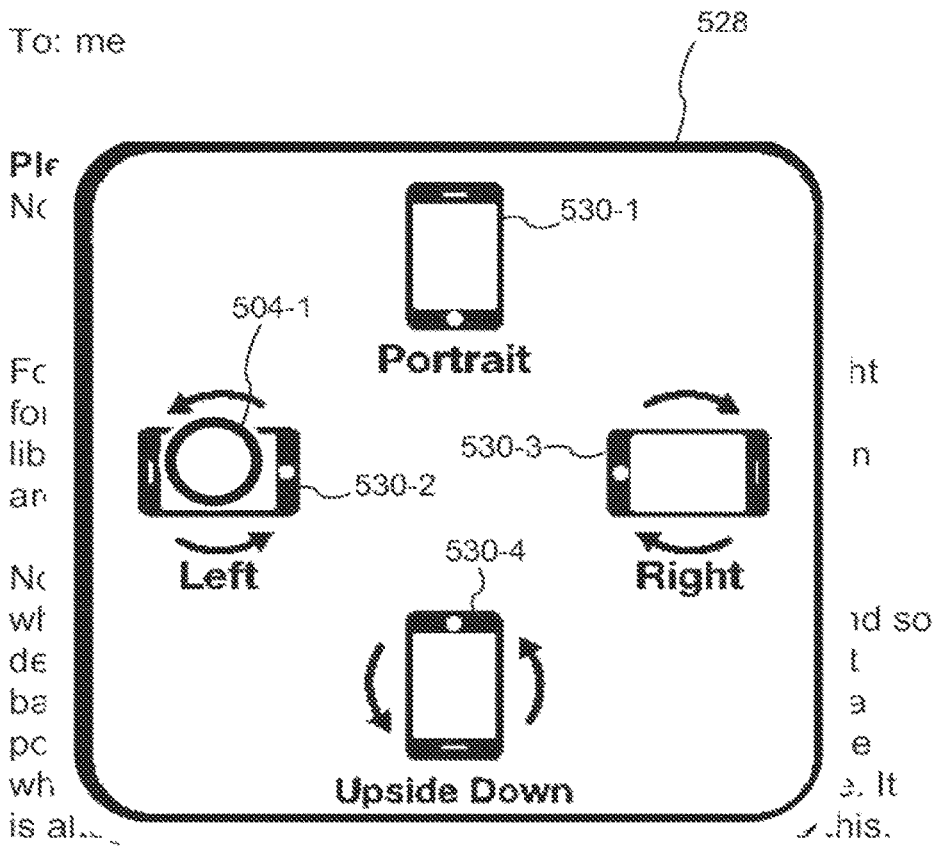

FIG. 5R illustrates that menu 528 of virtual device orientations is displayed in response to selection of virtual device rotation icon 526-2 (FIG. 5Q). Menu 528 of virtual device orientations includes a plurality of icons 530 representing types of virtual device orientations (or rotations of the device orientation). For example, menu 528 of virtual device operations may include portrait orientation icon 530-1, rotate-left orientation icon 530-2, rotate-right orientation icon 530-3, and rotate upside-down orientation icon 530-4. It should be noted that in some embodiments, the rotation of the device counterclockwise about 90 degrees rotates the user interface clockwise 90 degrees. FIG. 5R also illustrates that the rotate-left orientation icon 530-2 is selected with visual indicator 504-1.

Figure 5S:
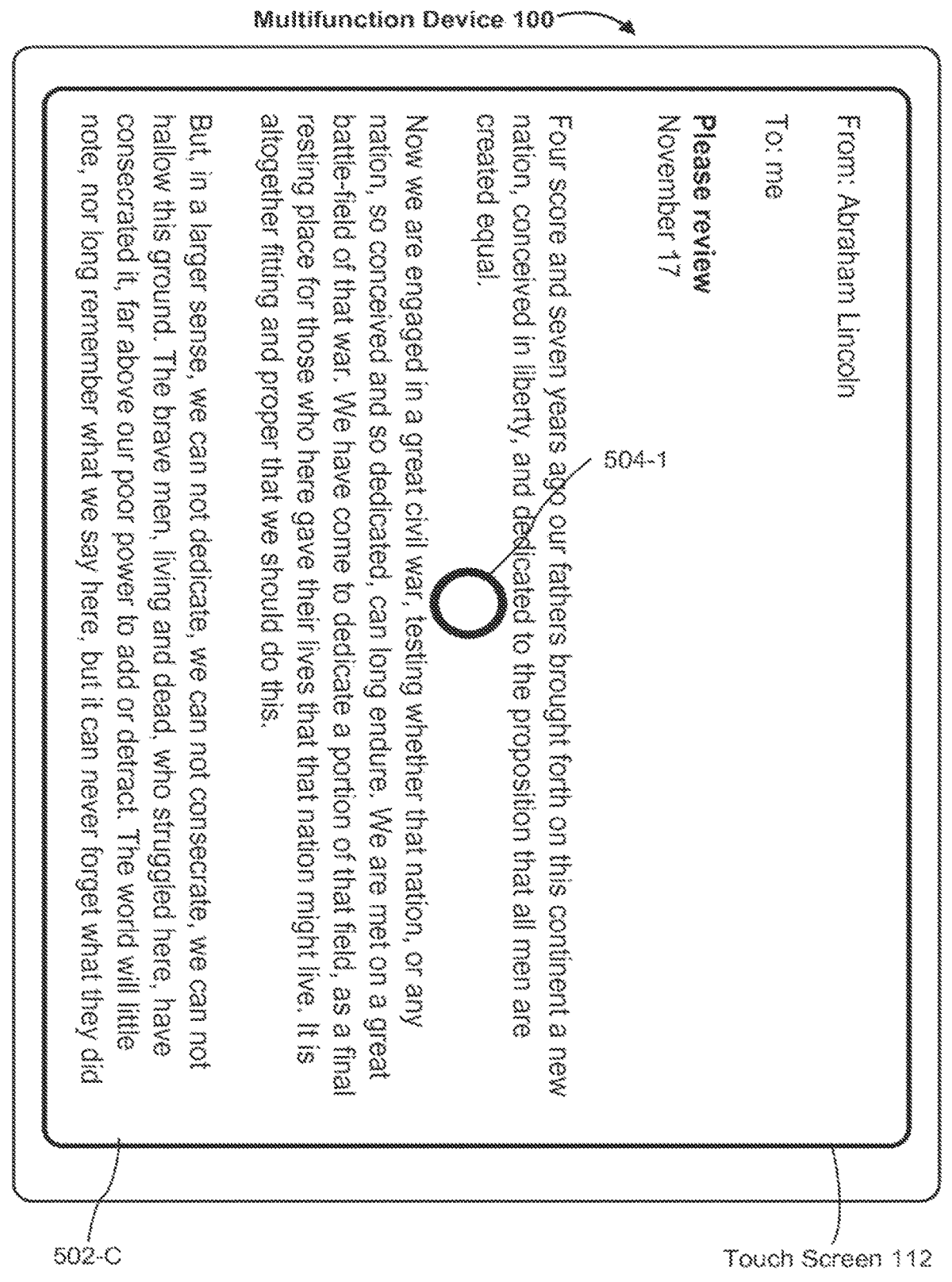

In FIG. 5S, the user interface is rotated 90 degrees clockwise in response to selection of rotate-left orientation icon 530-2, without actual physical rotation of the device. FIG. 5S also illustrates that rotated user interface 502-C is displayed on touch screen 112.

Figure 5T:
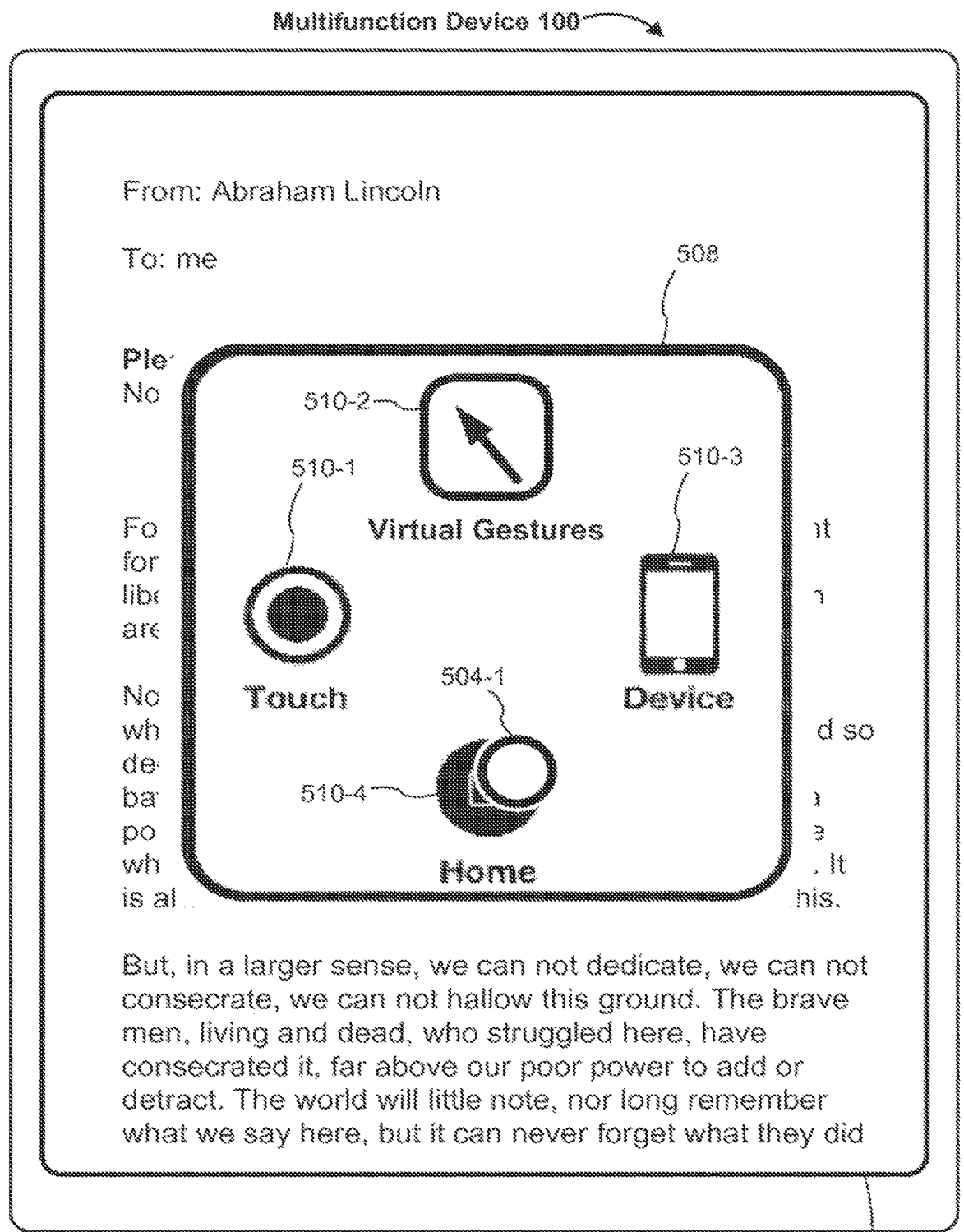

In FIG. 5T, menu 508 that includes virtual touches selection icon 510-1, virtual gestures icon 510-2, virtual device icon 510-3, and home button 510-4 is displayed. FIG. 5T also illustrates that home button icon 510-4 is selected with visual indicator 504-1.

Figure 5U:
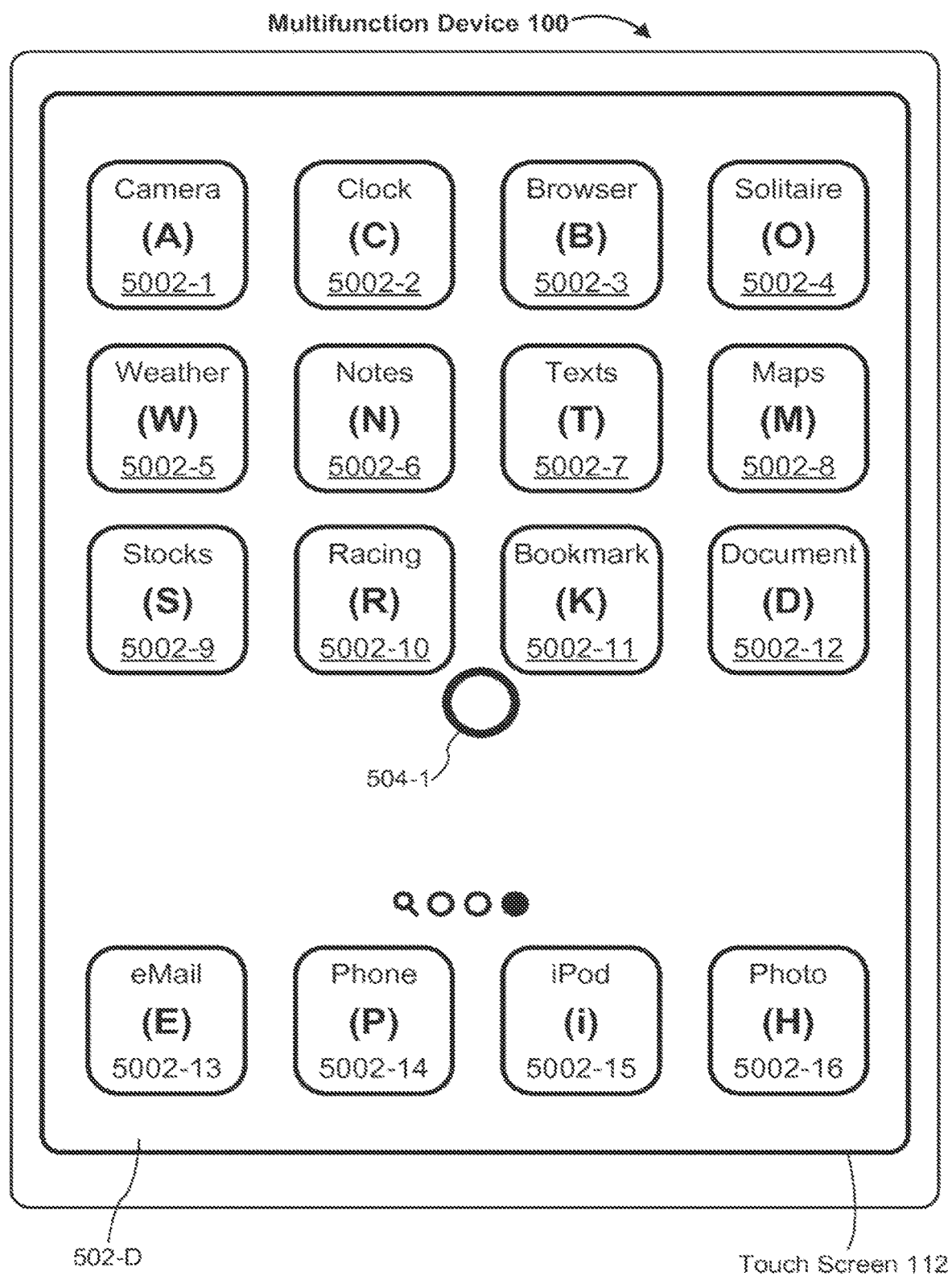

FIG. 5U illustrates that home screen 502-D is displayed in response to selection of home button icon 510-4. In some embodiments, home screen 502-D includes a plurality of application icons 5002.

Figure 5V:
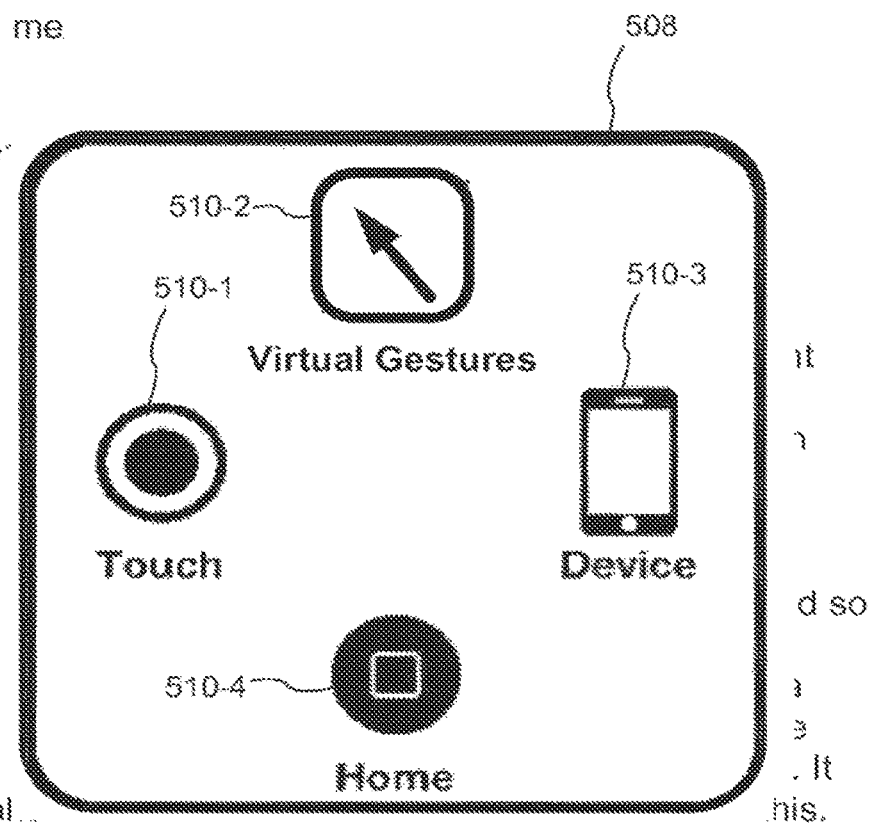

FIG. 5V illustrates that, in some embodiments, visual indicator 504-1 is displayed off menu 508. In some embodiments, in response to receiving an input from the adaptive input device (e.g., activation of the button 488-1 on adaptive input device 482, FIG. 4C) while visual indicator 504-1 is displayed off menu 508, menu 508 ceases to be displayed. In some embodiments, if no input is received from the adaptive input device for a predefined period while menu 508 is displayed, menu 508 ceases to be displayed.

Figure 5W:
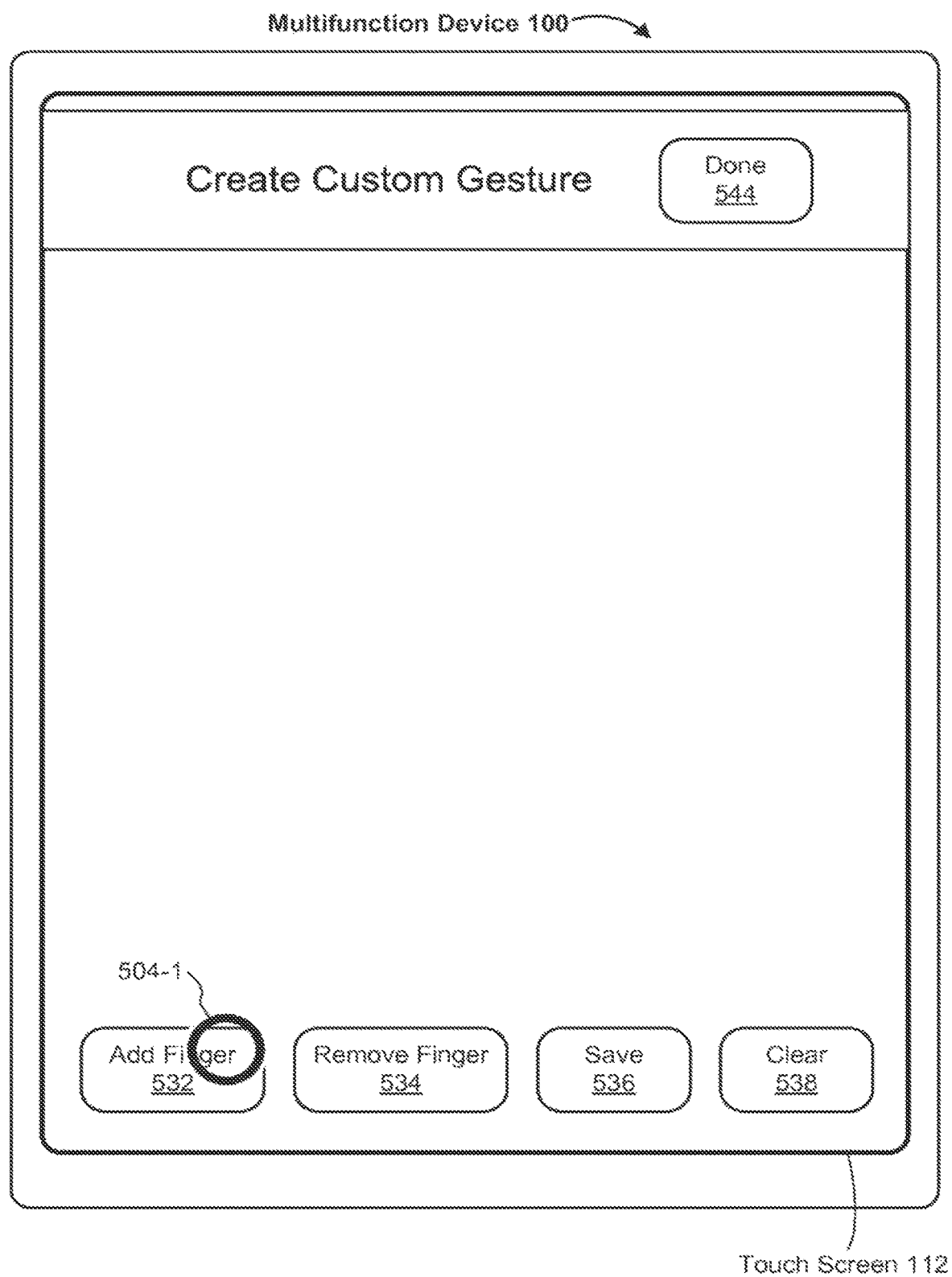

FIGS. 5W-5AC illustrate exemplary user interfaces for creating a user-defined gesture (also called a user-configured gesture or a custom gesture) in accordance with some embodiments. In FIG. 5W, a user interface for creating user-defined gestures is displayed. The user interface includes a plurality of user interface objects, such as add finger button 532, remove finger button 534, save button 536, clear button 538, and done button 544. FIG. 5W also illustrates that add finger button 532 is selected with visual indicator 504-1.

Figure 5X:
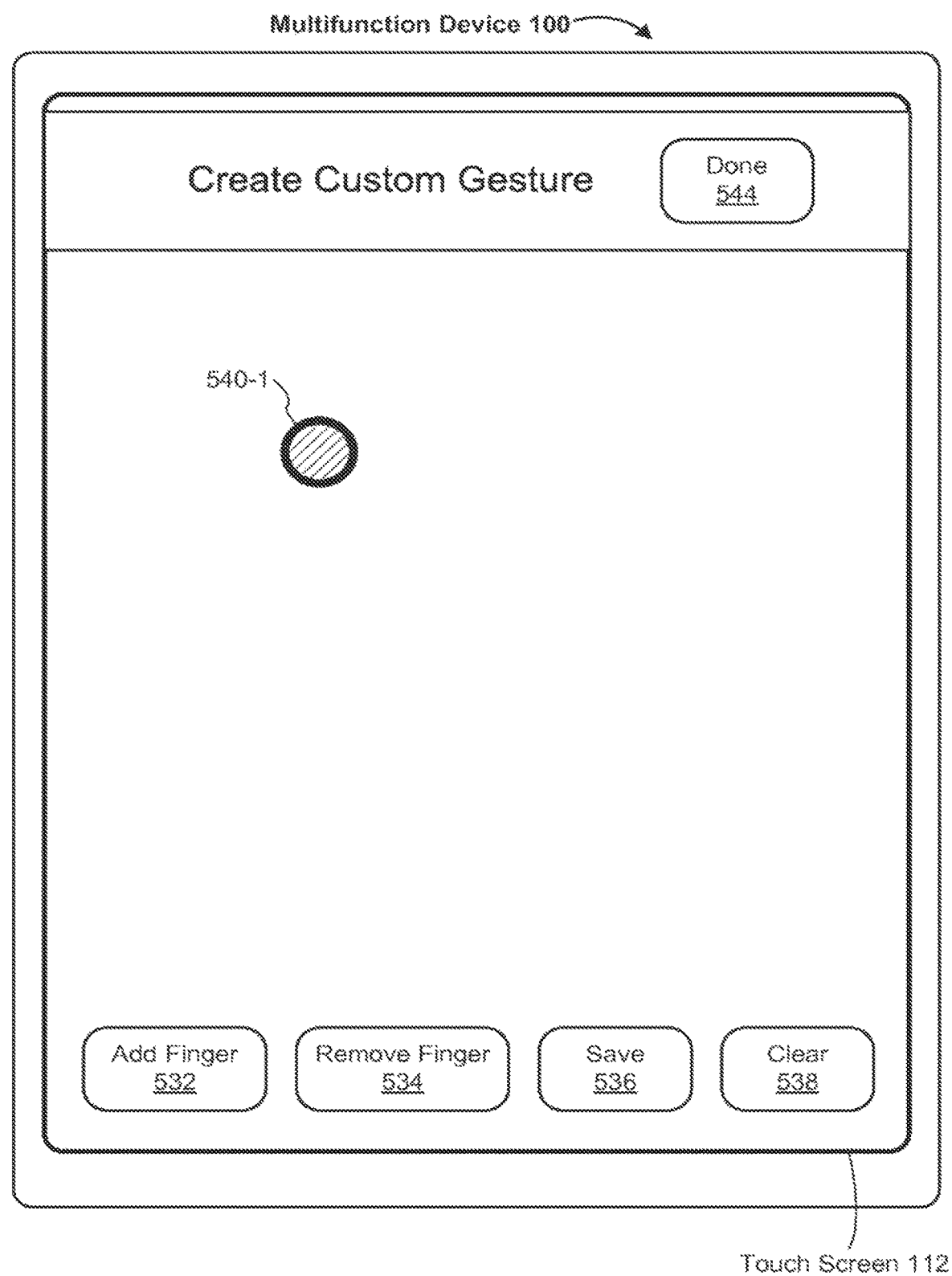

FIG. 5X illustrates that in response to selection of the add finger button 532, first visual indicator 540-1 is displayed for creating a custom gesture.

Figure 5Y:
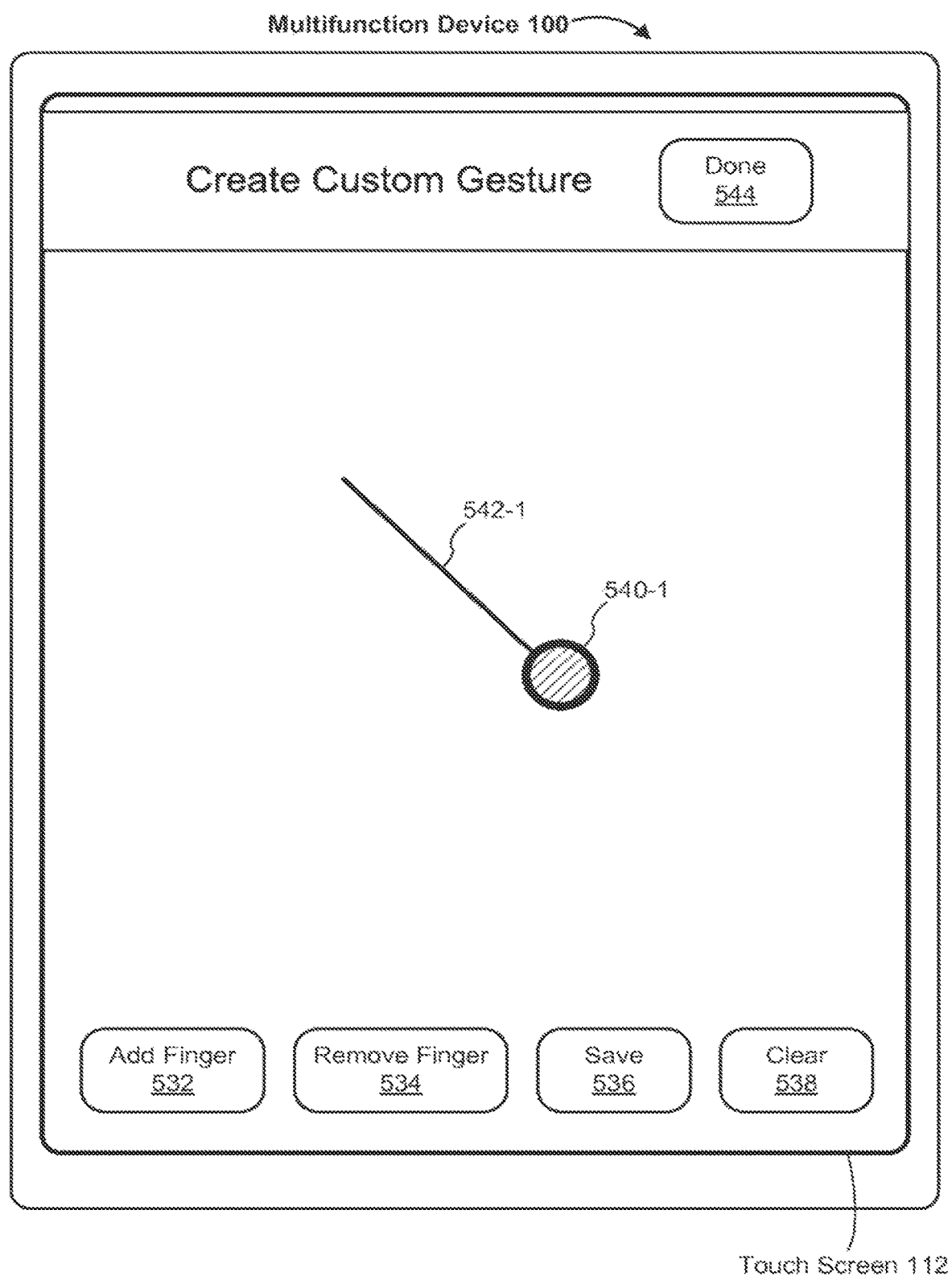

In FIG. 5Y, first visual indicator 540-1 is moved in accordance with one or more inputs from the adaptive input device. Also shown in FIG. 5Y is trail 542-1 of first visual indicator 540-1.

Figure 5Z:
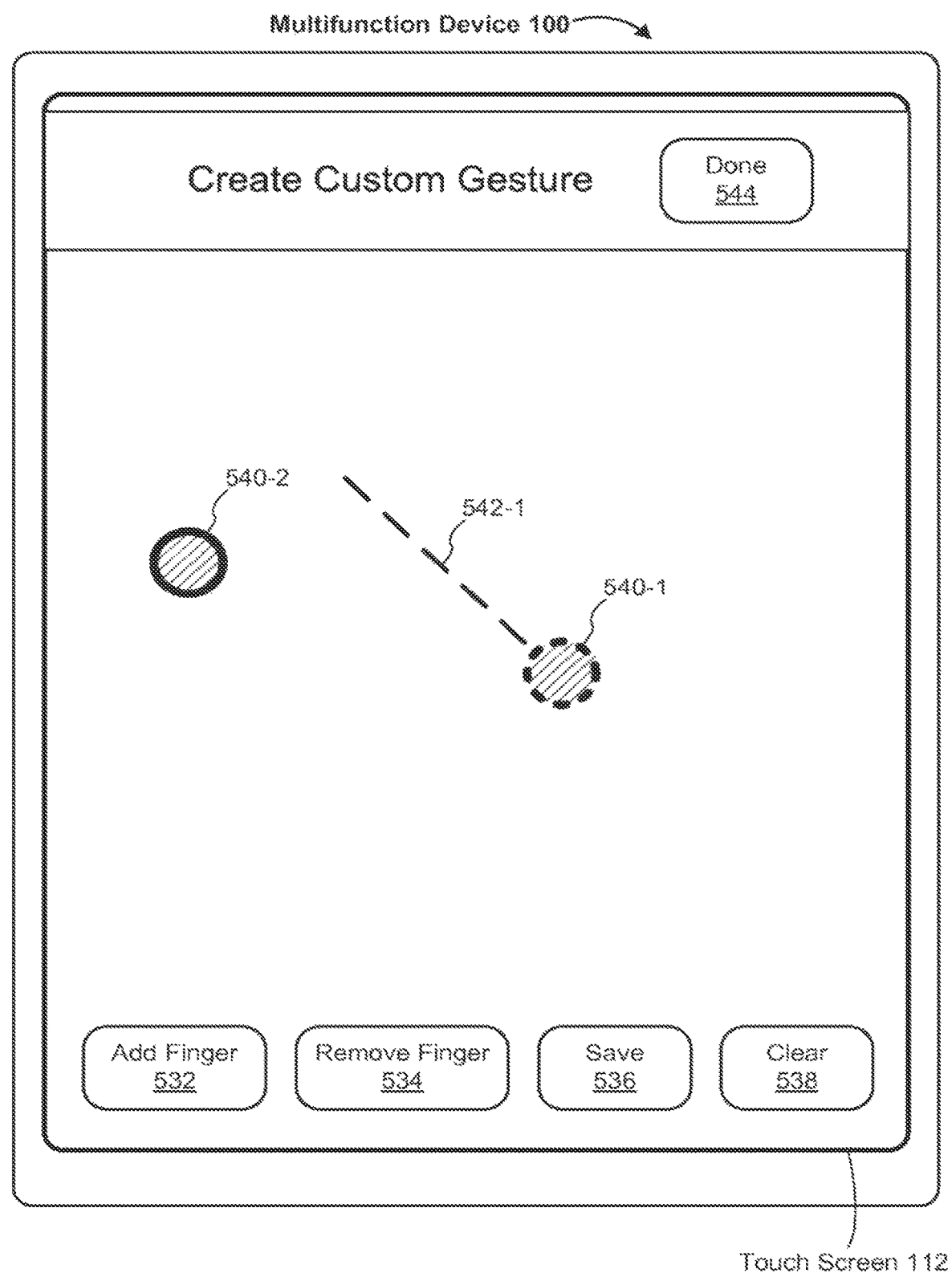
Figure 5A:
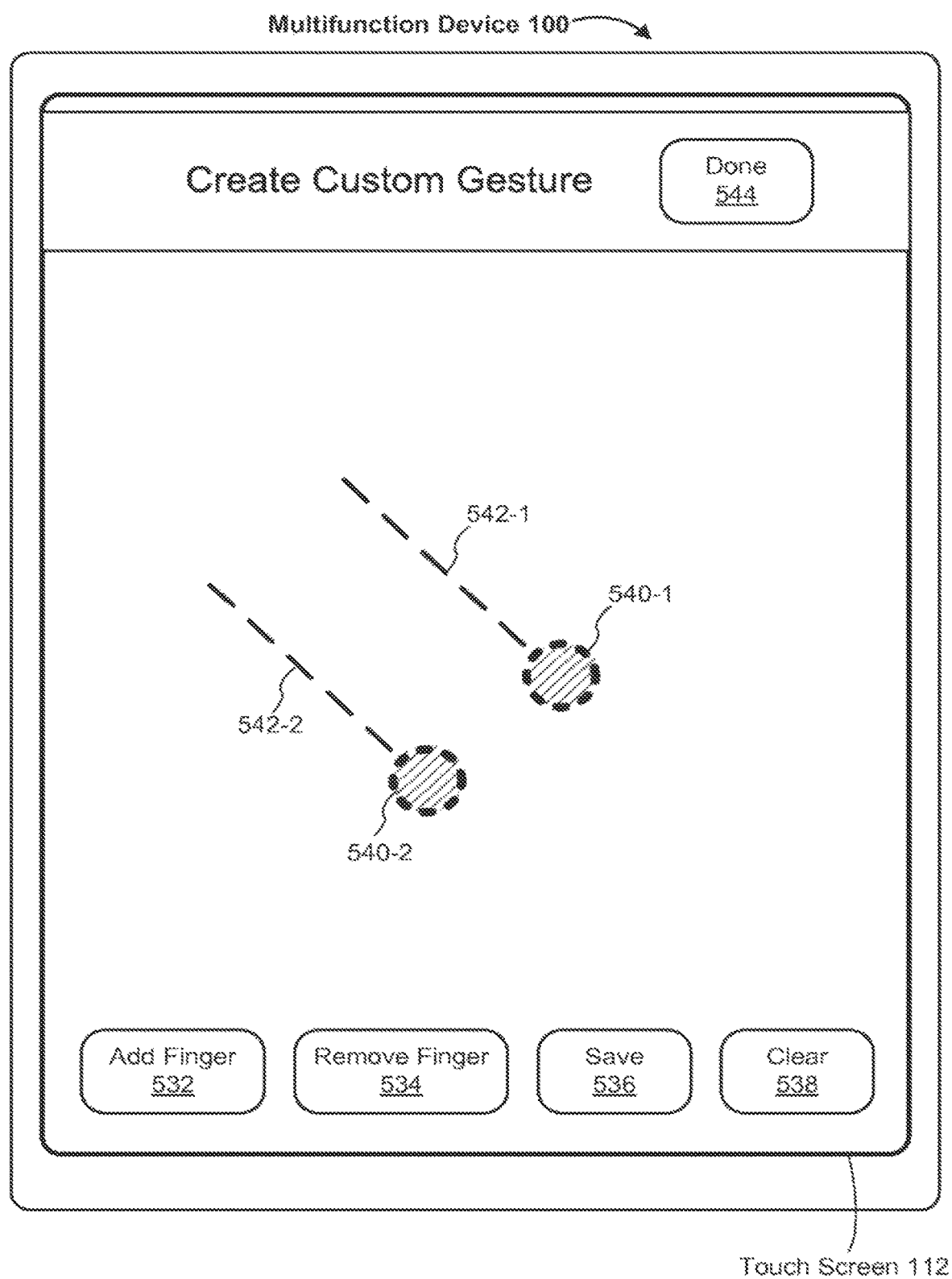
Figure 5A:
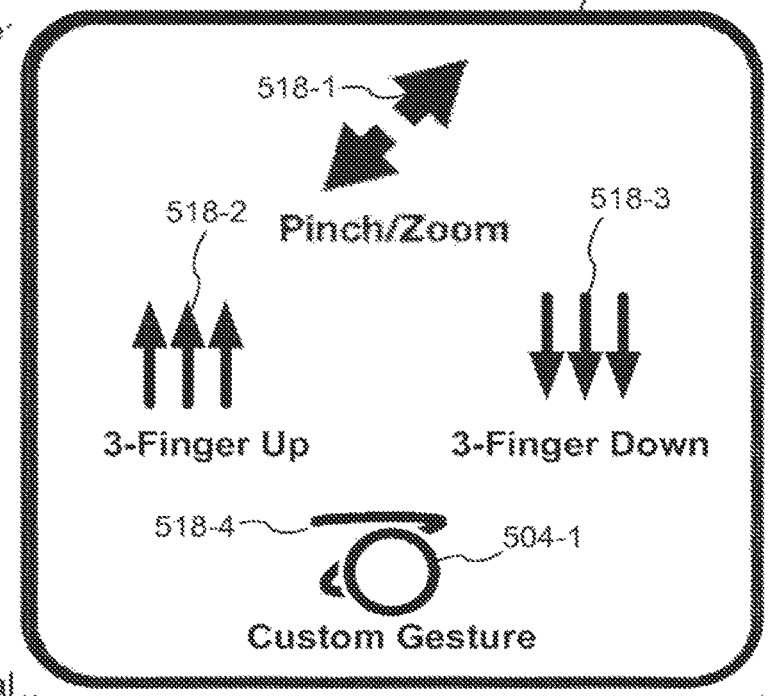
Figure 5A:
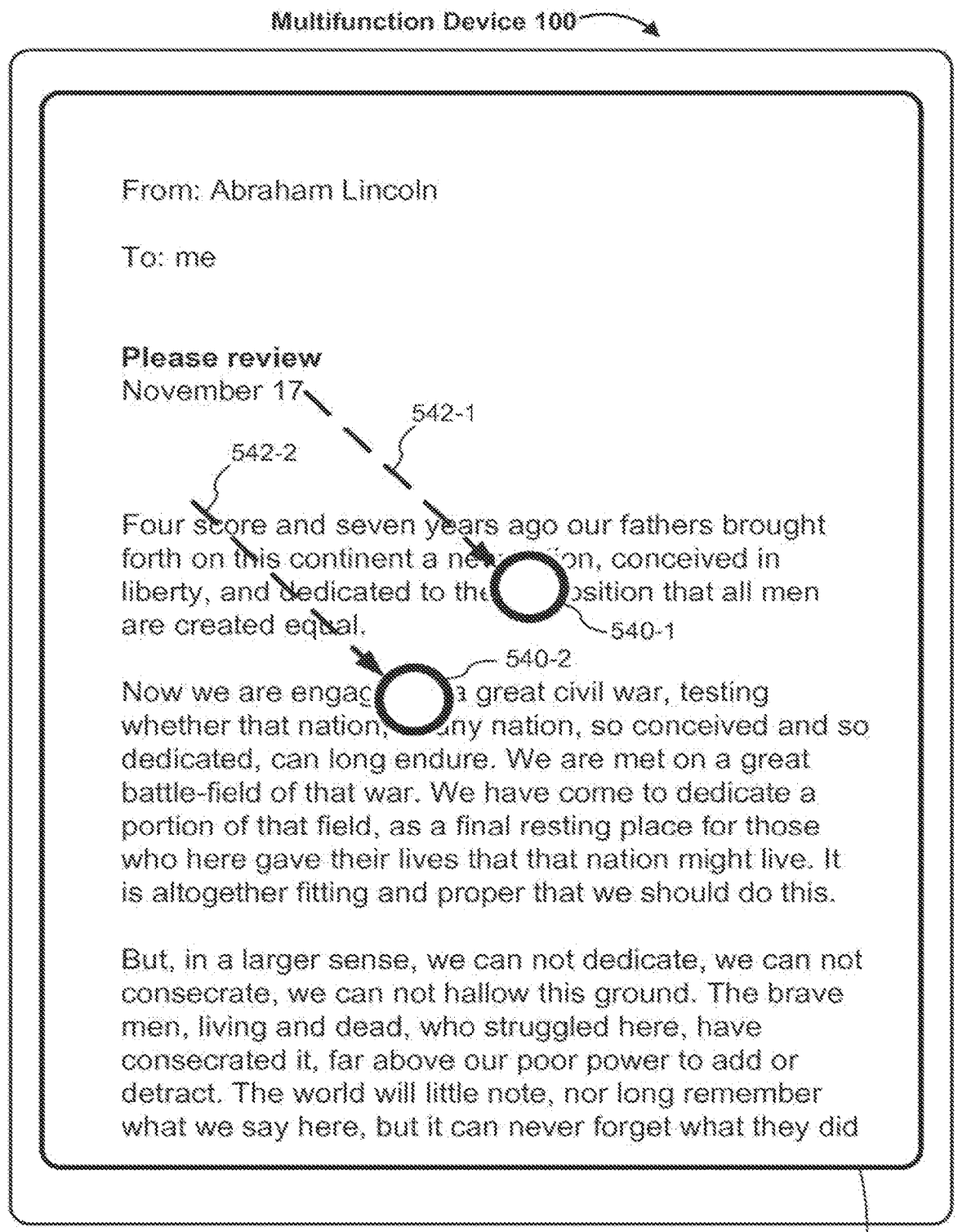

FIG. 5Z illustrates that in response to second selection of add finger button 532, second visual indicator 540-2 is displayed.

In FIG. 5AA, second visual indicator 540-2 is moved in accordance with one or more inputs from the adaptive input device. Also shown in FIG. 5AA is trail 5422 of second visual indicator 540-2. Save button 536 may be selected to store the user-defined gesture including the movements of visual indicators 540-1 and 540-2.

In FIG. 5AB, menu 516 of virtual gestures that includes a plurality of icons 518 (e.g., virtual two-finger pinch/depinch gesture icon 518-1, virtual three-finger swipe up gesture icon 518-2, virtual three-finger swipe down gesture icon 518-3, virtual user-defined gesture icon 518-4, etc.) is displayed. FIG. 5AB also illustrates that user-defined gesture icon 518-4 is selected with visual indicator 504-1.

In some embodiments, if the user has stored more than one user-defined virtual gesture, then a menu of at least some of these user-defined virtual gestures will be displayed in response to selection of custom gesture icon 518-4 (not shown). Activation of a particular user-defined virtual gesture in the menu of user-defined virtual gestures (e.g., with visual indicator 504-1, not shown) will implement the corresponding operation. On the other hand, if custom gesture icon 518-4 corresponds to a single user-defined virtual gesture, then the operation that corresponds to the single user-defined virtual gesture will be implemented in response to selection of custom gesture icon 518-4. For example, FIG. 5AC illustrates that a predefined operation associated with a user-defined virtual gesture is performed, namely the two-finger virtual gesture created and stored in FIGS. 5W-5AA. In some embodiments, an animated movement of visual indicators 540-1 and 540-2 is displayed along with their respective trails 542-1 and 542-2 immediately before, immediately after, or while the predefined operation associated with the user-defined virtual gesture is performed.

FIGS. 6A-6E are flow diagrams illustrating a method 600 of providing accessibility to a touch-based user interface in accordance with some embodiments. Method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 makes devices with touch-based user interfaces accessible to users without fine motor skills in their hands. The method makes it possible for such users to perform operations that would otherwise require interaction with the touch-sensitive surface of the device.

The device displays (602), on the display, a first visual indicator (e.g., 504-1, FIG. 5A) that corresponds to a virtual touch (e.g., a virtual touch on the touch-sensitive surface, such as a virtual single finger contact).

In some embodiments, the first visual indicator comprises (604) one of: a ring (e.g., 504-1, FIG. 5A), donut, circle, oval, ellipse, arrow, cross, I-beam, star, or virtual finger.

The device receives (606) a first input from an adaptive input device (e.g., joystick 486, button 488-1 or 488-2 in FIG. 4C, or any other adaptive input device).

In some embodiments, the first input moves (608) the first visual indicator to a predefined region of the display. For example, moving the visual indicator to a corner of the display (e.g., a predefined active screen corner) results in display of a first menu (e.g., movement 506-1, FIG. 5A). As another example, moving the visual indicator to a corner of the display followed by activation of a button on the adaptive input device results in display of the first menu.

In some embodiments, the first input corresponds (610) to activation of a control on the adaptive input device (e.g., activating a physical button, such as a menu button 488-2 in FIG. 4C, on the adaptive input device).

In some embodiments, the first input corresponds (612) to moving a control on the adaptive input device from side-to-side (e.g., moving joystick 486 in FIG. 4C side-to-side, or moving a control on the adaptive input device side-to-side with a body part, such as a hand, eye, foot, head, or mouth).

In some embodiments, the adaptive input device includes (614) a joystick (e.g., 486, FIG. 4C) and the first input corresponds to moving the joystick from side-to-side.

In response to receiving the first input from the adaptive input device, the device displays (616) a first menu on the display (e.g., menu 508, FIG. 5B). The first menu includes a virtual touches selection icon (e.g., icon 510-1, FIG. 5B). In response to detecting selection of the virtual touches selection icon, a menu of virtual multitouch contacts is displayed (e.g., menu 512, FIG. 5D).

In some embodiments, the first menu includes (618) icons displayed radially about a center of the first menu (e.g., a concentric arrangement about the center). For example, menu 508 in FIG. 5B includes icons 510 displayed radially about a center of menu 508. As additional examples, icons in some other menus described herein (e.g., menu 512 in FIG. 5D, menu 516 in FIG. 5I, and menu 528 in FIG. 5R) are displayed radially about a center of the corresponding menu. In addition, icons in menu 524 in FIG. 5Q may be displayed radially about a center of menu 524. This arrangement of icons in the menu makes each icon readily accessible.

In some embodiments, a first user interface (e.g., user interface 502-A, FIG. 5A) is displayed (620) on the display immediately prior to receiving the first input from the adaptive input device, and the first menu (e.g., menu 508, FIG. 5B) is displayed over the first user interface (e.g., as a semitransparent, translucent, or opaque overlay). Similarly, the other menus described herein (e.g., menu 512 in FIG. 5D, menu 516 in FIG. 5I, menu 524 in FIG. 5Q, and menu 528 in FIG. 5R) may be displayed as semitransparent, translucent, or opaque overlays on an underlying standard user interface. These overlay menus help make control of the electronic device via the adaptive input device quite similar to the control of the device using the standard user interface.

In some embodiments, in response to receiving the first input from the adaptive input device, the device displays (622) the first visual indicator in a center region of the first menu. For example, in FIG. 5B, visual indicator 504-1 is displayed at the center of the menu 508 when menu 508 is initially displayed. Displaying the visual indicator at the center of the first menu makes each of the options in the first menu readily accessible. Similarly, the visual indicator may be displayed initially at the center of the other menus described herein (e.g., menu 512 in FIG. 5D, menu 516 in FIG. 5I, menu 524 in FIG. 5Q, and menu 528 in FIG. 5R) when those menus are displayed in response to input received from the adaptive input device.

In some embodiments, while displaying a menu on the display (e.g., menu 508 in FIG. 5B, menu 512 of virtual multitouch contacts in FIG. 5D, menu 516 of virtual gestures in FIG. 5I, menu 524 of virtual device operations in FIG. 5Q, menu 528 of virtual device rotations in FIG. 5R, or any accessible menu), the device constrains (624, FIG. 6B) movement of the first visual indicator such that the first visual indicator remains on the menu (e.g., to prevent overshoot of visual indicator 504-1).

In some embodiments, while displaying the first menu on the display, the device receives (626) a second input from the adaptive input device when the first visual indicator is displayed off the first menu (e.g., detecting activation of button 488-1 in FIG. 4C on the adaptive input device when visual indicator 504-1 is located over a display area beyond the first menu, FIG. 5V); and, in response to the second input, ceasing to display the first menu (e.g., displaying user interface 502-A, FIG. 5A). Similarly, the other menus described herein (e.g., menu 508 in FIG. 5B, menu 512 of virtual multitouch contacts in FIG. 5D, menu 516 of virtual gestures in FIG. 5I, menu 524 of virtual device operations in FIG. 5Q, menu 528 of virtual device rotations in FIG. 5R, or any accessible menu) may be dismissed when an input is received from the adaptive input device when the visual indicator is not over the menu.

In some embodiments, while displaying the first menu on the display, the device waits (628) to receive input from the adaptive input device for more than a predefined time period (e.g., 5 seconds, 10 seconds, 15 seconds, or any reasonable time period). In some embodiments, the predefined time period is set by a user (e.g., via a settings menu). In response to waiting to receive input from the adaptive input device for more than the predefined time period (e.g., without receiving input from the adaptive input device), the device ceases to display the first menu (e.g., displaying user interface 502-A, FIG. 5A). Similarly, the other menus described herein (e.g., menu 508 in FIG. 5B, menu 512 of virtual multitouch contacts in FIG. 5D, menu 516 of virtual gestures in FIG. 5I, menu 524 of virtual device operations in FIG. 5Q, menu 528 of virtual device rotations in FIG. 5R, or any accessible menu) may be dismissed when input is not received from the adaptive input device within a predefined time period.

In some embodiments, the device detects (630, FIG. 6C) selection of the virtual touches selection icon (e.g., virtual touch selection icon 510-1, FIG. 5C). For example, the device detects activation of a button (e.g., 488-1, FIG. 4C) on the adaptive input device when the visual indicator is located over the virtual touches selection icon (e.g., visual indicator 504-1, FIG. 5C), or detects the visual indicator moving across the virtual touches selection icon. In response to detecting selection of the virtual touches selection icon, the device displays the menu of virtual multitouch contacts (e.g., menu 512, FIG. 5D). The menu of virtual multitouch contacts includes a plurality of icons representing types of virtual multitouch contacts (e.g., two-finger contacts icon 514-1, three-finger contacts icon 514-2, four-finger contacts icon 514-3, and five-finger contacts icon 514-4 in menu 512, FIG. 5D). In some embodiments, the menu of virtual multitouch contacts also includes a single-finger contact icon (not shown). The device detects selection of a respective virtual multitouch contacts icon in the menu of virtual multitouch contacts (e.g., detecting selection of the virtual three-finger contacts icon 514-2 in FIG. 5D, such as by detecting activation of a button on the adaptive input device when the visual indicator is located over virtual three-finger contacts icon 514-2 or detecting the visual indicator moving across the virtual three-finger contacts icon). In response to detecting selection of the respective virtual multitouch contacts icon in the menu of virtual multitouch contacts, the device displays one or more second visual indicators (e.g., visual indicators 504-2 through 504-4 in FIG. 5E) that correspond to the respective virtual multitouch contacts icon. In some embodiments, in response to detecting selection of the respective virtual multitouch contacts icon in the menu of virtual multitouch contacts, the device also ceases to display the menu of virtual multitouch contacts (e.g., menu 512 is not displayed in FIG. 5E). In some embodiments, the second visual indicators are part of a single icon that represents multiple contacts that correspond to the respective virtual multitouch contacts icon. Therefore, the one or more second visual indicators typically move in unison (e.g., moving a same distance in a same direction at a same speed). In some embodiments, the second visual indicators are multiple icons that represent multiple contacts that correspond to the respective virtual multitouch contacts icon.

In some embodiments, displaying the second visual indicators includes (632) displaying a number of visual indicators that correspond to the respective virtual multitouch contacts icon. For example, in response to selection of the virtual three-finger contacts icon 514-2 in FIG. 5D, three visual indicators that correspond to three virtual touches are displayed in FIG. 5E. Similarly, in response to selection of the virtual two-finger contacts icon 514-1 in FIG. 5D, the device displays two visual indicators that correspond to two virtual touches (not shown); in response to selection of the virtual four-finger contacts icon 514-3 in FIG. 5D, the device displays four visual indicators that correspond to four virtual touches (not shown); and, in response to selection of the virtual five-finger contacts icon 514-4 in FIG. 5D, the device displays five visual indicators that correspond to five virtual touches (not shown).

In some embodiments, the device receives (634) a second input from the adaptive input device; and, in response to receiving the second input from the adaptive input device: moves the one or more second visual indicators, and performs an operation in accordance with the movement of the one or more second visual indicators. For example, in FIG. 5E, inputs received by pushing the joystick to the left are used to move the three visual indicators to the left and navigate to a next open application, just as if three actual finger contacts were moving to the left on the touch-sensitive surface.

In some embodiments, while displaying the one or more second visual indicators, the device waits (636) to receive input from the adaptive input device for more than a predefined time period (e.g., 5 seconds, 10 seconds, 15 seconds, or any reasonable time period); and, in response to waiting to receive input from the adaptive input device for more than the predefined time period, replaces display of the one or more second visual indicators with display of the first visual indicator. For example, in response to waiting to receive input from the adaptive input device for more than the predefined time period (without receiving input from the adaptive input device), the device replaces display of three visual indicators 504-2 through 504-4 (FIG. 5F) with display of single visual indicator 504-1 (FIG. 5G). In some embodiments, the predefined time period is set by a user (e.g., via a settings menu, not shown).

In some embodiments, while displaying the one or more second visual indicators, the device waits for a user input for a first predefined time interval. In accordance with a determination that no user input was received during the first predefined time interval, the device replaces the display of the second visual indicator with a display of a third visual indicator distinct from the second visual indicator (e.g., different brightness, different color, different line pattern, different transparency, etc.).

In some embodiments, the second visual indicator and the third visual indicator represent the same number of touches.

In some embodiments, while displaying the third visual indicator, the device waits for a user input for a second predefined time interval. In some embodiments, the second predefined time interval is identical to the first predefined time interval. In other embodiments, the second predefined time interval is distinct from the first predefined time interval. In accordance with a determination that no user input was received during the second predefined time interval, the device replaces the display of the third visual indicator with a display of the first indicator.

In some embodiments, the device displays (638, FIG. 6D) a virtual gestures icon (e.g., 510-2 in menu 508, FIG. 5H); detects selection of the virtual gestures icon; and, in response to detecting selection of the virtual gestures icon, displays a menu of virtual gestures (e.g., 516, FIG. 5I). The menu of virtual gestures includes a plurality of icons representing types of virtual gestures (e.g., icons 518, FIG. 5I). The device detects selection of a respective virtual gesture icon in the menu of virtual gestures (e.g., detecting selection of the virtual three-finger swipe up gesture icon 518-2 in FIG. 5I by activation of a button on the adaptive input device); and, in response to detecting selection of the respective virtual gesture icon in the menu of virtual gestures, performs an action that corresponds to the respective virtual gesture. For example, in response to selection of the virtual three-finger swipe up gesture icon 518-2 in FIG. 5I, the device displays application icon area 520 that includes a plurality of open application icons shown in FIG. 5J. In some embodiments, the device may perform actions corresponding to certain gestures without displaying visual indicators that correspond to the gestures (e.g., in FIG. 5J, open application icon area 520 is displayed without displaying visual indicators that correspond to the three-finger swipe up gesture).

In some embodiments, the device displays (640) a virtual gestures icon (e.g., 510-2 in menu 508, FIG. 5H); detects selection of the virtual gestures icon (e.g., detecting activation of a button on the adaptive input device when the visual indicator is located over the virtual gestures icon, or detecting the visual indicator moving across the virtual gestures icon); and, in response to detecting selection of the virtual gestures icon, displays a menu of virtual gestures (e.g., 516, FIG. 5I). The menu of virtual gestures includes a plurality of icons representing types of virtual gestures (e.g., virtual two-finger pinch/depinch gesture icon 518-1, virtual three-finger swipe up gesture icon 518-2, virtual three-finger swipe down gesture icon 518-3, virtual user-configured gesture icon 518-4, FIG. 5I). The device detects selection of a respective virtual gesture icon in the menu of virtual gestures (e.g., detecting selection of virtual two-finger pinch/depinch gesture icon 518-1 in FIG. 5I, such as by detecting activation of a button on the adaptive input device when the visual indicator is located over virtual two-finger pinch/depinch gesture icon 518-1 or detecting the visual indicator moving across the virtual two-finger pinch/depinch gesture icon); and, in response to detecting selection of the respective virtual gesture icon in the menu of virtual gestures, displays a number of visual indicators that correspond to the respective virtual gesture icon. For example, in response to selection of virtual two-finger pinch/depinch gesture icon 518-1 in FIG. 5K, two visual indicators that correspond to two virtual touches are displayed in FIG. 5L. The device receives a second input from the adaptive input device; and, in response to receiving the second input from the adaptive input device, performs an operation in accordance with the respective virtual gesture. For example, in FIG. 5M, inputs received by the adaptive input device move two visual indicators 504-5 and 504-6 and scroll user interface 502-A. In another example, in FIG. 5O, inputs received by the adaptive input device displays the user interface at a different magnification (e.g., a zooming operation).

In some embodiments, in response to receiving the second input from the adaptive input device, the device moves (642) the displayed visual indicators that correspond to the respective virtual gesture to simulate movement of actual contacts on the touch sensitive surface (e.g., in FIG. 5M, inputs received by the adaptive input device move the two visual indicators 504-5 and 504-6).

In some embodiments, the device displays (644) a pinch/depinch gesture icon (e.g., in the first menu or in a virtual gestures menu); detects selection of the virtual pinch/depinch gesture icon (e.g., detecting activation of a button on the adaptive input device when the visual indicator is located over the virtual pinch/depinch gesture icon, or detecting the visual indicator moving across the virtual pinch/depinch gesture icon); and, in response to detecting selection of the virtual pinch/depinch gesture icon, displays two visual indicators that correspond to contacts in the virtual pinch/depinch gesture. The device receives a second input from the adaptive input device; and, in response to receiving the second input from the adaptive input device, performs an operation in accordance with the virtual pinch/depinch gesture. In some embodiments, while the two visual indicators that correspond to contacts in the virtual pinch/depinch gesture are displayed, inputs received from the adaptive input device are used to perform actions that correspond to an actual pinch/depinch gesture on the touch-sensitive surface. For example, inputs received by pushing a joystick to the right are used to move the two visual indicators apart (depinch) and zoom in the display. Conversely, inputs received by pushing the joystick to the left are used to move the two visual indicators together (pinch) and zoom out the display. Thus, a user can use an adaptive input device to operate an electronic device with a touch-based user interface (e.g., perform virtual gestures on the display, etc.), even though the user does not actually touch the touch-sensitive surface on the device.

In some embodiments, in response to detecting selection of the virtual pinch/depinch gesture icon (e.g., 518-1, FIG. 5K), the device displays a user interface in a first operating mode. The first operating mode includes displaying a first visual indicator that includes two first-mode virtual touch points and a first connector linking the two first-mode virtual touch points. While in the first operating mode, the device detects a first predefined user input from an adaptive input device (e.g., a selection of a lock button 488-1, FIG. 4C). In response to detecting the first predefined user input while in the first operating mode, the device enters a second operating mode (e.g., terminating the first operating mode). The second operating mode includes replacing the first visual indicator with a second visual indicator that includes two second-mode virtual touch points (e.g., 5047 and 504-8, FIG. 5N), and a second connector linking the two second-mode virtual touch points. While in the second operating mode, the device detects a respective user input from the adaptive input device. In response to detecting the respective user input while in the second operating mode, the device performs a predefined operation (e.g., a zoom-in or zoom-out operation) that corresponds to a pinch or depinch gesture in accordance with the respective user input. The zooming operation is just one example of a predefined operation that may be performed in response to the virtual pinch/depinch gesture. As another example, in a photo application, a virtual depinch gesture on an album in a set of albums may result in display of the set of albums being replaced with display of digital photos in the selected album (not shown). In turn, a virtual depinch gesture on a photo in the selected album may result in display of the selected album being replaced with display of the selected photo. Conversely, a virtual pinch gesture on the selected photo may result in display of the selected photo being replaced with display of the selected album. In turn, a virtual pinch gesture on digital photos in the selected album may result in display of the digital photos in the selected album being replaced with display of the set of albums. More generally, any operation that is performed in the touch-based user interface by an actual pinch or depinch gesture on the touch-sensitive surface may also be performed by a virtual pinch or depinch gesture made with input from the adaptive input device.

In some embodiments, in response to detecting the respective user input while in the second operating mode, the device updates the display of the second visual indicator by moving respective locations of the two second-mode virtual touch points and adjusting a length of the second connector linking the two second-mode virtual touch points (e.g., moving second-mode visual indicators 504-7 and 504-8 and connector 522, FIG. 5O).

In some embodiments, while in the second operating mode, the device detects a second predefined user input from the adaptive input device; and, in response to detecting the second predefined user input while in the second operating mode, enters the first operating mode (e.g., terminating the second operating mode). For example, display of the second-mode visual indicators in FIG. 5O may be replaced with display of first-mode visual indicators. In some embodiments, changing from the second operating mode to the first operating mode does not change the magnification of the displayed user interface.

In some embodiments, while in the first operating mode, the device detects a second respective user input from the adaptive input device; and, in response to detecting the second predefined user input while in the first operating mode, the device scrolls the user interface in accordance with the second respective user input (e.g., the scrolled user interface in FIG. 5N).

In some embodiments, each first-mode virtual touch point includes a ring-shaped display object (e.g., 504-5 and 504-6 in FIG. 5M); and each second-mode virtual touch point includes the ring-shaped display object and a concentric circle inside the ring-shaped display object (504-7 and 504-8 in FIG. 5N).

In some embodiments, each connector includes a chain-shaped display object (e.g., 522, FIG. 5M).

In some embodiments, a zooming operation (e.g., zooming in the display or zooming out the display) is performed (646) in accordance with the virtual pinch/depinch gesture (e.g., see the zoomed-in user interface 502-A in FIG. 5O).

In some embodiments, the device displays (648, FIG. 6E) a virtual device icon (e.g., 510-3 in FIG. 5P); detects selection of the virtual device icon; and, in response to detecting selection of the virtual device icon, displays a menu of virtual device operations (e.g., menu 524 in FIG. 5Q). The menu of virtual device operations includes a plurality of icons representing types of virtual device operations (e.g., icons 526 in FIG. 5Q). Exemplary virtual device operations may include operations that are normally performed via physical controls on the electronic device, such as: muting and unmuting the ringer and sound effects on the device, which is normally performed via a mute switch; locking the device, which is normally initiated via a lock/ unlock switch; increase volume, which is normally performed via a volume up button; decrease volume, which is normally performed via a volume down button. Exemplary virtual device operations may also include shaking the electronic device to perform a predefined operation (e.g., an undo operation) and rotating the electronic device to rotate the display orientation. Operations like shaking and rotation are typically detected via an accelerometer in the electronic device. The device detects selection of a respective virtual device operation icon in the menu of virtual device operations (e.g., detecting selection of virtual device rotation icon 526-2 in FIG. 5Q, such as by detecting activation of a button on the adaptive input device when the visual indicator is located over virtual device rotation icon 526-2 or detecting the visual indicator moving across virtual device rotation icon 526-2); and, in response to detecting selection of the respective virtual device operation icon in the menu of virtual device operations, performs an action that corresponds to the respective virtual device operation. For example, in response to selection of virtual device lock screen icon 526-4 in FIG. 5Q, the device locks the screen of the device or launches a screen saver application (not shown). Thus, a user can also use the adaptive input device to operate the physical controls on the electronic device, even though the user does not actually touch the physical controls on the device.

In some embodiments, the device displays (650) a virtual device rotation icon (e.g., 526-2 in menu 524, FIG. 5Q); detects selection of the virtual device rotation icon; and, in response to detecting selection of the virtual device rotation icon, displays a menu of virtual device orientations (e.g., menu 528, FIG. 5R). The menu of virtual device orientations includes a plurality of icons representing types of virtual device orientations (e.g., virtual portrait orientation icon 530-1, virtual landscape orientation left icon 530-2, virtual landscape orientation right icon 530-3, and virtual upside down portrait orientation icon 530-4, FIG. 5R). The device detects selection of a respective virtual device orientation icon in the menu of virtual device orientations (e.g., detecting selection of the virtual landscape orientation left icon 530-2 in FIG. 5R, such as by detecting activation of a button on the adaptive input device when the visual indicator is located over the virtual landscape orientation left icon 530-2 or detecting the visual indicator moving across the virtual landscape orientation left icon 530-2); and, in response to detecting selection of the respective virtual device orientation icon in the menu of virtual device orientations, orients the display in accordance with the respective virtual device orientation. For example, in response to selection of the virtual landscape orientation left icon 530-2 in FIG. 5R, the device changes the orientation of the user interface to that shown in FIG. 5S.

In some embodiments, the device includes (652) a home button (e.g., a virtual home button displayed on the display or a physical home button 204 separate from the display, FIG. 2). The device displays a home button icon (e.g., 510-4, in menu 508, FIG. 5T, or in the menu of virtual device operations); detects selection of the home button icon (e.g., detecting activation of a button on the adaptive input device when the visual indicator is located over the home button icon, or detecting the visual indicator moving across the home button icon); and, in response to detecting selection of the home button icon, performs an action that corresponds to activation of the home button. For example, in response to selection of home button icon 510-4 in FIG. 5T, home screen 502-D is displayed in FIG. 5U, just as if the home button 204 (FIG. 2) had been pressed.

Note that details of the processes described above with respect to method 600 are also applicable in an analogous manner to the other methods described herein, including methods 700, 800, 900, 1000, 1100, 1200, and 1300 described below. For brevity, these details are not repeated below.

Figure 7:
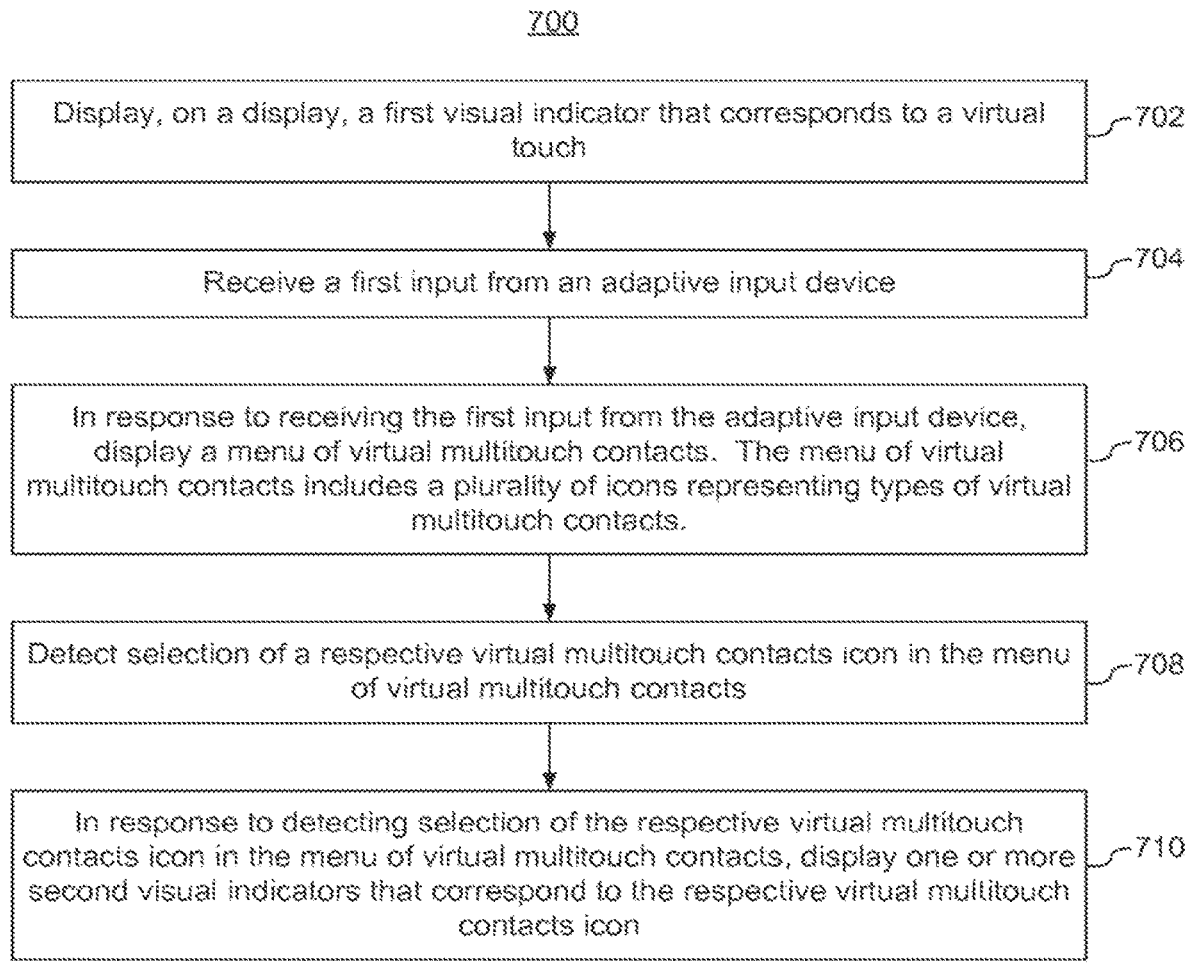
FIG. 7 is a flow diagram illustrating a method of using a menu of virtual multitouch contacts icon in accordance with some embodiments.

FIG. 7 is a flow diagram illustrating a method 700 of using a menu of virtual multitouch contacts icon in accordance with some embodiments. Method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 uses a menu of virtual multitouch contacts in conjunction with input from an adaptive input device (e.g., a joystick) to select a type of multitouch contact being emulated. This enables the user to perform, without using the touch-sensitive surface of the electronic device, multitouch operations that would otherwise require interaction with the touch-sensitive surface of the electronic device using multiple fingers.

The device displays (702), on the display, a first visual indicator that corresponds to a virtual touch (e.g., a virtual touch on the touch-sensitive surface, such as a virtual single finger contact); receives (704) a first input from an adaptive input device (e.g., detecting activation of a button on the adaptive input device when the visual indicator is located over the virtual touches selection icon, or detecting the visual indicator moving across the virtual touches selection icon); and, in response to receiving the first input from the adaptive input device, displays (706) a menu of virtual multitouch contacts (e.g., menu 512, FIG. 5D). The menu of virtual multitouch contacts includes a plurality of icons representing types of virtual multitouch contacts (e.g., two-finger contacts icon 514-1, three-finger contacts icon 514-2, four-finger contacts icon 514-3, and five-finger contacts icon 514-4 in menu 512, FIG. 5D). In some embodiments, the menu of virtual multitouch contacts also includes a single-finger contact icon (not shown).

The device detects (708) selection of a respective virtual multitouch contacts icon in the menu of virtual multitouch contacts (e.g., detecting selection of the virtual three-finger contacts icon 514-2 in FIG. 5D, such as by detecting activation of a button on the adaptive input device when the visual indicator is located over the virtual three-finger contacts icon 514-2 or detecting the visual indicator moving across the virtual three-finger contacts icon); and, in response to detecting selection of the respective virtual multitouch contacts icon in the menu of virtual multitouch contacts, displays (710) one or more second visual indicators that correspond to the respective virtual multitouch contacts icon (e.g., visual indicators 504-2 through 504-4, FIG. 5E). In some embodiments, in response to detecting selection of the respective virtual multitouch contacts icon in the menu of virtual multitouch contacts, the device also ceases to display the menu of virtual multitouch contacts. In some embodiments, the second visual indicators are part of a single icon that represents multiple contacts that correspond to the respective virtual multitouch contacts icon. In some embodiments, the second visual indicators are multiple icons that represent multiple contacts that correspond to the respective virtual multitouch contacts icon.

Figure 8:
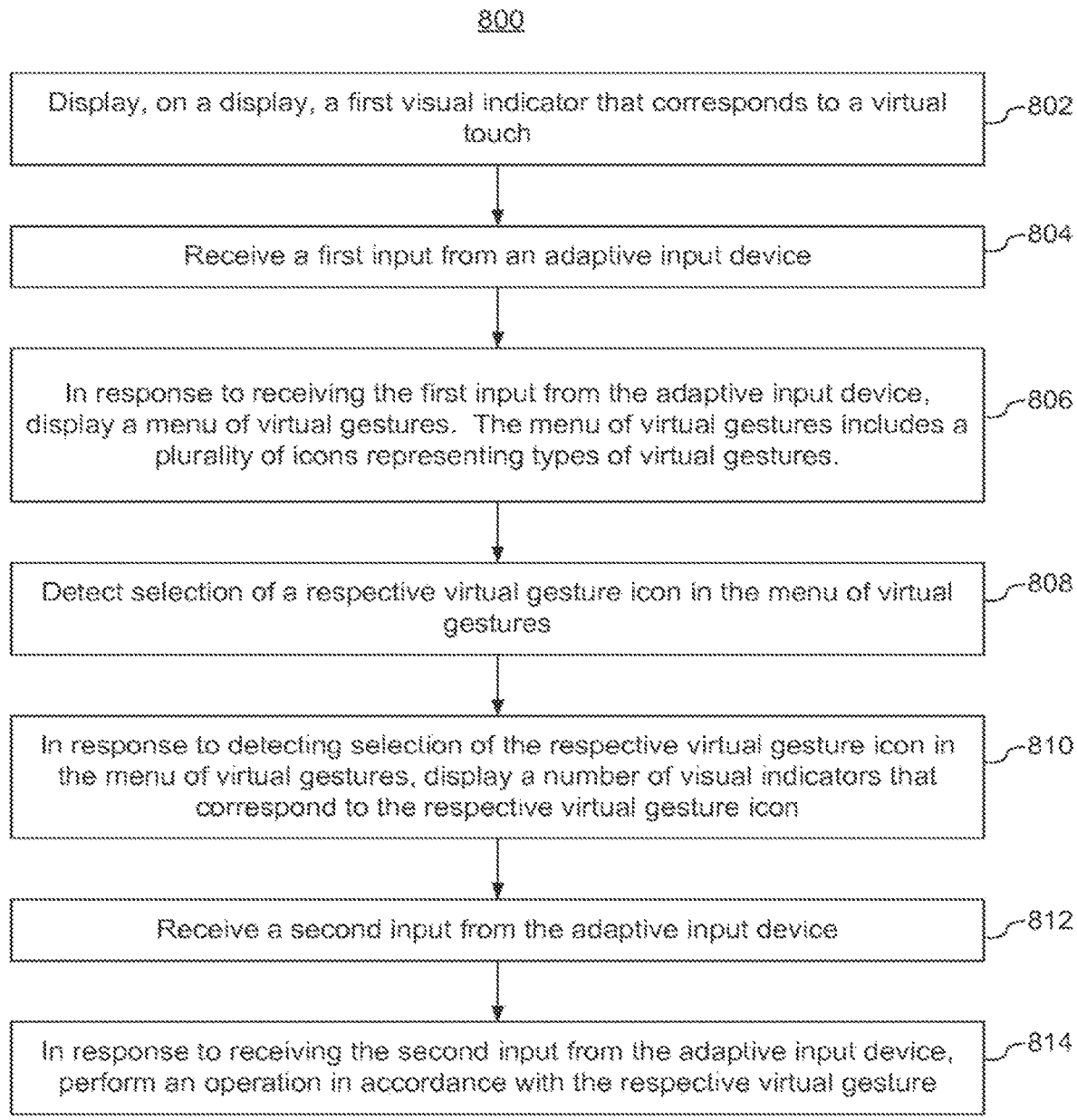
FIG. 8 is a flow diagram illustrating a method of using a menu of virtual gestures in accordance with some embodiments.

FIG. 8 is a flow diagram illustrating a method 800 of using a menu of virtual gestures in accordance with some embodiments. Method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 uses a menu of virtual gestures in conjunction with input from an adaptive input device to select and emulate actual gestures on a touch-sensitive surface. This allows a user to make, without using the touch-sensitive surface of the electronic device, virtual multitouch gestures that produce the same results as those obtained by interacting with the touch-sensitive surface of the electronic device using multiple fingers.

The device displays (802), on the display, a first visual indicator that corresponds to a virtual touch (e.g., a virtual touch on the touch-sensitive surface, such as a virtual single finger contact); receives (804) a first input from an adaptive input device (e.g., detecting activation of a button on the adaptive input device when the visual indicator is located over a virtual gestures icon, or detecting the visual indicator moving across the virtual gestures icon); and, in response to receiving the first input from the adaptive input device, displays (806) a menu of virtual gestures (e.g., menu 516, FIG. 5K). The menu of virtual gestures includes a plurality of icons representing types of virtual gestures (e.g., virtual two-finger pinch/depinch gesture icon 518-1, virtual three-finger swipe up gesture icon 518-2, virtual three-finger swipe down gesture icon 518-3, virtual user-configured gesture icon 518-4, FIG. 5K).

The device detects (808) selection of a respective virtual gesture icon in the menu of virtual gestures (e.g., detecting selection of the virtual two-finger pinch/depinch gesture icon 518-1 in FIG. 5K, such as by detecting activation of a button on the adaptive input device when the visual indicator is located over the virtual two-finger pinch/depinch gesture icon 518-1 or detecting the visual indicator moving across the virtual two-finger pinch/depinch gesture icon); and, in response to detecting selection of the respective virtual gesture icon in the menu of virtual gestures, displays (810) a number of visual indicators that correspond to the respective virtual gesture icon. For example, in response to selection of the virtual two-finger pinch/depinch gesture icon 518-1 in FIG. 5K, two visual indicators that correspond to two virtual touches are displayed in FIG. 5L.

The device receives (812) a second input from the adaptive input device; and, in response to receiving the second input from the adaptive input device, performs (814) an operation in accordance with the respective virtual gesture. For example, in FIG. 5M, inputs received by the adaptive input device move two visual indicators 504-5 and 504-6 and scroll user interface 502-A. In another example, in FIG. 5O, inputs received by the adaptive input device displays the user interface at a different magnification (e.g., a zooming operation).

Figure 9:
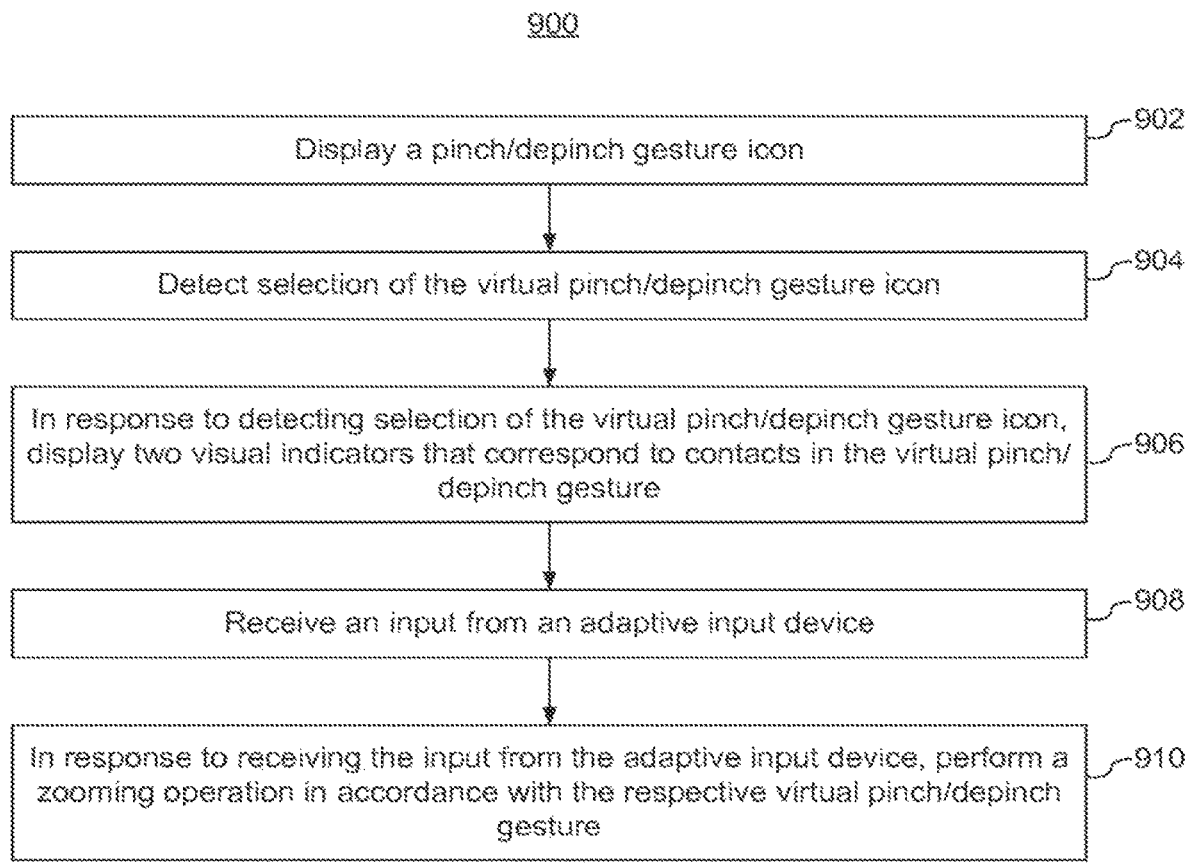
FIG. 9 is a flow diagram illustrating a method of performing a virtual pinch gesture in accordance with some embodiments.

FIG. 9 is a flow diagram illustrating a method 900 of performing a virtual pinch gesture in accordance with some embodiments. Method 900 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 uses two visual indicators (which correspond to two virtual touches) in conjunction with input from an adaptive input device to emulate pinch/depinch gestures on a touch-sensitive surface. This allows a user to perform, without using the touch-sensitive surface of the electronic device, an operation (e.g., zooming) that would otherwise require interaction with the touch-sensitive surface of the electronic device using two fingers.

The device displays (902) a pinch/depinch gesture icon (e.g., in the first menu or in a virtual gestures menu); detects (904) selection of the virtual pinch/depinch gesture icon (e.g., detecting activation of a button on the adaptive input device when the visual indicator is located over the virtual pinch/depinch gesture icon, or detecting the visual indicator moving across the virtual pinch/depinch gesture icon); and, in response to detecting selection of the virtual pinch/depinch gesture icon, displays (906) two visual indicators that correspond to contacts in the virtual pinch/depinch gesture (e.g., as shown in FIGS. 5K-5L).

The device receives (908) an input from an adaptive input device; and, in response to receiving the input from the adaptive input device, performs (910) a zooming operation in accordance with the respective virtual pinch/depinch gesture (e.g., as shown in FIGS. 5N-5O). In some embodiments, while the two visual indicators that correspond to contacts in the virtual pinch/depinch gesture are displayed, inputs received from the adaptive input device are used to perform actions that correspond to an actual pinch/depinch gesture on the touch-sensitive surface. For example, inputs received by pushing a joystick to the right are used to move the two visual indicators apart (depinch) and zoom in the display. Conversely, inputs received by pushing the joystick to the left are used to move the two visual indicators together (pinch) and zoom out the display. Thus, a user can use an adaptive input device to operate an electronic device with a touch-based user interface (e.g., perform virtual gestures on the display, etc.), even though the user does not actually touch the touch-sensitive surface on the device.

Figure 10:
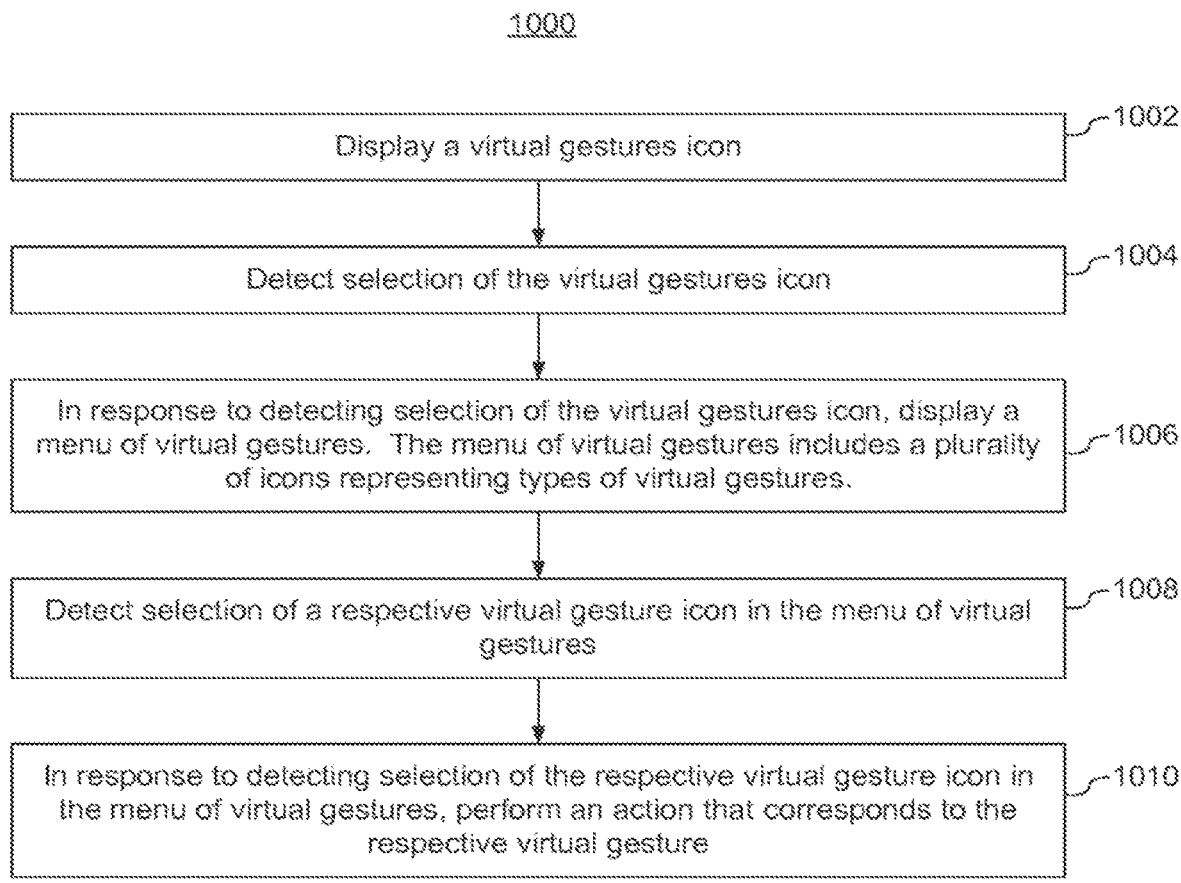
FIG. 10 is a flow diagram illustrating a method of using a menu of virtual gestures in accordance with some embodiments.

FIG. 10 is a flow diagram illustrating a method 1000 of using a menu of virtual gestures in accordance with some embodiments. Method 1000 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, method 1000 uses a menu of virtual gestures in conjunction with input from an adaptive input device to select and emulate actual gestures on a touch-sensitive surface. This allows a user to make, without using the touch-sensitive surface of the electronic device, virtual multitouch gestures that produce the same results as those obtained by interacting with the touch-sensitive surface of the electronic device using multiple fingers.

The device displays (1002) a virtual gestures icon (e.g., in the first menu); detects (1004) selection of the virtual gestures icon; and, in response to detecting selection of the virtual gestures icon, displays (1006) a menu of virtual gestures (e.g., as shown in FIGS. 5H-5I). The menu of virtual gestures includes a plurality of icons representing types of virtual gestures.

The device detects (1008) selection of a respective virtual gesture icon in the menu of virtual gestures (e.g., detecting selection of virtual three-finger swipe up gesture icon 518-2 in FIG. 5I by activation of a button on the adaptive input device); and, in response to detecting selection of the respective virtual gesture icon in the menu of virtual gestures, performs (1010) an action that corresponds to the respective virtual gesture. For example, in response to selection of virtual three-finger swipe up gesture icon 518-2 in FIG. 5I, the device displays application icon area 520 that includes a plurality of open application icons shown in FIG. 5J. In some embodiments, the device may perform actions corresponding to certain gestures without displaying visual indicators that correspond to the gestures.

Figure 11:
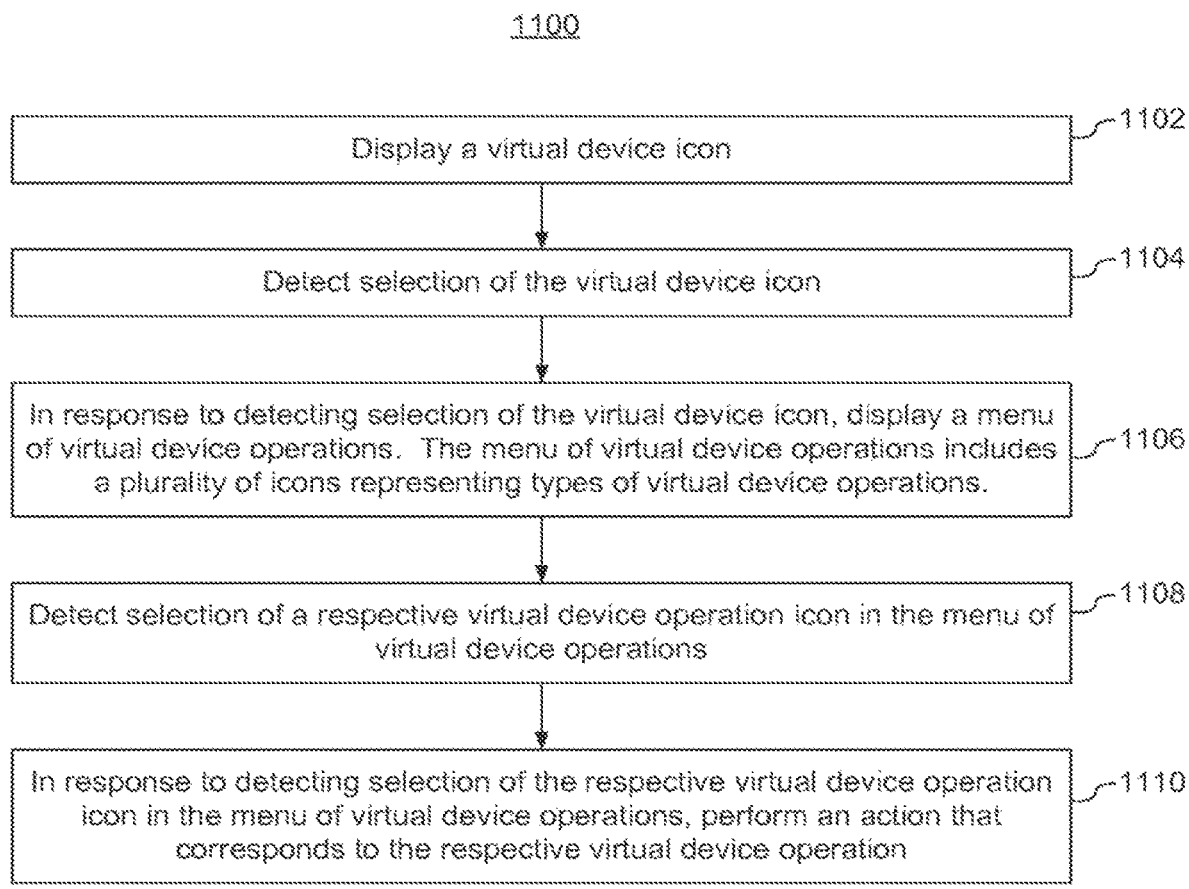
FIG. 11 is a flow diagram illustrating a method of using a menu of virtual device operations in accordance with some embodiments.

FIG. 11 is a flow diagram illustrating a method 1100 of using a menu of virtual device operations in accordance with some embodiments. Method 1100 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, method 1100 uses a menu of virtual device operations in conjunction with input from an adaptive input device to select and emulate operations that are normally performed via activation of physical controls on the electronic device (e.g., mute switches, lock switches, volume buttons) or in response to activity detected by an accelerometer (e.g., device shaking or device rotation). This allows a user to perform operations that would otherwise require interaction with the physical controls of the electronic device or the device as a whole.

The device displays (1102) a virtual device icon (e.g., in the first menu); detects (1104) selection of the virtual device icon; and, in response to detecting selection of the virtual device icon, displays (1106) a menu of virtual device operations (e.g., as shown in FIGS. 5P-5Q). The menu of virtual device operations includes a plurality of icons representing types of virtual device operations. Exemplary virtual device operations may include operations that are normally performed via physical controls on the electronic device, such as: muting and unmuting the ringer and sound effects on the device, which is normally performed via a mute switch; locking the device, which is normally initiated via a lock/unlock switch, increase volume, which is normally performed via a volume up button; decrease volume, which is normally performed via a volume down button. Exemplary virtual device operations may also include shaking the electronic device to perform a predefined operation (e.g., an undo operation) and rotating the electronic device to rotate the display orientation. Operations like shaking and rotation are typically detected via an accelerometer in the electronic device.

The device detects (1108) selection of a respective virtual device operation icon in the menu of virtual device operations (e.g., detecting selection of virtual muting/unmuting icon 526-1, such as by detecting activation of a button on the adaptive input device when the visual indicator is located over virtual muting/unmuting icon 526-1 or detecting the visual indicator moving across the virtual muting/unmuting icon); and, in response to detecting selection of the respective virtual device operation icon in the menu of virtual device operations, performs (1110) an action that corresponds to the respective virtual device operation. For example, in response to selection of virtual muting/unmuting icon 526-1 in FIG. 5Q, the device mutes or unmutes the ringer and sound effects on the device. Thus, a user can also use the adaptive input device to operate the physical controls on the electronic device, even though the user does not actually touch the physical controls on the device.

Figure 12:
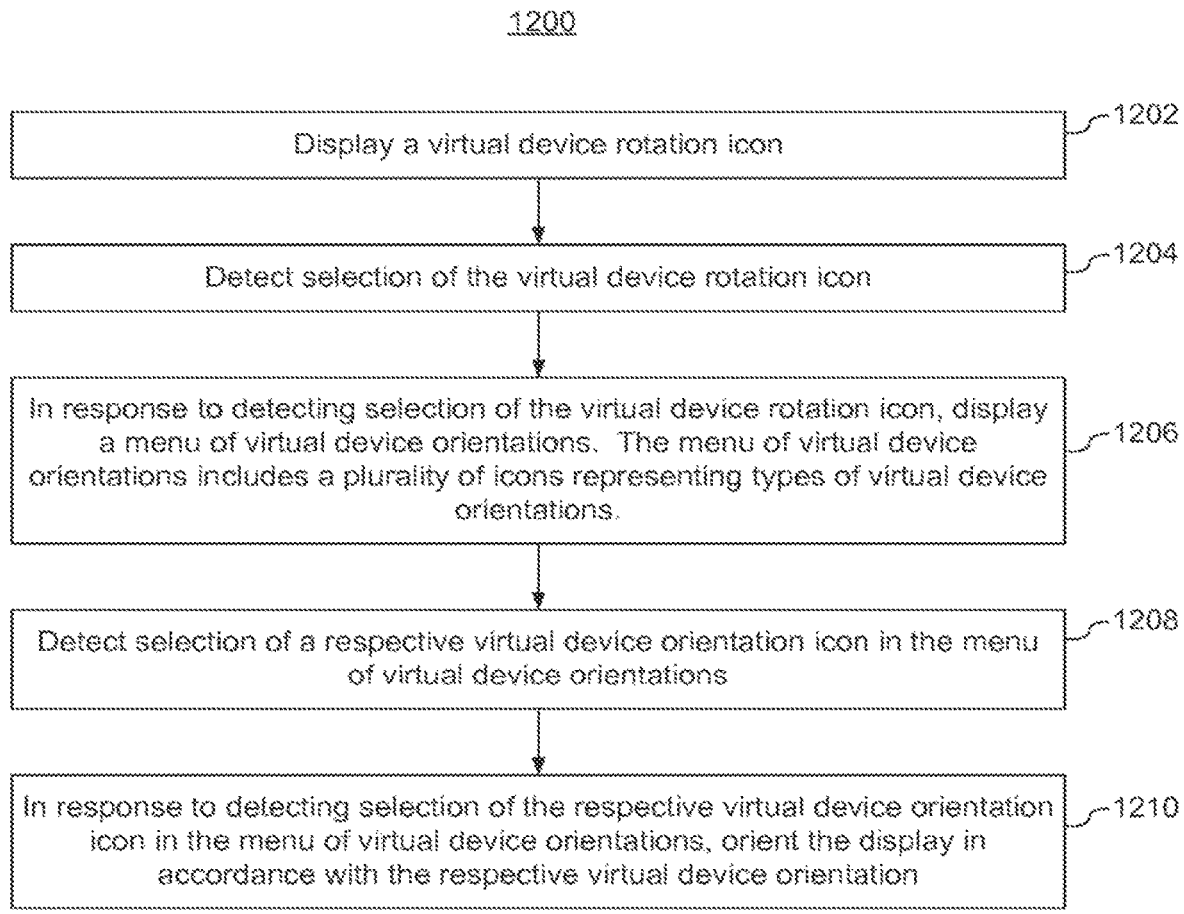
FIG. 12 is a flow diagram illustrating a method of using a menu of virtual device orientations in accordance with some embodiments.

FIG. 12 is a flow diagram illustrating a method 1200 of using a menu of virtual device orientations in accordance with some embodiments. Method 1200 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, method 1200 uses a menu of virtual device orientations in conjunction with input from an adaptive input device to control the display orientation. This allows a user to orient the display of the electronic device without physically rotating the electronic device.

The device displays (1202) a virtual device rotation icon (e.g., in the virtual device menu); detects (1204) selection of the virtual device rotation icon; and, in response to detecting selection of the virtual device rotation icon, displays (1206) a menu of virtual device orientations (e.g., as shown in FIGS. 5Q-5R). The menu of virtual device orientations includes a plurality of icons representing types of virtual device orientations (e.g., virtual portrait orientation icon 530-1, virtual landscape orientation left icon 530-2, virtual landscape orientation right icon 530-3, and virtual upside down portrait orientation icon 530-4, FIG. 5R).

The device detects (1208) selection of a respective virtual device orientation icon in the menu of virtual device orientations (e.g., detecting selection of virtual landscape orientation left icon 530-2 in FIG. 5R, such as by detecting activation of a button on the adaptive input device when the visual indicator is located over virtual landscape orientation left icon 530-2 or detecting the visual indicator moving across the virtual landscape orientation left icon). In response to detecting selection of the respective virtual device orientation icon in the menu of virtual device orientations, the device orients (1210) the display in accordance with the respective virtual device orientation. For example, in response to selection of virtual landscape orientation left icon 530-2 in FIG. 5R, the device orients the user interface on display to that shown in FIG. 5S.

FIG. 13 is a flow diagram illustrating method 1300 of creating a user-defined virtual gesture in accordance with some embodiments. Method 1300 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1300 may be combined and/or the order of some operations may be changed.

As described below, method 1300 uses input from an adaptive input device to create user-defined, custom virtual gestures. This allows a user to record and retrieve virtual multitouch gestures that would otherwise require interaction with the touch-sensitive surface using multiple fingers.

The device, while in a virtual-gesture recording mode (1302), displays (1304) a plurality of visual indicators on the display (e.g., icons that correspond to respective virtual single finger contacts). For example, in FIG. 5AA, visual indicators 540-1 and 540-2 are displayed.

For each visual indicator in the plurality of visual indicators (1306), the device receives (1308) from an adaptive input device a respective user input for the respective visual indicator; moves (1310) the respective visual indicator in accordance with the respective user input; and concurrently displays (1312) with the respective visual indicator a respective trail corresponding to movement of the respective visual indicator (e.g., visual indicator 540-1 and trail 542-1, FIG. 5Y).

In some embodiments, while in the virtual-gesture recording mode, the device concurrently displays (1314) the plurality of respective visual indicators and a corresponding plurality of respective trails. For example, visual indicators 540-1 and 540-2 are displayed concurrently with trails 542-1 and 542-2 in FIG. 5AA.

The device creates (1316) a user-defined virtual gesture that corresponds to the plurality of visual indicators and the movements of the plurality of visual indicators. The user-defined gesture may include the absolute or relative positions of the plurality of visual indicators, and the relative or absolute movements of the plurality of visual indicators.

The device associates (1318) the user-defined virtual gesture with a predefined operation of the electronic device; and stores (1320) the user-defined virtual gesture. Thus, a user can use an adaptive input device to create a custom virtual multitouch gesture for an electronic device with a touch-based user interface, even though the user does not actually touch the touch-sensitive surface on the device.

In some embodiments, after creating the user-defined virtual gesture and associating the user-defined virtual gesture with a predefined operation of the electronic device, the device receives (1322) an input from the adaptive input device (e.g., detecting activation of a button on the adaptive input device when a visual indicator is located over an icon that corresponds to the user-defined virtual gesture, such as icon 518-4 in FIG. 5AB, or detecting the visual indicator moving across the icon that corresponds to the user-defined virtual gesture); and, in response to receiving the input from the adaptive input device, performs the predefined operation associated with the user-defined virtual gesture.

In some embodiments, in response to receiving the input from the adaptive input device, the device displays (1324) an animated movement of the plurality of respective visual indicators in the user-defined virtual gesture along their respective trails. For example, in FIG. 5AC, the animated movement of visual indicators 540-1 and 540-2 is displayed along with their respective trails 542-1 and 542-2. In some embodiments, the stored user-defined virtual gesture includes the location and time of each visual indicator in the user-defined virtual gesture so that both fast and slow user-defined virtual gestures can be recreated, thereby mimicking the exact user-defined virtual gesture that was created in the virtual-gesture recording mode. In some embodiments, the user-defined virtual gesture can be shown ("replayed") at a constant speed, rather than at the speed it was created at in the virtual-gesture recording mode. Constant speed is useful in cases where it is difficult for the user to generate events at a "natural pace." For constant speed virtual gestures, the events in the gesture may be generated at the average rate at which events are received when an actual finger moves across the touch-sensitive surface, to avoid generating events faster than the device can handle them.

Figure 14:
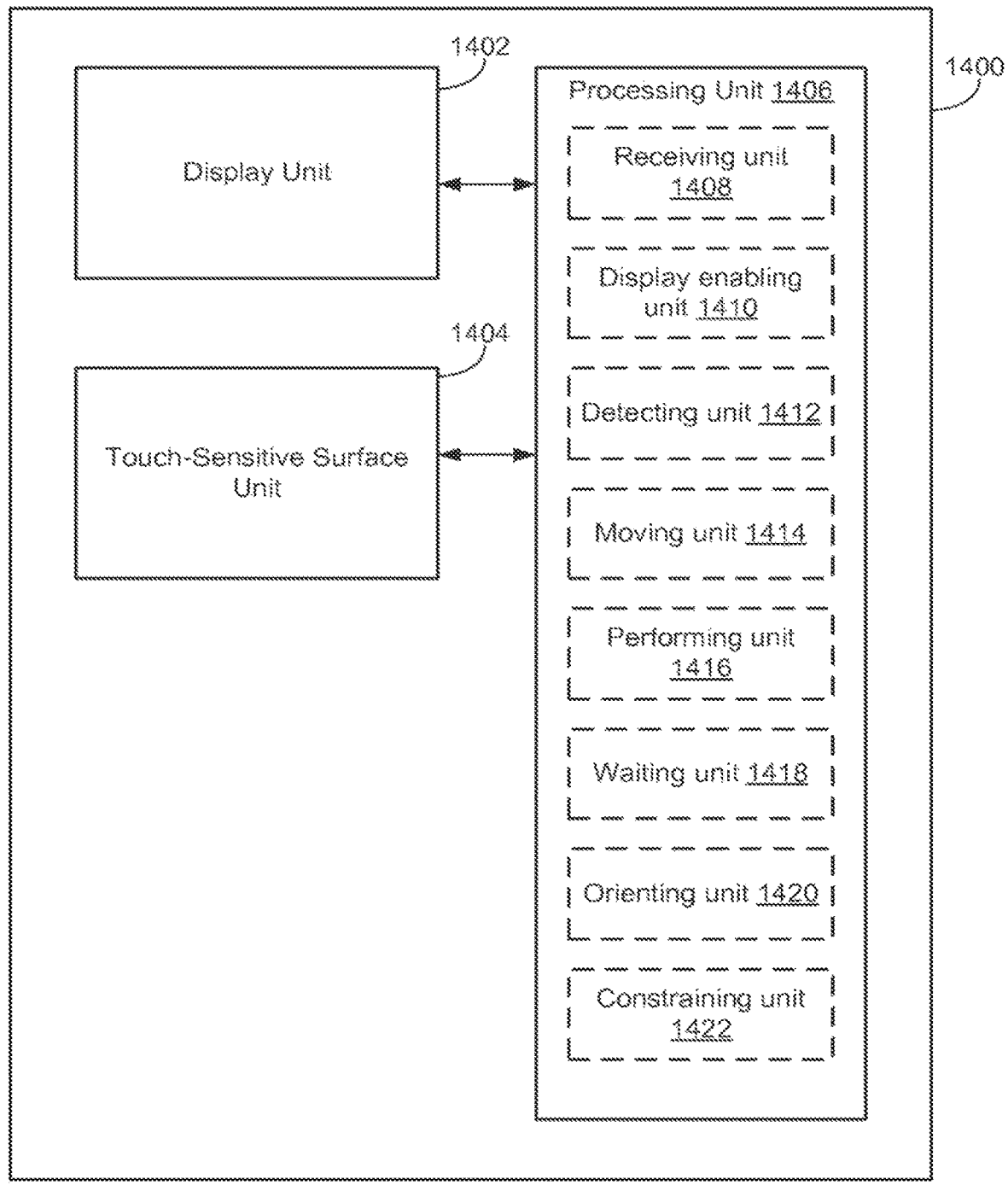
FIG. 14 is a functional block diagram of an electronic device in accordance with some embodiments.

In accordance with some embodiments, FIG. 14 shows a functional block diagram of electronic device 1400 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1400 may be combined or separated into sub-blocks to implement the principles of the invention as described above. Therefore, the description herein may support any possible combination or separation or further definition of the functional blocks described herein.

As shown in FIG. 14, electronic device 1400 includes display unit 1402 configured to display a first visual indicator that corresponds to a virtual touch; touch-sensitive surface unit 1404 configured to receive finger contacts; and processing unit 1406 coupled to display unit 1402 and touch-sensitive surface unit 1404. In some embodiments, processing unit 1406 includes receiving unit 1408, display enabling unit 1410, detecting unit 1412, moving unit 1414, performing unit 1416, waiting unit 1418, orienting unit 1420, and constraining unit 1422.

Processing unit 1406 is configured to: receive a first input from an adaptive input device (e.g., with receiving unit 1408); and, in response to receiving the first input from the adaptive input device, enable display of a first menu on the display unit (e.g., with display enabling unit 1410). The first menu includes a virtual touches selection icon. In response to detecting selection of the virtual touches selection icon, a menu of virtual multitouch contacts is displayed (e.g., on display unit 1402 with display enabling unit 1410).

In some embodiments, the first visual indicator comprises one of: a ring, donut, circle, oval, ellipse, arrow, cross, I-beam, star, or virtual finger.

In some embodiments, the first input moves the first visual indicator to a predefined region of the display unit.

In some embodiments, the first input corresponds to activation of a control on the adaptive input device.

In some embodiments, the first input corresponds to moving a control on the adaptive input device from side-to-side.

In some embodiments, the adaptive input device includes a joystick and the first input corresponds to moving the joystick from side-to-side.

In some embodiments, the first menu includes icons displayed radially about a center of the first menu.

In some embodiments, a first user interface is displayed on display unit 1402 immediately prior to receiving the first input from the adaptive input device, and the first menu is displayed over the first user interface (e.g., on display unit 1402).

In some embodiments, processing unit 1406 is configured to, in response to receiving the first input from the adaptive input device, enable display of the first visual indicator in a center region of the first menu (e.g., with display enabling unit 1410 on display unit 1402).

In some embodiments, processing unit 1406 is configured to: detect selection of the virtual touches selection icon (e.g., with detecting unit 1412); and, in response to detecting selection of the virtual touches selection icon, enable display of the menu of virtual multitouch contacts (e.g., with display enabling unit 1410 on display unit 1402). The menu of virtual multitouch contacts includes a plurality of icons representing types of virtual multitouch contacts. Processing unit 1406 is configured to: detect selection of a respective virtual multitouch contacts icon in the menu of virtual multitouch contacts (e.g., with detecting unit 1412); and, in response to detecting selection of the respective virtual multitouch contacts icon in the menu of virtual multitouch contacts, enable display of one or more second visual indicators that correspond to the respective virtual multitouch contacts icon (e.g., with display enabling unit 1410 on display unit 1402).

In some embodiments, enabling display of the second visual indicators includes enabling display of a number of visual indicators that correspond to the respective virtual multitouch contacts icon (e.g., with display enabling unit 1410 on display unit 1402).

In some embodiments, processing unit 1406 is configured to: receive a second input from the adaptive input device (e.g., with receiving unit 1408); and, in response to receiving the second input from the adaptive input device: move the one or more second visual indicators (e.g., with moving unit 1414), and perform an operation in accordance with the movement of the one or more second visual indicators (e.g., with performing unit 1416).

In some embodiments, processing unit 1406 is configured to, while enabling display of the one or more second visual indicators, wait to receive input from the adaptive input device for more than a predefined time period (e.g., with waiting unit 1418); and, in response to waiting to receive input from the adaptive input device for more than the predefined time period, replace display of the one or more second visual indicators with display of the first visual indicator (e.g., with display enabling unit 1410).

In some embodiments, processing unit 1406 is configured to: enable display of a virtual gestures icon (e.g., with display enabling unit 1410 on display unit 1402); detect selection of the virtual gestures icon (e.g., with detecting unit 1412); and, in response to detecting selection of the virtual gestures icon, enable display of a menu of virtual gestures (e.g., with display enabling unit 1410 on display unit 1402). The menu of virtual gestures includes a plurality of icons representing types of virtual gestures. Processing unit 1406 is configured to: detect selection of a respective virtual gesture icon in the menu of virtual gestures (e.g., with detecting unit 1412); and, in response to detecting selection of the respective virtual gesture icon in the menu of virtual gestures, perform an action that corresponds to the respective virtual gesture (e.g., with performing unit 1416).

In some embodiments, processing unit 1406 is configured to: enable display of a virtual gestures icon (e.g., with display enabling unit 1410 on display unit 1402); detect selection of the virtual gestures icon (e.g., with detecting unit 1412); and, in response to detecting selection of the virtual gestures icon, enable display of a menu of virtual gestures (e.g., with display enabling unit 1410 on display unit 1402). The menu of virtual gestures includes a plurality of icons representing types of virtual gestures. Processing unit 1406 is configured to: detect selection of a respective virtual gesture icon in the menu of virtual gestures (e.g., with detecting unit 1412); in response to detecting selection of the respective virtual gesture icon in the menu of virtual gestures, enable display of a number of visual indicators that correspond to the respective virtual gesture icon (e.g., with display enabling unit 1410); receive a second input from the adaptive input device (e.g., with receiving unit 1408); and, in response to receiving the second input from the adaptive input device, perform an operation in accordance with the respective virtual gesture (e.g., with performing unit 1416).

In some embodiments, processing unit 1406 is configured to, in response to receiving the second input from the adaptive input device, move the displayed visual indicators that correspond to the respective virtual gesture to simulate movement of actual contacts on the touch sensitive surface unit (e.g., with moving unit 1414).

In some embodiments, processing unit 1406 is configured to: enable display of a pinch/depinch gesture icon (e.g., with display enabling unit 1410 on display unit 1402); detect selection of the virtual pinch/depinch gesture icon (e.g., with detecting unit 1412); in response to detecting selection of the virtual pinch/depinch gesture icon, enable display of two visual indicators that correspond to contacts in the virtual pinch/depinch gesture (e.g., with display enabling unit 1410 on display unit 1402); receive a second input from the adaptive input device (e.g., with receiving unit 1408); and, in response to receiving the second input from the adaptive input device, perform an operation in accordance with the virtual pinch/depinch gesture (e.g., with performing unit 1416).

In some embodiments, a zooming operation is performed in accordance with the virtual pinch/depinch gesture.

In some embodiments, processing unit 1406 is configured to: enable display of a virtual device icon (e.g., with display enabling unit 1410 on display unit 1402); detect selection of the virtual device icon (e.g., with detecting unit 1412); in response to detecting selection of the virtual device icon, enable display of a menu of virtual device operations, the menu of virtual device operations including a plurality of icons representing types of virtual device operations (e.g., with display enabling unit 1410 on display unit 1402); detect selection of a respective virtual device operation icon in the menu of virtual device operations (e.g., with detecting unit 1412); and, in response to detecting selection of the respective virtual device operation icon in the menu of virtual device operations, perform an action that corresponds to the respective virtual device operation (e.g., with performing unit 1416).

In some embodiments, processing unit 1406 is configured to: enable display of a virtual device rotation icon (e.g., with display enabling unit 1410 on display unit 1402); detect selection of the virtual device rotation icon (e.g., with detecting unit 1412); and, in response to detecting selection of the virtual device rotation icon, enable display of a menu of virtual device orientations (e.g., with display enabling unit 1410 on display unit 1402). The menu of virtual device orientations includes a plurality of icons representing types of virtual device orientations. Processing unit 1406 is configured to: detect selection of a respective virtual device orientation icon in the menu of virtual device orientations (e.g., with detecting unit 1412); and, in response to detecting selection of the respective virtual device orientation icon in the menu of virtual device orientations, orient the display in accordance with the respective virtual device orientation (e.g., with orienting unit 1420).

In some embodiments, electronic device 1400 includes a home button. Processing unit 1406 is configured to: enable display of a home button icon (e.g., with display enabling unit 1410 on display unit 1402); detect selection of the home button icon (e.g., with detecting unit 1412); and, in response to detecting selection of the home button icon, perform an action that corresponds to activation of the home button (e.g., with performing unit 1416).

In some embodiments, processing unit 1406 is configured to, while enabling display of a menu on the display unit, constrain movement of the first visual indicator such that the first visual indicator remains on the menu (e.g., with constraining unit 1422).

In some embodiments, processing unit 1406 is configured to, while enabling display of the first menu on the display unit, receive a second input from the adaptive input device when the first visual indicator is displayed off the first menu (e.g., with receiving unit 1408); and, in response to the second input, cease to display the first menu (e.g., with display enabling unit 1410).

In some embodiments, processing unit 1406 is configured to, while enabling display the first menu on the display unit, wait to receive input from the adaptive input device for more than a predefined time period (e.g., with waiting unit 1418); and, in response to waiting to receive input from the adaptive input device for more than the predefined time period, cease to display the first menu (e.g., with display enabling unit 1410).

Figure 15:
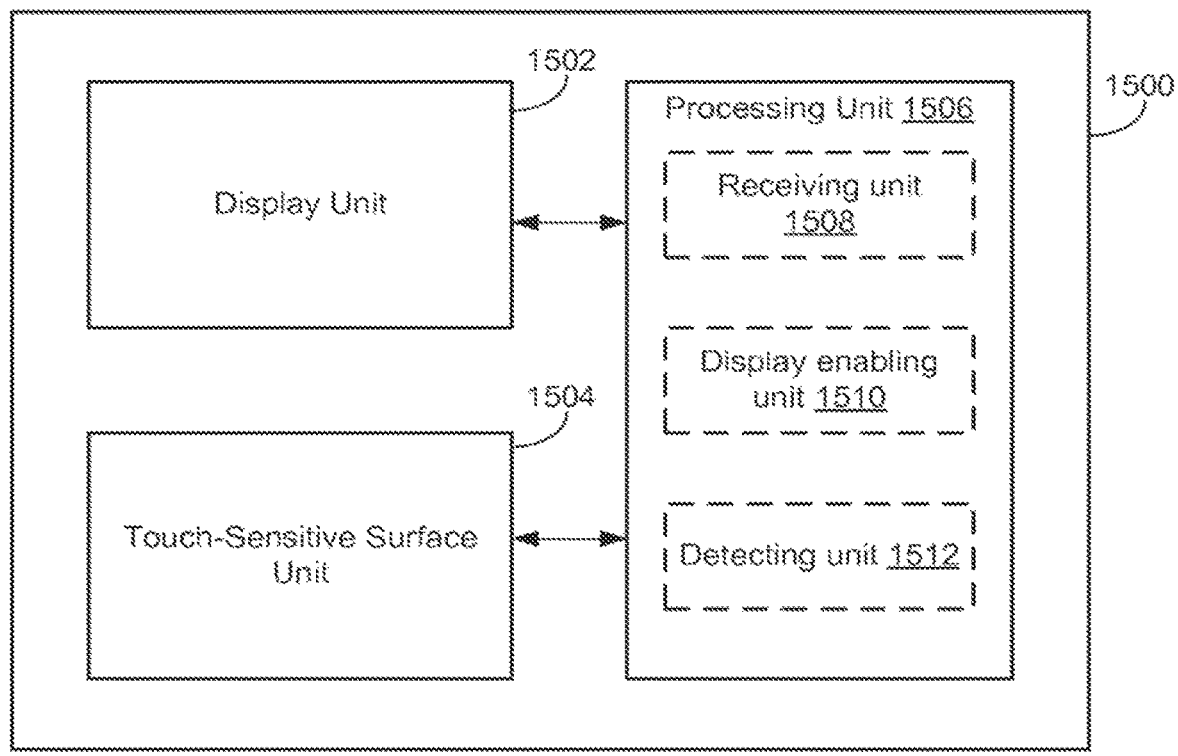
FIG. 15 is a functional block diagram of an electronic device in accordance with some embodiments.

In accordance with some embodiments, FIG. 15 shows a functional block diagram of electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1500 may be combined or separated into sub-blocks to implement the principles of the invention as described above. Therefore, the description herein may support any possible combination or separation or further definition of the functional blocks described herein.

As shown in FIG. 15, electronic device 1500 includes display unit 1502 configured to display a first visual indicator that corresponds to a virtual touch; touch-sensitive surface unit 1504 configured to receive finger contacts; and processing unit 1506 coupled to display unit 1502 and touch-sensitive surface unit 1504. In some embodiments, processing unit 1506 includes receiving unit 1508, display enabling unit 1510, and detecting unit 1512.

Processing unit 1506 is configured to: receive a first input from an adaptive input device (e.g., with receiving unit 1508); and, in response to receiving the first input from the adaptive input device, enable display of a menu of virtual multitouch contacts (e.g., with display enabling unit 1510 on display unit 1502). The menu of virtual multitouch contacts includes a plurality of icons representing types of virtual multitouch contacts. Processing unit 1506 is configured to: detect selection of a respective virtual multitouch contacts icon in the menu of virtual multitouch contacts (e.g., with detecting unit 1512); and, in response to detecting selection of the respective virtual multitouch contacts icon in the menu of virtual multitouch contacts, enable display of one or more second visual indicators that correspond to the respective virtual multitouch contacts icon (e.g., with display enabling unit 1510 on display unit 1502).

Figure 16:
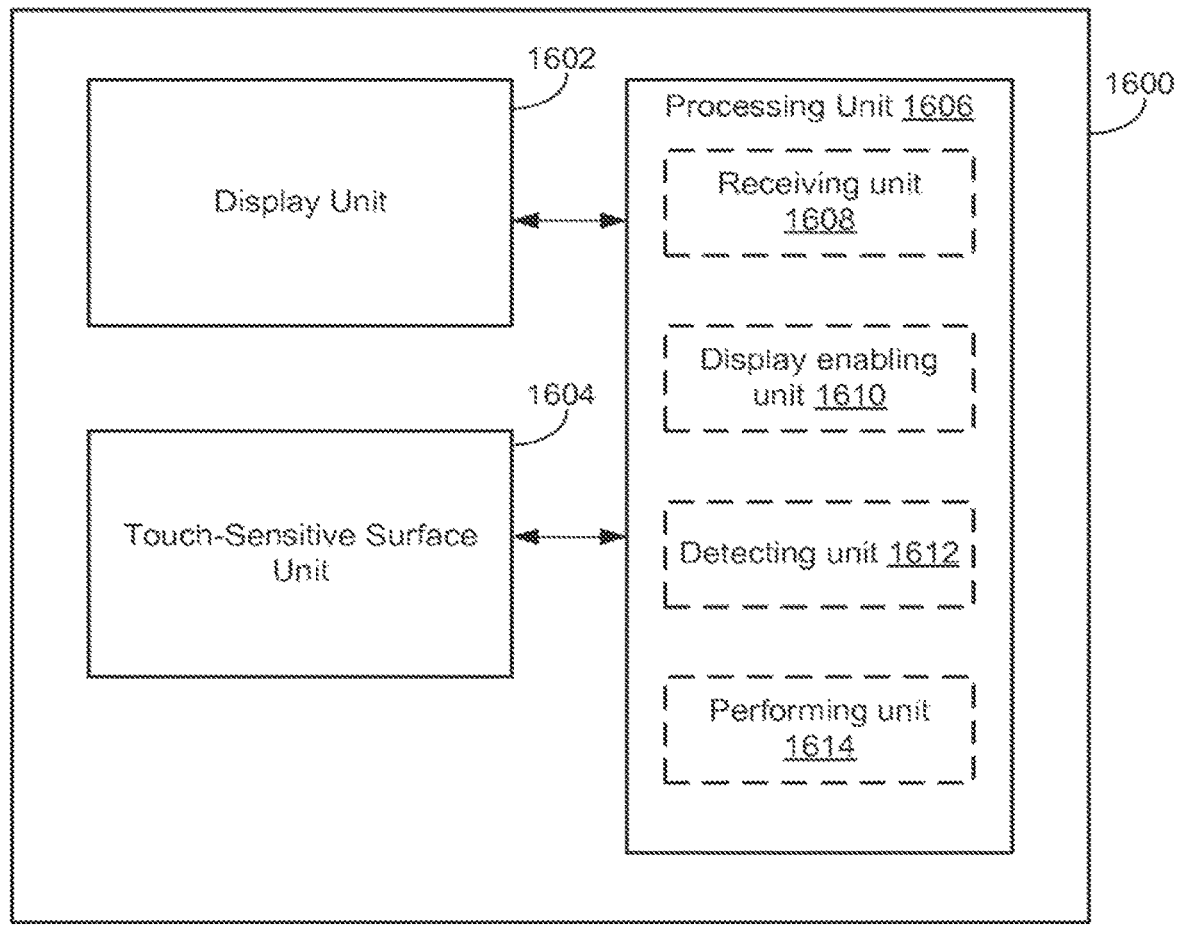
FIG. 16 is a functional block diagram of an electronic device in accordance with some embodiments.

In accordance with some embodiments, FIG. 16 shows a functional block diagram of electronic device 1600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1600 may be combined or separated into sub-blocks to implement the principles of the invention as described above. Therefore, the description herein may support any possible combination or separation or further definition of the functional blocks described herein.

As shown in FIG. 16, electronic device 1600 includes display unit 1602 configured to display user interface objects (e.g., one or more icons and/or indicators); touch-sensitive surface unit 1604 configured to receive finger contacts; and processing unit 1606 coupled to display unit 1602 and touch-sensitive surface unit 1604. In some embodiments, processing unit 1606 includes receiving unit 1608, display enabling unit 1610, detecting unit 1612, and performing unit 1614.

In some embodiments, processing unit 1606 is configured to: enable display of a first visual indicator that corresponds to a virtual touch (e.g., with display enabling unit 1610 on display unit 1602); receive a first input from an adaptive input device (e.g., with receiving unit 1608); and, in response to receiving the first input from the adaptive input device, enable display of a menu of virtual gestures (e.g., with display enabling unit 1610 on display unit 1602). The menu of virtual gestures includes a plurality of icons representing types of virtual gestures. Processing unit 1606 is configured to: detect selection of a respective virtual gesture icon in the menu of virtual gestures (e.g., with detecting unit 1612); in response to detecting selection of the respective virtual gesture icon in the menu of virtual gestures, enable display of a number of visual indicators that correspond to the respective virtual gesture icon (e.g., with display enabling unit 1612 on display unit 1602); receive a second input from the adaptive input device (e.g., with receiving unit 1608); and, in response to receiving the second input from the adaptive input device, perform an operation in accordance with the respective virtual gesture (e.g., with performing unit 1614).

In some embodiments, processing unit 1606 is configured to: enable display of a pinch/depinch gesture icon (e.g., with display enabling unit 1610 on display unit 1602); detect selection of the virtual pinch/depinch gesture icon (e.g., with detecting unit 1612); in response to detecting selection of the virtual pinch/depinch gesture icon, enable display of two visual indicators that correspond to contacts in the virtual pinch/depinch gesture (e.g., with display enabling unit 1612 on display unit 1602); receive an input from an adaptive input device (e.g., with receiving unit 1608); and, in response to receiving the input from the adaptive input device, perform a zooming operation in accordance with the respective virtual pinch/depinch gesture (e.g., with performing unit 1614).

In some embodiments, processing unit 1606 is configured to: enable display of a virtual gestures icon (e.g., with display enabling unit 1610 on display unit 1602); detect selection of the virtual gestures icon (e.g., with detecting unit 1612); and, in response to detecting selection of the virtual gestures icon, enable display of a menu of virtual gestures (e.g., with display enabling unit 1610 on display unit 1602). The menu of virtual gestures includes a plurality of icons representing types of virtual gestures. Processing unit 1606 is configured to: detect selection of a respective virtual gesture icon in the menu of virtual gestures (e.g., detecting unit 1612); and, in response to detecting selection of the respective virtual gesture icon in the menu of virtual gestures, perform an action that corresponds to the respective virtual gesture (e.g., performing unit 1614).

Figure 17:
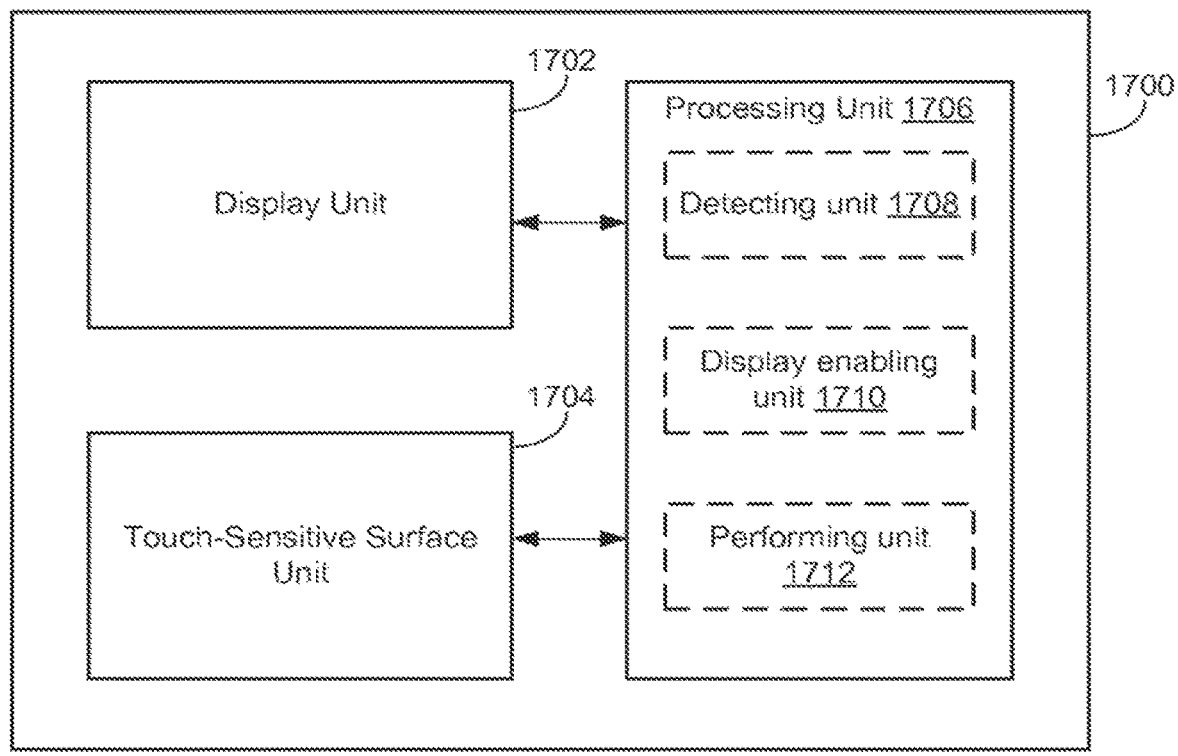
FIG. 17 is a functional block diagram of an electronic device in accordance with some embodiments.

In accordance with some embodiments, FIG. 17 shows a functional block diagram of electronic device 1700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1700 may be combined or separated into sub-blocks to implement the principles of the invention as described above. Therefore, the description herein may support any possible combination or separation or further definition of the functional blocks described herein.

As shown in FIG. 17, electronic device 1700 includes display unit 1702 configured to display a virtual device icon; touch-sensitive surface unit 1704 configured to receive finger contacts; and processing unit 1706 coupled to display unit 1702 and touch-sensitive surface unit 1704. In some embodiments, processing unit 1706 includes detecting unit 1708, display enabling unit 1710, and performing unit 1712.

Processing unit 1706 is configured to: detect selection of the virtual device icon (e.g., with detecting unit 1708); and, in response to detecting selection of the virtual device icon, enable display of a menu of virtual device operations (e.g., with display enabling unit 1710 on display unit 1702). The menu of virtual device operations includes a plurality of icons representing types of virtual device operations. Processing unit 1706 is configured to: detect selection of a respective virtual device operation icon in the menu of virtual device operations (e.g., with detecting unit 1710); and, in response to detecting selection of the respective virtual device operation icon in the menu of virtual device operations, perform an action that corresponds to the respective virtual device operation (e.g., with performing unit 1712).

Figure 18:
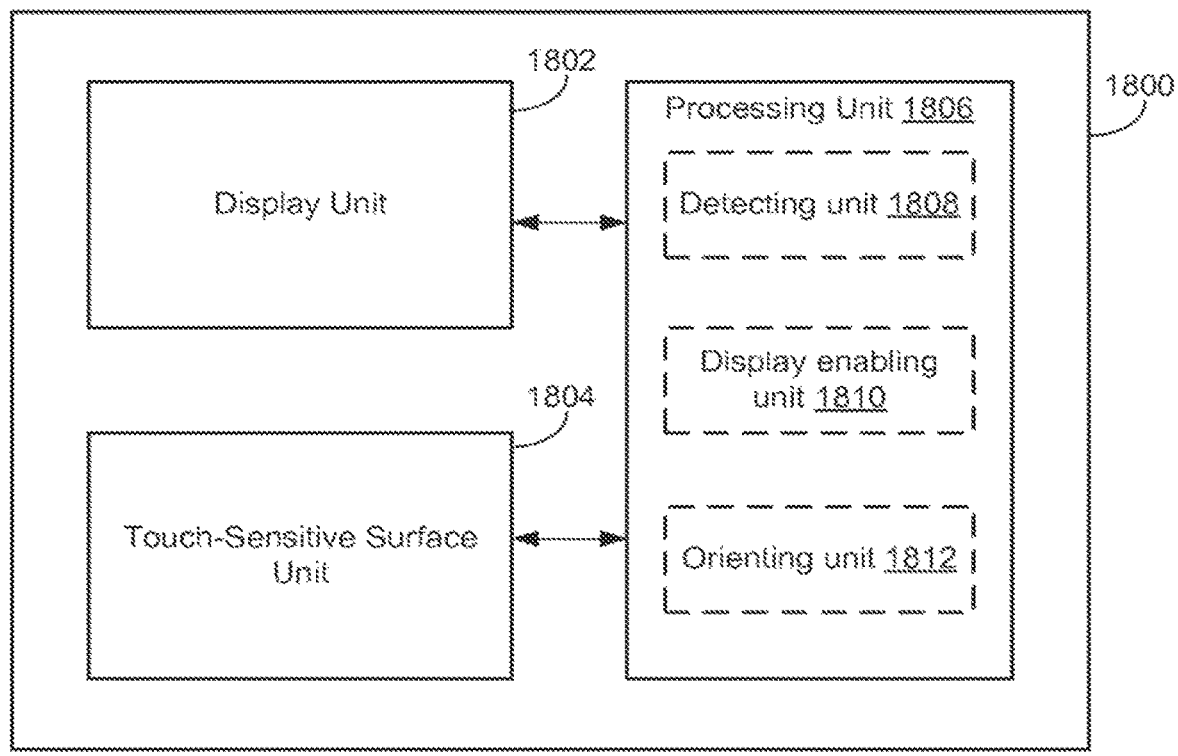
FIG. 18 is a functional block diagram of an electronic device in accordance with some embodiments.

In accordance with some embodiments, FIG. 18 shows a functional block diagram of electronic device 1800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1800 may be combined or separated into sub-blocks to implement the principles of the invention as described above. Therefore, the description herein may support any possible combination or separation or further definition of the functional blocks described herein.

As shown in FIG. 18, electronic device 1800 includes display unit 1802 configured to display a virtual device rotation icon; touch-sensitive surface unit 1804 configured to receive finger contacts; and processing unit 1806 coupled to display unit 1802 and touch-sensitive surface unit 1804. In some embodiments, processing unit 1806 includes detecting unit 1808, display enabling unit 1810, and orienting unit 1812.

Processing unit 1806 is configured to: detect selection of the virtual device rotation icon (e.g., with detecting unit 1808); and, in response to detecting selection of the virtual device rotation icon, enable display of a menu of virtual device orientations (e.g., with display enabling unit 1810 on display unit 1802). The menu of virtual device orientations includes a plurality of icons representing types of virtual device orientations. Processing unit 1806 is configured to: detect selection of a respective virtual device orientation icon in the menu of virtual device orientations (e.g., with detecting unit 1808); and, in response to detecting selection of the respective virtual device orientation icon in the menu of virtual device orientations, orient the display in accordance with the respective virtual device orientation (e.g., with orienting unit 1812).

Figure 19:
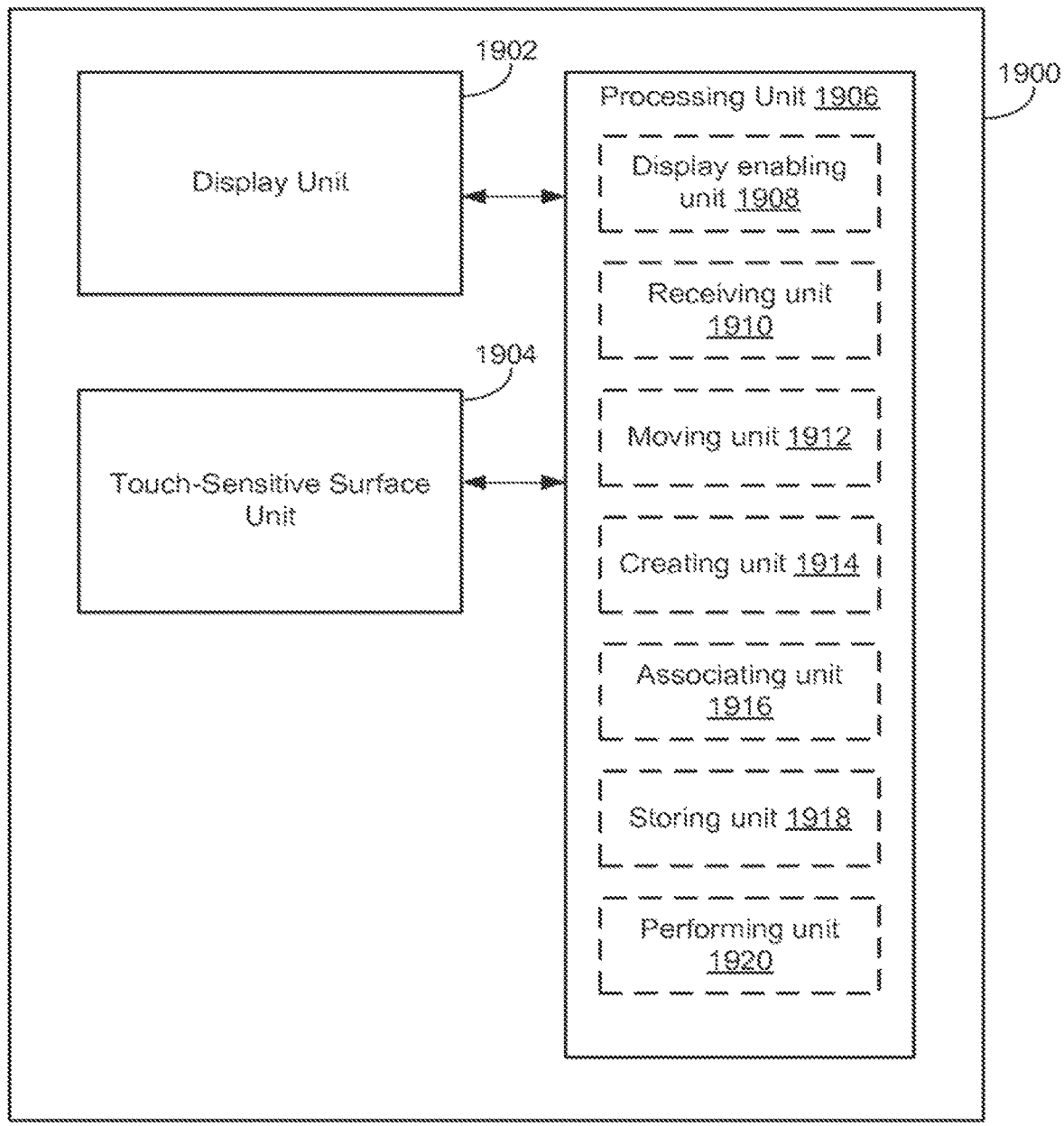
FIG. 19 is a functional block diagram of an electronic device in accordance with some embodiments.

In accordance with some embodiments, FIG. 19 shows a functional block diagram of electronic device 1900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 1900 may be combined or separated into sub-blocks to implement the principles of the invention as described above. Therefore, the description herein may support any possible combination or separation or further definition of the functional blocks described herein.

As shown in FIG. 19, electronic device 1900 includes display unit 1902 configured to display visual indicators; touch-sensitive surface unit 1904 configured to receive finger contacts; and processing unit 1906 coupled to display unit 1902 and touch-sensitive surface unit 1904. In some embodiments, processing unit 1906 includes display enabling unit 1908, receiving unit 1910, moving unit 1912, creating unit 1914, associating unit 1916, storing unit 1918, and performing unit 1920.

Processing unit 1906 is configured to, while in a virtual-gesture recording mode: enable display of a plurality of visual indicators on the display unit (e.g., with display enabling unit 1908 on display unit 1902); and, for each visual indicator in the plurality of visual indicators: receive from an adaptive input device a respective user input for the respective visual indicator (e.g., with receiving unit 1910); move the respective visual indicator in accordance with the respective user input (e.g., with moving unit 1912 and/or display enabling unit 1910); and enable concurrent display of the respective visual indicator and a respective trail corresponding to movement of the respective visual indicator (e.g., with display enabling unit 1908 on display unit 1902). Processing unit 1906 is configured to: create a user-defined virtual gesture that corresponds to the plurality of visual indicators and the movements of the plurality of visual indicators (e.g., with creating unit 1914); associate the user-defined virtual gesture with a predefined operation of the electronic device (e.g., with associating unit 1916); and store the user-defined virtual gesture (e.g., with storing unit 1918).

In some embodiments, processing unit 1906 is configured to, while in the virtual-gesture recording mode, enable concurrent display of the plurality of respective visual indicators and a corresponding plurality of respective trails (e.g., with display enabling unit 1908 on display unit 1902).

In some embodiments, processing unit 1906 is configured to, after creating the user-defined virtual gesture and associating the user-defined virtual gesture with a predefined operation of the electronic device: receive an input from the adaptive input device (e.g., with receiving unit 1910); and, in response to receiving the input from the adaptive input device, perform the predefined operation associated with the user-defined virtual gesture (e.g., performing unit 1920).

In some embodiments, processing unit 1906 is configured to, in response to receiving the input from the adaptive input device, enable display of an animated movement of the plurality of respective visual indicators in the user-defined virtual gesture along their respective trails (e.g., with display enabling unit 1908 on display unit 1902).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C, 7, 8, 9, 10, 11, 12, and 13 may be implemented by components depicted in FIGS. 1A-1B. For example, receiving operation 606, displaying operation 616, and constraining operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether an input received from an adaptive input device corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
one or more processors;
memory storing one or more programs configured to be executed by the one or more processors, the one or more programs including instructions for:
while in a virtual-gesture recording mode:
receiving a first user input indicating a first movement;
in response to the first user input:
displaying a first visual motion indicator that indicates the first movement in accordance with the first user input;
while the first visual motion indicator indicates the first movement:
receiving a second user input indicating a second movement; and
in response to the second user input, displaying a second visual motion indicator that indicates the second movement in accordance with the second user input; and
creating a user-defined virtual gesture that corresponds to the first and second movements indicated by the first and second user inputs, wherein creating the user-defined virtual gesture includes associating the user-defined virtual gesture with a predefined operation; and
after creating the user-defined virtual gesture:
displaying an icon associated with the user-defined virtual gesture;
receiving a third user input corresponding to a selection of the icon; and
in response to receiving the third user input corresponding to the selection of the icon:
performing the user-defined virtual gesture corresponding to the first movement indicated by the first user input and the second movement indicated by the second user input; and
performing the predefined operation associated with the user-defined virtual gesture.

2. The electronic device of claim 1, wherein the one or more programs further include instructions for:
in response to the first user input, displaying a first trail corresponding to the first movement indicated by the first user input.

3. The electronic device of claim 2, wherein the one or more programs further include instructions for:
in response to the second user input:
displaying a second trail corresponding to the second movement indicated by the second user input.

4. The electronic device of claim 3, wherein the one or more programs further include instructions for:
while in the virtual-gesture recording mode, concurrently displaying the first and second trails.

5. The electronic device of claim 3, wherein the one or more programs further include instructions for:
in response to receiving the third user input, displaying an animated movement of the first and second visual motion indicators in the user-defined virtual gesture.

6. The electronic device of claim 3, wherein the user-defined virtual gesture includes absolute or relative positions of the first and second visual motion indicators.

7. The electronic device of claim 3, wherein the user-defined virtual gesture is based on movements of the first and second visual motion indicators.

8. The electronic device of claim 1, wherein the user-defined virtual gesture is performed at a speed different from a speed that the user-defined virtual gesture was created.

9. A non-transitory computer-readable storage medium storing one or more programs configured to be executed by one or more processors of an electronic device with a display, the one or more programs including instructions for:
while in a virtual-gesture recording mode:
receiving a first user input indicating a first movement;
in response to the first user input:
displaying a first visual motion indicator that indicates the first movement in accordance with the first user input;
while the first visual motion indicator indicates the first movement:
receiving a second user input indicating a second movement; and
in response to the second user input, displaying a second visual motion indicator that indicates the second movement in accordance with the second user input; and
creating a user-defined virtual gesture that corresponds to the first and second movements indicated by the first and second user inputs, wherein creating the user-defined virtual gesture includes associating the user-defined virtual gesture with a predefined operation; and
after creating the user-defined virtual gesture:
displaying an icon associated with the user-defined virtual gesture;
receiving a third user input corresponding to a selection of the icon; and
in response to receiving the third user input corresponding to the selection of the icon:

performing the user-defined virtual gesture corresponding to the first movement indicated by the first user input and the second movement indicated by the second user input; and performing the predefined operation associated with the user-defined virtual gesture.

10. The non-transitory computer-readable storage medium of claim 9, wherein the one or more programs further include instructions for:

in response to the first user input, displaying a first trail corresponding to the first movement indicated by the first user input.

11. The non-transitory computer-readable storage medium of claim 10, wherein the one or more programs further include instructions for:

in response to the second user input:
displaying a second trail corresponding to the second movement indicated by the second user input.

12. The non-transitory computer-readable storage medium of claim 11, wherein the one or more programs further include instructions for:

while in the virtual-gesture recording mode, concurrently displaying the first and second trails.

13. The non-transitory computer-readable storage medium of claim 11, wherein the one or more programs further include instructions for:

in response to receiving the third user input, displaying an animated movement of the first and second visual motion indicators in the user-defined virtual gesture.

14. The non-transitory computer-readable storage medium of claim 11, wherein the user-defined virtual gesture includes absolute or relative positions of the first and second visual motion indicators.

15. The non-transitory computer-readable storage medium of claim 11, wherein the user-defined virtual gesture is based on movements of the first and second visual motion indicators.

16. The non-transitory computer-readable storage medium of claim 9, wherein the user-defined virtual gesture is performed at a speed different from a speed that the user-defined virtual gesture was created.

17. A method, comprising:
at an electronic device with a display:
while in a virtual-gesture recording mode:
receiving a first user input indicating a first movement;
in response to the first user input:
displaying a first visual motion indicator that indicates the first movement in accordance with the first user input;
while the first visual motion indicator indicates the first movement:
receiving a second user input indicating a second movement; and
in response to the second user input, displaying a second visual motion indicator that indicates the second movement in accordance with the second user input; and
creating a user-defined virtual gesture that corresponds to the first and second movements indicated by the first and second user inputs, wherein creating the user-defined virtual gesture includes associating the user-defined virtual gesture with a predefined operation; and
after creating the user-defined virtual gesture:
displaying an icon associated with the user-defined virtual gesture;
receiving a third user input corresponding to a selection of the icon; and
in response to receiving the third user input corresponding to the selection of the icon:
performing the user-defined virtual gesture corresponding to the first movement indicated by the first user input and the second movement indicated by the second user input; and
performing the predefined operation associated with the user-defined virtual gesture.

18. The method of claim 17, further comprising:
in response to the first user input, displaying a first trail corresponding to the first movement indicated by the first user input.

19. The method of claim 18, further comprising:
in response to the second user input:
displaying a second visual indicator in accordance with the second user input; and
displaying a second trail corresponding to the second movement indicated by the second user input.

20. The method of claim 19, further comprising:
while in the virtual-gesture recording mode, concurrently displaying the first and second trails.

21. The method of claim 19, further comprising:
in response to receiving the third user input, displaying an animated movement of the first and second visual motion indicators in the user-defined virtual gesture.

22. The method of claim 19, wherein the user-defined virtual gesture includes absolute or relative positions of the first and second visual motion indicators.

23. The method of claim 19, wherein the user-defined virtual gesture is based on movements of the first and second visual motion indicators.

24. The method of claim 17, wherein the user-defined virtual gesture is performed at a speed different from a speed that the user-defined virtual gesture was created.

* * * * *